(12) United States Patent
Rasmussen

(10) Patent No.: US 6,976,721 B2
(45) Date of Patent: Dec. 20, 2005

(54) SLIDE-OUT MECHANISMS AND SYSTEMS

(75) Inventor: C. Martin Rasmussen, Fruit Heights, UT (US)

(73) Assignee: Happijac Company, Kaysville, UT (US)

( * ) Notice: Subject to any disclaimer, the term of this patent is extended or adjusted under 35 U.S.C. 154(b) by 0 days.

(21) Appl. No.: 10/795,203

(22) Filed: Mar. 5, 2004

(65) Prior Publication Data

US 2004/0174031 A1   Sep. 9, 2004

Related U.S. Application Data

(60) Provisional application No. 60/452,247, filed on Mar. 5, 2003.

(51) Int. Cl.[7] .................................................. B60P 3/34
(52) U.S. Cl. ..................... 296/26.14; 296/165; 296/172
(58) Field of Search ................................ 296/165, 172, 296/176, 26.1, 26.09, 26.12, 26.14, 26.13; 52/67, 79.5

(56) References Cited

U.S. PATENT DOCUMENTS

| | | |
|---|---|---|
| 981,113 A | 1/1911 | Richards |
| 1,039,960 A | 10/1912 | Klein et al. |
| 1,275,971 A | 8/1918 | Michelin |
| 1,284,967 A | 11/1918 | Anderson |
| 1,419,475 A | 6/1922 | Smith |
| 1,447,603 A | 3/1923 | Runner |
| 1,536,518 A | 5/1925 | Osborn |
| 1,914,566 A | 6/1933 | Haseltine |
| 1,948,150 A | 2/1934 | Whitted |
| 2,136,130 A | 11/1938 | Gorlenko |
| 2,150,615 A | 3/1939 | Sword |
| 2,177,394 A | 10/1939 | Pierce |
| 2,201,826 A | 5/1940 | Ditchfield |
| 2,225,319 A | 12/1940 | Rollo |
| 2,306,084 A | 12/1942 | Rollo |
| 2,477,466 A | 7/1949 | Richardson |
| 2,519,517 A | 8/1950 | Van Tassel |
| 2,535,613 A | 12/1950 | Vanderbeek |
| 2,581,192 A | 1/1952 | Fleur |
| 2,583,923 A | 1/1952 | Anschuetz |
| 2,597,709 A | 5/1952 | Dath et al. |
| 2,606,057 A | 8/1952 | Johnson |
| 2,704,223 A | 3/1955 | Houdart |

(Continued)

FOREIGN PATENT DOCUMENTS

CH              663 586 A5     12/1987

(Continued)

OTHER PUBLICATIONS

"King of the Road, Perfecting the art of fifth wheel technology," Owners Manual, 1996, 67 pages.

(Continued)

*Primary Examiner*—Jason Morrow
(74) *Attorney, Agent, or Firm*—Foley & Lardner LLP

(57) ABSTRACT

A land vehicle includes a first floor, a second floor, a first support member, a second support member, and a gear. The first support may be coupled to the land vehicle and sloped relative to the first floor. The second support member may be supported by the first support member and coupled to the second floor. The second support member may include an engaging portion. The gear may cooperate with the engaging portion to move the second support member relative to the first support member and thus move the second floor between a first position where the second floor is positioned adjacent to the first floor and a second position where the second floor is substantially level with the first floor.

44 Claims, 19 Drawing Sheets

U.S. PATENT DOCUMENTS

| | | |
|---|---|---|
| 2,732,251 A | 1/1956 | Meaker |
| 2,744,781 A | 5/1956 | Black |
| 2,757,418 A | 8/1956 | Bergstrom |
| 2,813,747 A | 11/1957 | Rice, Jr. |
| 2,820,666 A | 1/1958 | Grochmal |
| 2,822,212 A | 2/1958 | Frey |
| 2,842,972 A | 7/1958 | Houdart |
| 2,850,320 A | 9/1958 | Grochmal |
| 2,857,197 A | 10/1958 | Hogg |
| 2,876,035 A | 3/1959 | Houdart |
| 2,877,509 A | 3/1959 | Klibanow |
| 2,886,856 A | 5/1959 | Kun Che |
| 2,893,780 A | 7/1959 | Ervine |
| 2,894,775 A | 7/1959 | Harless |
| 2,898,143 A | 8/1959 | Ferrera |
| 2,898,144 A | 8/1959 | Ferrera |
| 2,901,282 A | 8/1959 | Meaker |
| 2,902,312 A | 9/1959 | Ferrera |
| 2,913,775 A | 11/1959 | Sailor |
| 2,987,342 A | 6/1961 | Meaker et al. |
| 2,995,398 A | 8/1961 | Davenport |
| 3,080,185 A | 3/1963 | Walker |
| 3,106,750 A | 10/1963 | Jarman |
| 3,107,116 A | 10/1963 | Meaker |
| 3,116,085 A | 12/1963 | Utley |
| 3,137,041 A | 6/1964 | Mullen |
| 3,148,795 A | 9/1964 | Leach |
| 3,169,280 A | 2/1965 | Jarman |
| 3,181,910 A | 5/1965 | Thomas |
| 3,212,810 A | 10/1965 | Bass |
| 3,288,518 A | 11/1966 | Oliver |
| 3,300,914 A | 1/1967 | Stewart et al. |
| 3,330,574 A | 7/1967 | Kulyk |
| 3,338,554 A | 8/1967 | Gostomski |
| 3,341,986 A | 9/1967 | Brosig |
| 3,368,839 A | 2/1968 | Stewart |
| 3,482,716 A | 12/1969 | Leadley |
| 3,512,315 A | 5/1970 | Vitalini |
| 3,549,027 A | 12/1970 | Batson |
| 3,560,043 A | 2/1971 | Harter |
| 3,567,271 A | 3/1971 | Gostomski |
| 3,572,809 A | 3/1971 | Buland |
| 3,592,443 A | 7/1971 | Budrow et al. |
| 3,596,416 A | 8/1971 | Hojka |
| 3,640,502 A | 2/1972 | Bargman, Jr. |
| 3,695,472 A | 10/1972 | Rasmussen |
| 3,709,467 A | 1/1973 | Mann |
| 3,719,386 A | 3/1973 | Puckett et al. |
| 3,740,088 A | 6/1973 | Ratcliff |
| 3,758,074 A | 9/1973 | Jeffries et al. |
| 3,763,979 A | 10/1973 | Goodman et al. |
| 3,797,880 A | 3/1974 | Pezzaglia |
| 3,815,949 A | 6/1974 | Ulert |
| 3,819,077 A | 6/1974 | Rasmussen et al. |
| 3,850,470 A | 11/1974 | Trelle |
| 3,874,244 A | 4/1975 | Rasmussen et al. |
| 3,897,044 A | 7/1975 | Tallman |
| 3,915,492 A | 10/1975 | Agnese |
| 3,921,843 A | 11/1975 | Rasmussen et al. |
| 3,934,688 A | 1/1976 | Sides et al. |
| 3,944,277 A | 3/1976 | Cyphert |
| 4,015,822 A | 4/1977 | Rasmussen |
| 4,049,310 A | 9/1977 | Yoder |
| 4,103,462 A | 8/1978 | Freller |
| 4,128,269 A | 12/1978 | Stewart |
| 4,133,571 A | 1/1979 | Fillios |
| 4,139,229 A | 2/1979 | Cooper |
| 4,169,581 A | 10/1979 | Thurmond, Jr. |
| 4,192,544 A | 3/1980 | Patterson |
| 4,253,283 A | 3/1981 | May |
| 4,257,570 A | 3/1981 | Rasmussen |
| 4,270,319 A | 6/1981 | Spasojevic |
| 4,270,791 A | 6/1981 | Tann |
| 4,277,919 A | 7/1981 | Artweger et al. |
| 4,295,679 A | 10/1981 | Artweger et al. |
| 4,312,159 A | 1/1982 | Paul |
| 4,316,601 A | 2/1982 | Osborne et al. |
| 4,326,615 A | 4/1982 | Powell |
| 4,351,135 A | 9/1982 | Freller |
| 4,358,133 A | 11/1982 | Stucky |
| 4,413,855 A | 11/1983 | Flanagan |
| 4,480,866 A | 11/1984 | Komatsu |
| 4,500,132 A | 2/1985 | Yoder |
| RE32,262 E | 10/1986 | Stewart |
| 4,652,041 A | 3/1987 | Barber et al. |
| 4,689,924 A | 9/1987 | Jurgensen |
| 4,723,931 A | 2/1988 | Allen et al. |
| 4,759,582 A | 7/1988 | Kutzner |
| 4,842,252 A | 6/1989 | McMahan |
| 4,869,030 A | 9/1989 | Clark |
| 4,872,903 A | 10/1989 | Periou |
| 4,883,306 A | 11/1989 | Stucky |
| 4,912,892 A | 4/1990 | Jurgensen |
| 4,930,270 A | 6/1990 | Bevacqua |
| 4,930,837 A | 6/1990 | Marsh et al. |
| 4,943,106 A | 7/1990 | Hunt |
| 4,945,780 A | 8/1990 | Bosma |
| 4,955,661 A | 9/1990 | Mattice |
| 5,050,927 A | 9/1991 | Montanari |
| 5,061,001 A | 10/1991 | Madden et al. |
| 5,069,471 A | 12/1991 | Van Der Linden et al. |
| 5,090,749 A | 2/1992 | Lee |
| 5,127,697 A | 7/1992 | St. Marie |
| 5,154,469 A | 10/1992 | Morrow |
| 5,185,973 A | 2/1993 | Oldani |
| 5,193,878 A * | 3/1993 | Weaver .................. 296/26.14 |
| 5,199,738 A | 4/1993 | Vandenberg |
| 5,237,782 A | 8/1993 | Cooper |
| 5,248,180 A | 9/1993 | Hussaini |
| 5,273,256 A | 12/1993 | Chambers |
| 5,291,701 A | 3/1994 | Delacollette et al. |
| 5,295,430 A | 3/1994 | Dewald, Jr. et al. |
| 5,332,276 A | 7/1994 | Blodgett, Jr. |
| 5,333,420 A | 8/1994 | Eden |
| 5,345,730 A | 9/1994 | Jurgensen |
| 5,374,094 A | 12/1994 | Smith et al. |
| 5,384,992 A | 1/1995 | Roberton |
| 5,398,986 A | 3/1995 | Koob |
| 5,491,933 A | 2/1996 | Miller et al. |
| 5,511,459 A | 4/1996 | Hanser et al. |
| 5,553,825 A | 9/1996 | Rasmussen |
| 5,560,444 A | 10/1996 | Tiedge |
| 5,560,667 A | 10/1996 | Edry |
| 5,567,003 A | 10/1996 | Gill |
| 5,570,924 A | 11/1996 | Few et al. |
| 5,577,351 A | 11/1996 | Dewald, Jr. et al. |
| 5,586,802 A | 12/1996 | Dewald, Jr. et al. |
| 5,607,134 A | 3/1997 | Corning et al. |
| 5,620,224 A | 4/1997 | DiBiagio et al. |
| 5,628,541 A | 5/1997 | Gardner |
| 5,634,683 A | 6/1997 | Young |
| 5,639,139 A | 6/1997 | Rush |
| 5,658,032 A | 8/1997 | Gardner |
| 5,673,962 A | 10/1997 | Maieli et al. |
| 5,706,612 A | 1/1998 | Tillett |
| 5,711,566 A | 1/1998 | Lesmeister et al. |
| 5,732,839 A | 3/1998 | Schimmang et al. |
| 5,758,918 A | 6/1998 | Schneider et al. |
| 5,765,316 A | 6/1998 | Kavarsky |
| 5,772,270 A | 6/1998 | Hanser et al. |
| 5,785,373 A | 7/1998 | Futrell et al. |
| 5,787,650 A | 8/1998 | Miller et al. |
| 5,788,306 A | 8/1998 | DiBiagio et al. |
| 5,791,715 A | 8/1998 | Nebel |

| | | | | | | |
|---|---|---|---|---|---|---|
| 5,800,002 A | 9/1998 | Tiedge et al. | 6,592,163 B1 * | 7/2003 | Nebel | 296/165 |
| 5,815,988 A | 10/1998 | Molina | 6,598,354 B2 | 7/2003 | McManus et al. | |
| 5,829,822 A | 11/1998 | Tiedge | 6,601,896 B1 | 8/2003 | Nye et al. | |
| 5,833,296 A | 11/1998 | Schneider | 6,619,713 B2 | 9/2003 | Eichhorn | |
| 5,853,215 A | 12/1998 | Lowery | 6,619,714 B2 | 9/2003 | Schneider et al. | |
| 5,857,733 A | 1/1999 | Dewald, Jr. et al. | 6,623,058 B1 | 9/2003 | Crean | |
| 5,860,686 A | 1/1999 | Tiedge | 6,623,066 B2 | 9/2003 | Garceau et al. | |
| 5,894,698 A | 4/1999 | Dewald, Jr. et al. | 6,637,794 B2 | 10/2003 | McManus et al. | |
| 5,902,001 A | 5/1999 | Schneider | 6,637,804 B1 | 10/2003 | Crean | |
| 5,908,215 A | 6/1999 | Hanser et al. | 6,644,235 B2 | 11/2003 | Haynes | |
| 5,915,774 A | 6/1999 | Tiedge | 6,644,719 B2 | 11/2003 | Young, Sr. | |
| 5,971,471 A | 10/1999 | Gardner | 6,655,723 B2 | 12/2003 | Meijer et al. | |
| 5,983,576 A | 11/1999 | Hanser et al. | 6,658,798 B1 | 12/2003 | Frerichs et al. | |
| 5,984,353 A | 11/1999 | Rasmussen | 6,679,541 B1 | 1/2004 | Hanser et al. | |
| 5,984,396 A | 11/1999 | Schneider | 6,679,543 B2 | 1/2004 | Messano | |
| 5,997,074 A | 12/1999 | Alexander | 6,681,531 B2 | 1/2004 | McManus | |
| 6,003,919 A | 12/1999 | Shook | 6,685,249 B2 | 2/2004 | Schneider | |
| 6,007,142 A | 12/1999 | Gehman et al. | 6,696,813 B2 | 2/2004 | McManus et al. | |
| 6,017,080 A | 1/2000 | Gill | 6,698,818 B2 | 3/2004 | Crean | |
| 6,048,016 A | 4/2000 | Futrell et al. | 6,702,353 B1 | 3/2004 | Blodgett, Jr. | |
| 6,048,167 A | 4/2000 | Lesmeister et al. | 6,708,454 B1 | 3/2004 | Frerichs et al. | |
| 6,052,952 A | 4/2000 | Frerichs et al. | 6,729,669 B2 | 5/2004 | McManus et al. | |
| 6,067,756 A | 5/2000 | Frerichs et al. | 6,729,670 B2 | 5/2004 | Buls et al. | |
| 6,094,870 A | 8/2000 | Stacy | 6,729,677 B2 | 5/2004 | Gurdjian et al. | |
| 6,098,346 A | 8/2000 | Miller et al. | 6,735,909 B1 | 5/2004 | Gardner | |
| 6,108,983 A | 8/2000 | Dewald, Jr. et al. | 6,805,391 B2 | 10/2004 | Schneider | |
| 6,109,683 A | 8/2000 | Schneider | 6,857,689 B2 | 2/2005 | Dodgen | |
| 6,116,671 A | 9/2000 | Schneider | 6,871,897 B1 * | 3/2005 | Snyder | 296/165 |
| 6,152,520 A | 11/2000 | Gardner | 2001/0002758 A1 | 6/2001 | Hanser et al. | |
| 6,170,903 B1 | 1/2001 | Crean | 2001/0004159 A1 | 6/2001 | Crean | |
| 6,176,045 B1 | 1/2001 | McManus et al. | 2001/0008059 A1 | 7/2001 | McManus et al. | |
| 6,182,401 B1 | 2/2001 | McManus et al. | 2001/0030437 A1 | 10/2001 | Hiebert et al. | |
| 6,202,362 B1 | 3/2001 | McManus et al. | 2002/0023393 A1 | 2/2002 | McManus | |
| 6,224,126 B1 | 5/2001 | Martin et al. | 2002/0041104 A1 | 4/2002 | Graf et al. | |
| 6,227,607 B1 | 5/2001 | Dewald, Jr. et al. | 2002/0043813 A1 | 4/2002 | McManus et al. | |
| 6,234,566 B1 | 5/2001 | Cyr et al. | 2002/0047286 A1 | 4/2002 | Nye et al. | |
| 6,250,701 B1 | 6/2001 | Vance | 2002/0056329 A1 | 5/2002 | Rasmussen | |
| 6,254,171 B1 | 7/2001 | Young, Sr. | 2002/0057000 A1 | 5/2002 | McManus | |
| 6,257,638 B1 | 7/2001 | Graber | 2002/0060467 A1 | 5/2002 | McManus et al. | |
| 6,266,931 B1 | 7/2001 | Erickson et al. | 2002/0063441 A1 | 5/2002 | Young, Sr. | |
| 6,286,883 B1 | 9/2001 | Schneider et al. | 2002/0070700 A1 | 6/2002 | McManus et al. | |
| 6,290,284 B1 | 9/2001 | Crean | 2002/0074815 A1 | 6/2002 | McManus et al. | |
| 6,293,611 B1 | 9/2001 | Schneider et al. | 2002/0074816 A1 | 6/2002 | McManus et al. | |
| 6,293,612 B1 | 9/2001 | Crean | 2002/0078634 A1 | 6/2002 | McManus et al. | |
| 6,299,229 B1 | 10/2001 | Becenas Nieto | 2002/0084661 A1 | 7/2002 | McManus et al. | |
| 6,302,475 B1 | 10/2001 | Anderson | 2002/0084663 A1 | 7/2002 | McManus et al. | |
| 6,305,739 B1 | 10/2001 | Corona | 2002/0084664 A1 | 7/2002 | McManus et al. | |
| 6,325,437 B2 | 12/2001 | Hiebert et al. | 2002/0084665 A1 | 7/2002 | McManus et al. | |
| 6,338,523 B1 | 1/2002 | Rasmussen | 2002/0089212 A1 | 7/2002 | Garceau et al. | |
| 6,345,854 B1 | 2/2002 | McManus | 2002/0089213 A1 | 7/2002 | Gehman et al. | |
| 6,345,855 B2 | 2/2002 | Hanser et al. | 2002/0093213 A1 | 7/2002 | Kreil et al. | |
| 6,354,646 B1 | 3/2002 | McManus et al. | 2002/0093214 A1 | 7/2002 | McManus et al. | |
| 6,402,216 B1 | 6/2002 | McManus et al. | 2002/0140245 A1 | 10/2002 | Coleman, II et al. | |
| 6,415,675 B1 | 7/2002 | Schneider et al. | 2002/0153745 A1 | 10/2002 | Messano | |
| 6,422,628 B1 | 7/2002 | Bortell | 2002/0171255 A1 | 11/2002 | Eichhorn | |
| 6,428,073 B1 | 8/2002 | Blodgett, Jr. | 2002/0180232 A1 | 12/2002 | Schneider et al. | |
| 6,447,048 B2 | 9/2002 | Crean | 2003/0080576 A1 | 5/2003 | Buls et al. | |
| 6,454,336 B1 | 9/2002 | Nye et al. | 2003/0089296 A1 | 5/2003 | Haynes | |
| 6,471,275 B1 | 10/2002 | Kunz et al. | 2003/0107229 A1 | 6/2003 | Meijer et al. | |
| 6,494,518 B2 | 12/2002 | Kreil et al. | 2003/0141732 A1 | 7/2003 | Nye et al. | |
| 6,497,449 B2 | 12/2002 | Graf et al. | 2003/0155791 A1 | 8/2003 | Gurdjian et al. | |
| 6,505,873 B1 | 1/2003 | Crean | 2003/0193213 A1 | 10/2003 | Gehman et al. | |
| 6,527,324 B2 | 3/2003 | McManus et al. | 2004/0007890 A1 | 1/2004 | Blodgett, Jr. | |
| 6,533,338 B1 | 3/2003 | Frerichs et al. | 2004/0017096 A1 | 1/2004 | Crean | |
| 6,536,821 B1 | 3/2003 | Gardner | 2004/0066060 A1 | 4/2004 | Rasmussen | |
| 6,536,823 B2 | 3/2003 | McManus | 2004/0104698 A1 | 6/2004 | Blodgett, Jr. | |
| 6,561,570 B2 | 5/2003 | Gehman et al. | 2004/0124651 A1 | 7/2004 | Huffman et al. | |
| 6,565,144 B1 | 5/2003 | Crean | 2004/0130172 A1 | 7/2004 | Yoder et al. | |
| 6,568,734 B2 | 5/2003 | Buls et al. | 2004/0130173 A1 | 7/2004 | Meijer et al. | |
| 6,572,170 B2 | 6/2003 | McManus et al. | 2004/0150241 A1 | 8/2004 | Nye et al. | |
| 6,575,514 B2 | 6/2003 | McManus et al. | 2005/0006924 A1 | 1/2005 | Rasmussen | |

FOREIGN PATENT DOCUMENTS

| | | |
|---|---|---|
| DE | 944 657 | 12/1955 |
| DE | 1 092 318 | 11/1960 |
| DE | 1 138 648 | 10/1962 |
| DE | 1 925 258 | 11/1970 |
| DE | 2 026 360 | 12/1971 |
| DE | 2 309 551 | 9/1973 |
| DE | 24 44 545 A1 | 4/1976 |
| DE | 25 34 154 A1 | 2/1977 |
| DE | 26 01 609 A1 | 7/1977 |
| DE | 26 41 142 A1 | 3/1978 |
| DE | 27 12 270 A1 | 9/1978 |
| DE | 28 35 166 A1 | 2/1980 |
| DE | 44 29 927 A1 | 11/1995 |
| EP | 0 006 072 A1 | 7/1981 |
| EP | 0 083 317 A2 | 6/1982 |
| EP | 0 089 133 A1 | 9/1983 |
| EP | 1 093 964 A2 | 9/2000 |
| FR | 1 015 333 | 9/1952 |
| FR | 1 088 640 | 3/1955 |
| FR | 1 089 977 | 3/1955 |
| FR | 1 107 260 | 12/1955 |
| FR | 1 129 557 | 1/1957 |
| FR | 1 157 924 | 6/1958 |
| FR | 1 211 834 | 3/1960 |
| FR | 1 562 197 | 4/1969 |
| FR | 1.570.553 | 6/1969 |
| FR | 1 574 680 | 7/1969 |
| FR | 2 360 444 | 3/1978 |
| FR | 2 573 016 A1 | 5/1986 |
| GB | 304 802 | 1/1929 |
| GB | 485330 | 5/1938 |
| GB | 882 258 | 11/1961 |
| GB | 1 212 711 | 11/1970 |
| GB | 1 265 003 | 3/1972 |
| GB | 2 001 589 A | 7/1978 |
| GB | 2 244 959 A | 6/1990 |
| GB | 2 344 317 A | 6/2000 |
| WO | WO 80/01669 | 8/1980 |

OTHER PUBLICATIONS

"Power Gear®, Electric Slide-Out System Operations and Service Manual," 111 pages.

Royalite by King of the Road, Model # 35CK, Aug. 16, 1996, 31 pages, Texas RV Center, Inc.

Fleetwood Terry 27', Nov. 2000, 14 pages, Kennedale Camper Sales, Inc., Kennedale, Texas.

"Slide-Out Systems, RV Room Extension Slide-Out Systems," Barker, 2 pages.

"Rollout EZ Slide Customer Specification Form," 1998, 2 pages, H&H Braund Manufacturing Company Limited, Canada.

"RV Parts and Accessories," 2002, 5 pages, H&H Braund Manufacturing Company Limited, Canada.

"Rollout EZ Slide," May 11, 1995, 1 page, Model No. 23360, Barker Manufacturing Co., Battle Creek, MI.

"Rollout EZ Slide," Jul. 28, 1997, 1 page, Model No. 23360, Barker Manufacturing Co., Battle Creek, MI.

Rollout EZ Slide, Jun. 24, 1998, 1 page, Model No. 24905, Barker Manufacturing Co., Battle Creek, MI.

"The HWH SpaceMaker®: "Pivotal Level Out Floor" Room Extension (With Pivot Brackets and Synchronizing Cylinder," May 6, 2002, 1 page.

"King of the Road, Perfecting the art of fifth wheel technology," 1997 Royalite, 12 pages, Oct. 1996, Chief Industries, Inc.

U.S. Appl. No. 60/132,397, filed May 4, 1999, Schneider.

* cited by examiner

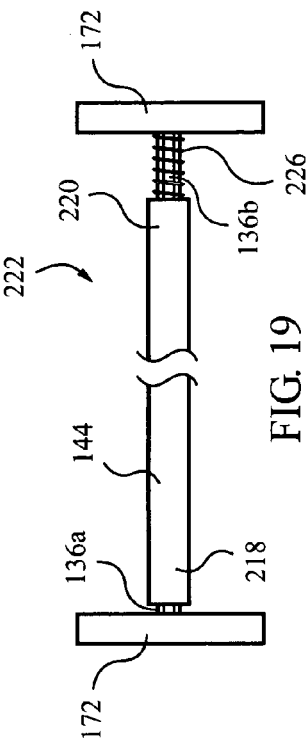
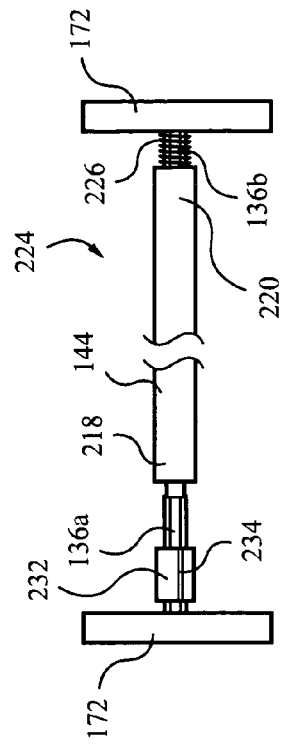
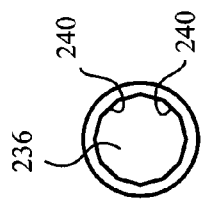
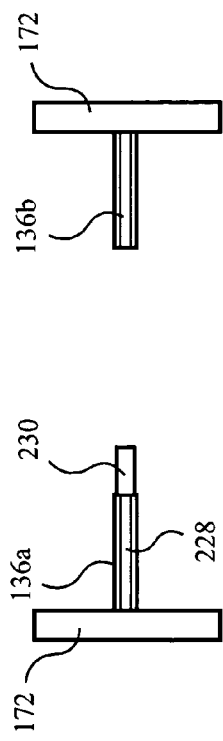
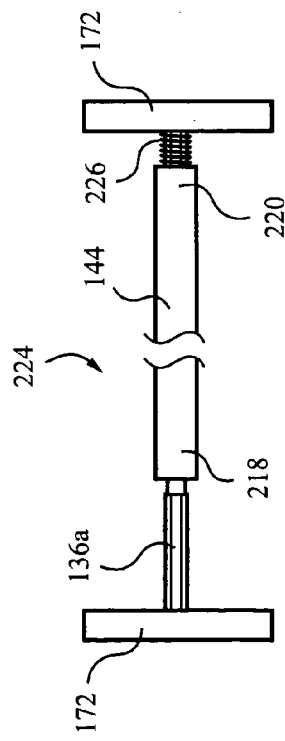
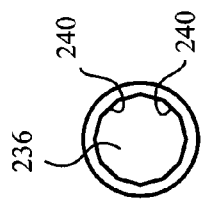

SLIDE-OUT MECHANISMS AND SYSTEMS

CROSS-REFERENCE TO RELATED PATENT APPLICATIONS

This patent application claims priority to U.S. Provisional Patent Application No. 60/452,247, entitled "Sliding Mechanisms and Systems," filed on Mar. 5, 2003 which is hereby incorporated by reference in its entirety.

BACKGROUND

Recreational vehicles (RVs), such as travel trailers, fifth wheels, campers, various other types of trailers, motor homes, and the like, offer users the opportunity to escape the rigors of everyday life and explore the world we live in. In some cases, resembling a small home on wheels, RVs are capable of transporting and comfortably sheltering people for extended periods. One benefit of such an RV is to enhance the camping or traveling experience by providing the comforts of home away from home. Additionally, the occupant is given the option of braving the elements, commonly known as "roughing it," or retreating to the protection afforded by the RV. Thus, the spirit of "roughing it" may be maintained without deprivation of the full camping experience.

Although freely mobile, as the size of RVs increase, the ease of handling tends to decrease. Additionally, RVs often have dimensional limits dictated by highway regulations or, in the case of a camper, the specific configuration of the truck bed used to hold the camper. Further, other factors may limit the size of the RV (e.g., the capacity of the motor vehicle used to transport the RV or the engine size in a self-powered RV). Responding to the need for more living space inside RVs, various RVs incorporate features such as pop-up tops and/or slide-out rooms for selectively expanding the living area. Designed to be used primarily when the RV is parked, these rooms are typically positioned in the interior of the RV during travel, and are moved outwardly when the RV is parked. Generally, upon parking the RV, the slide-out rooms are moved horizontally to a second position to increase the useable interior space of the vehicle.

Previous systems used to move slide-out rooms on RVs suffer from a number of disadvantages. For example, some previous systems were overly large and complex to install. Others failed to provide the manufacturer and the end user with the desired degree of flexibility during installation and use. Others were expensive to manufacture and difficult to service once installed. Accordingly, it would be desirable to provide an improved system for moving slide-out rooms.

Of course, the claims define the scope of the subject matter for which protection is sought, regardless of whether any of the aforementioned disadvantages are overcome by the subject matter recited in the claims. Also, the terms recited in the claims should be given their ordinary and customary meaning as would be recognized by those of skill in the art, except, to the extent a term is used herein in a manner more expansive than its ordinary and customary meaning, the term should be given its ordinary and customary meaning plus the additional expansive meaning, or except if a term has been explicitly defined to have a different meaning by reciting the term followed by the phase "as used herein shall mean" or similar language. Accordingly, the claims are not tied and should not be interpreted to be tied to any particular embodiment, feature, or combination of features other than those explicitly recited in the claims. Thus, the appended claims should be read to be given their broadest interpretation in view of the prior art and the ordinary meaning of the claim terms.

DRAWINGS

Various embodiments of apparatuses and methods for moving items in a vehicle are described in greater detail by reference to the appended drawings. Understanding that these drawings depict only a few exemplary embodiments, the subject matter disclosed herein is described with the assistance of the accompanying drawings in which:

FIGS. 18–21 are plan views of various embodiments of drive assemblies according to additional embodiments.

FIG. 22 is a cross-sectional view of a drive member according to one embodiment.

FIG. 23 is a cross-sectional view of a drive member according to another embodiment.

DETAILED DESCRIPTION

The subject matter described herein generally relates to slide-out mechanisms and systems which may be used to extend and/or retract a slide-out floor, a slide-out room, a slide-out compartment, and/or a slide-out portion of a land vehicle. The following description is provided in the context of slide-out systems for recreational vehicles (RVs), such as but not limited to truck campers, travel trailers, tent trailers, fifth wheels, motor homes, toy haulers, or other conveyances that transport people, objects or things. However, it should be appreciated that the slide-out systems described herein may be used in any of a number of suitable vehicles. Also, although the subject matter described herein is presented in the general context of frame mounted slide-out mechanisms and systems, it should be understood that many features and concepts are also applicable to above-the-floor slide-out mechanisms and systems (e.g., bed slide-out system, sofa slide-out system, entertainment center slide-out system, etc.).

Furthermore, the slide-out systems described herein may be used to extend and retract variously sized slide-out compartments to increase the living space within a RV. Also, the slide-out systems may be used to extend and retract variously sized slide-out decks or slide-out patios to increase the amount of usable space on the outside of the RV. Moreover, the slide-out systems may be used to extend and/or retract other slide-out portions of an RV as would be recognized by one of ordinary skill. Although reference is made herein to a single slide-out compartment or slide-out patio, one skilled in the art will appreciate that multiple combinations of slide-out compartments and/or slide-out-patios may be incorporated within a single recreational vehicle.

The slide-out systems described herein incorporate numerous components into a modular unit thereby making installation simpler and quicker. Additionally, the slide-out systems are capable of being installed on various RVs and at varying locations on the RV. Accordingly, the slide-out systems are interchangeable or may be used with or without modification for slide-out compartments and/or slide-out patios on the right, left, front, or rear of the RV. Also, it should be understood that one or more features, characteristics, and components of one embodiment may be combined with other embodiments described herein to provide additional embodiments unless noted otherwise.

Figure 1:
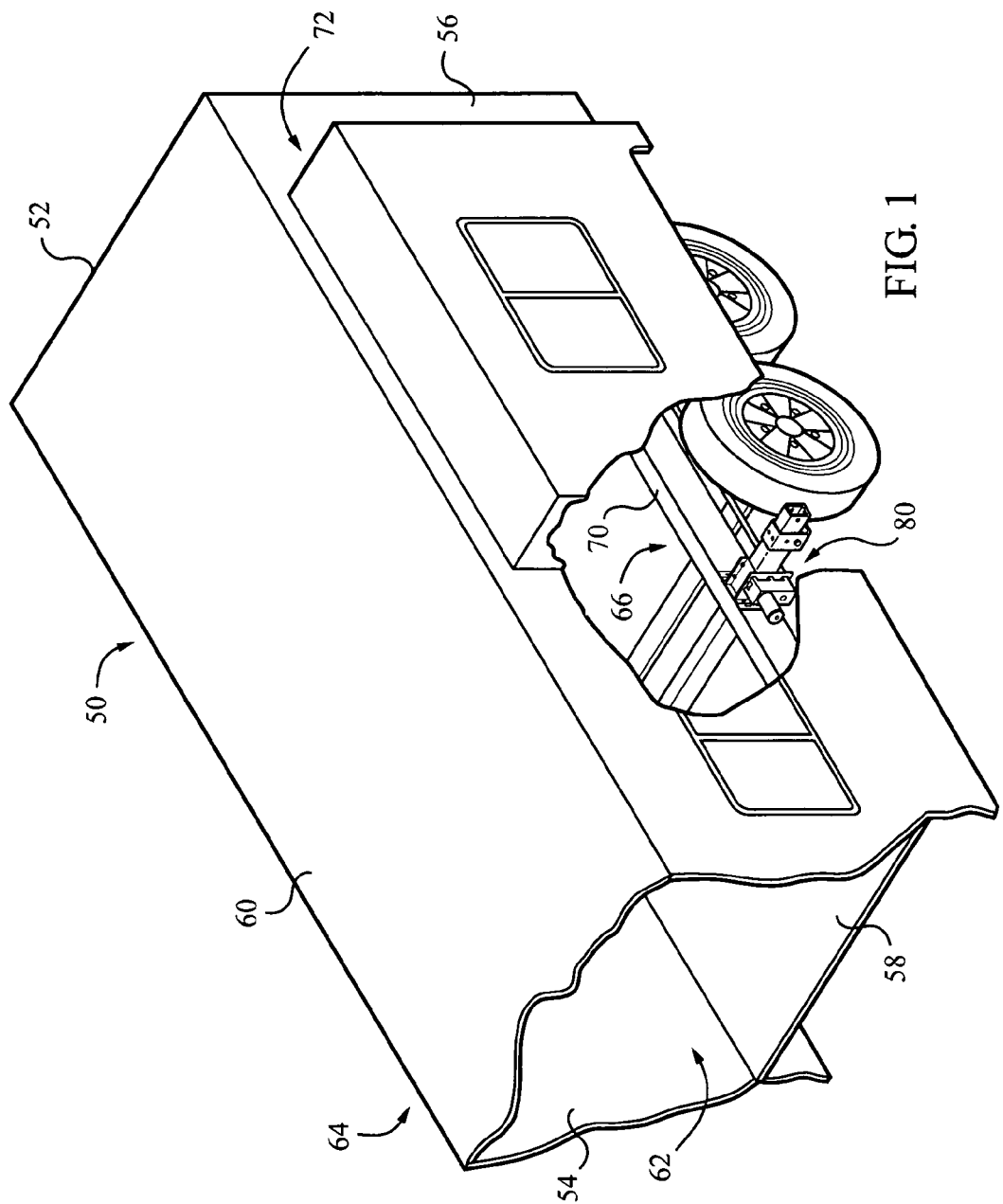
FIG. 1 is a partial sectional perspective view of a land vehicle comprising one embodiment of a slide-out system.

FIG. 1 depicts one embodiment of a slide-out system or slide-out apparatus 80 incorporated within an RV 50. As shown, the RV 50 comprises a rear wall or rear portion 52, a front wall or front portion (not shown), a first wall or first side portion 54, a second wall or second side portion 56, a first floor or main floor 58, and a ceiling, roof, or overhead portion 60 all of which cooperate to form a body 64 of the RV 50 and define a main occupancy area 62. In this embodiment, the front portion may cooperate with a vehicle, such as by way of a hitch (e.g., ball hitch, goose neck hitch, etc.). In other embodiments, such as motor homes, the RV 50 comprises its own drive system (e.g., engine, transmission, drive line, etc.) to move the RV 50 along a road.

The RV 50 also includes a frame or support structure 66 which is coupled to the first floor 58 and is used to support the first floor 58 as well as the overall body 64. It should be noted, that for purposes of this disclosure, the term "coupled" means the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature. The frame 66 comprises a first frame rail or first frame member 68 (FIG. 2) and a second frame rail or second frame member 70 both of which generally extend lengthwise relative to the RV 50 underneath the body 64. The frame 66 also comprises various cross frame rails or cross frame members (not shown) that extend between the first frame rail 68 and the second frame rail 70 at various locations to provide a suitably strong support structure for the body 64. As shown in FIG. 1, the first frame rail 68 and the second frame rail 70 may be used to support a slide-out room or slide-out compartment 72 that moves in cooperation with the RV 50 to provide additional space inside the RV 50. Alternatively, any suitable frame rail or support structure may be use to support the slide-out compartment 72.

Figure 2:
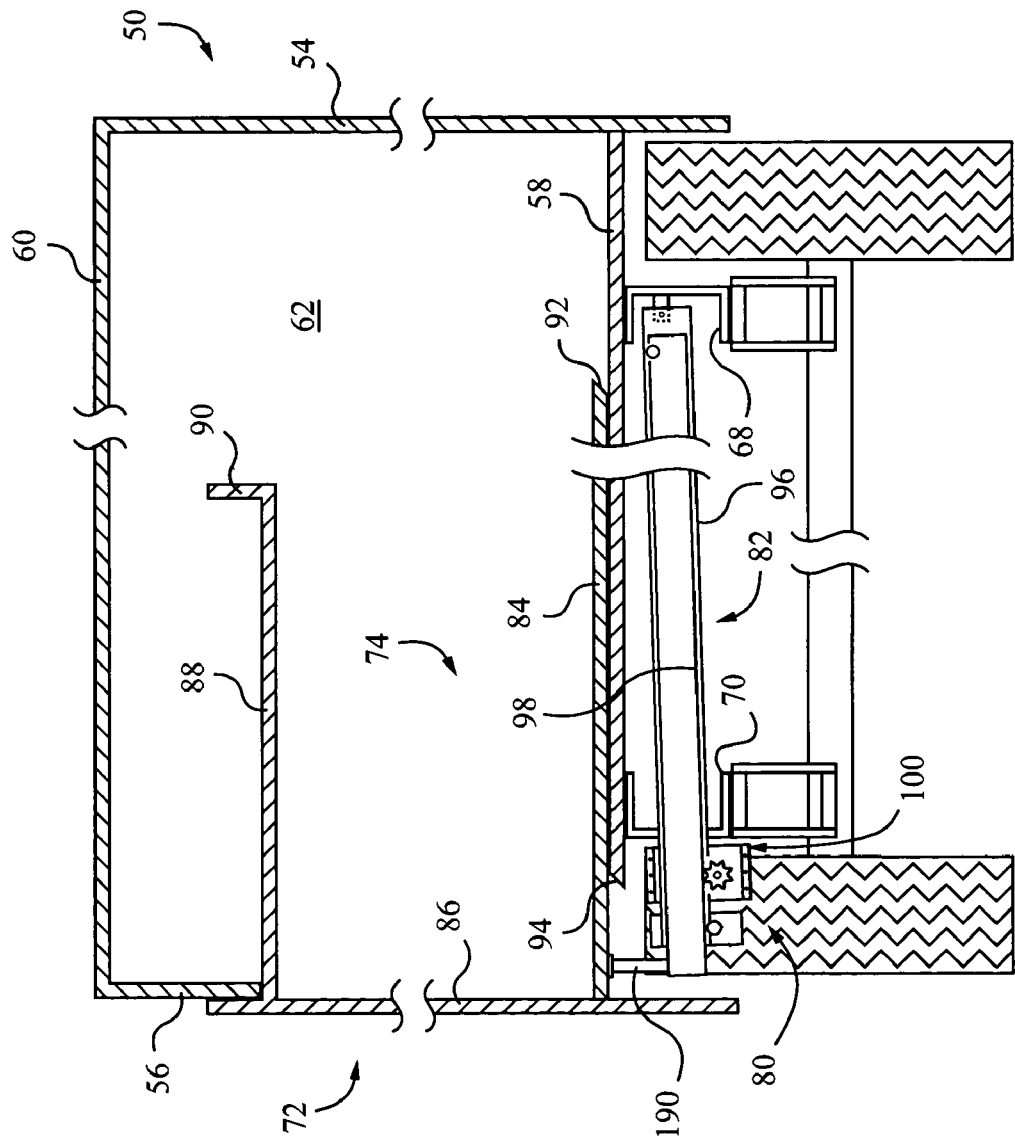
FIG. 2 is a cross-sectional rear side view of the land vehicle of FIG. 1 showing one embodiment of a slide-out system in a retracted position.

In one embodiment shown in FIG. 2, the slide-out compartment 72 extends and retracts relative to the second wall 56 by way of the slide-out system 80. The slide-out system 80 reduces the space required for installation and usage of the slide-out system 80 to extend and retract the slide-out compartment 72, thereby increasing the available living area and/or the ground clearance of the RV 50 while providing the requisite strength and functionality to move the slide-out compartment 72. Additionally, in one embodiment the slide-out system 80 uses a modular configuration where one or more slide-out mechanisms 82 of the slide-out system 80 may be used to extend or retract the slide-out compartment 72, depending upon the size and configuration of the slide-out compartment 72 (e.g., dinette slide-out room, bedroom slide-out room, etc.). For instance, a large slide-out compartment may include an embodiment of the slide-out system 80 that includes two, three, four or more slide-out mechanisms 82 while a small slide-out compartment may include at least one slide-out mechanism 82. One skilled in the art will appreciate that various numbers of slide-out mechanisms may be utilized in various embodiments of slide-out system 80.

Moreover, various embodiments of the slide-out system 80 may be used that extend and/or retract various distances. For example, in those embodiments where the slide-out system 80 is used to extend and/or retract a slide-out patio, the slide-out system 80 may extend and/or retract a distance that is more or less then the distance used to move a slide-out compartment.

Regardless of the number or size of the slide-out mechanisms 82 used, substantially similar slide-out mechanisms 82 may be coupled together and configured to operate in concert with each other. For example, in one embodiment, each slide-out mechanism 82 may be configured to move simultaneously and thus move the slide-out compartment 72 accordingly. Furthermore, the modular characteristics of the slide-out system 80 improve manufacturing and installation efficiencies by using similar components for multiple embodiments and/or configurations. Further, as will be discussed in more detail below, the configuration of the slide-out system 80 allows for simplified installation and repair, particularly in those situations where the slide-out system 80 is installed to replace a prior system that has failed or been removed.

Figure 3:
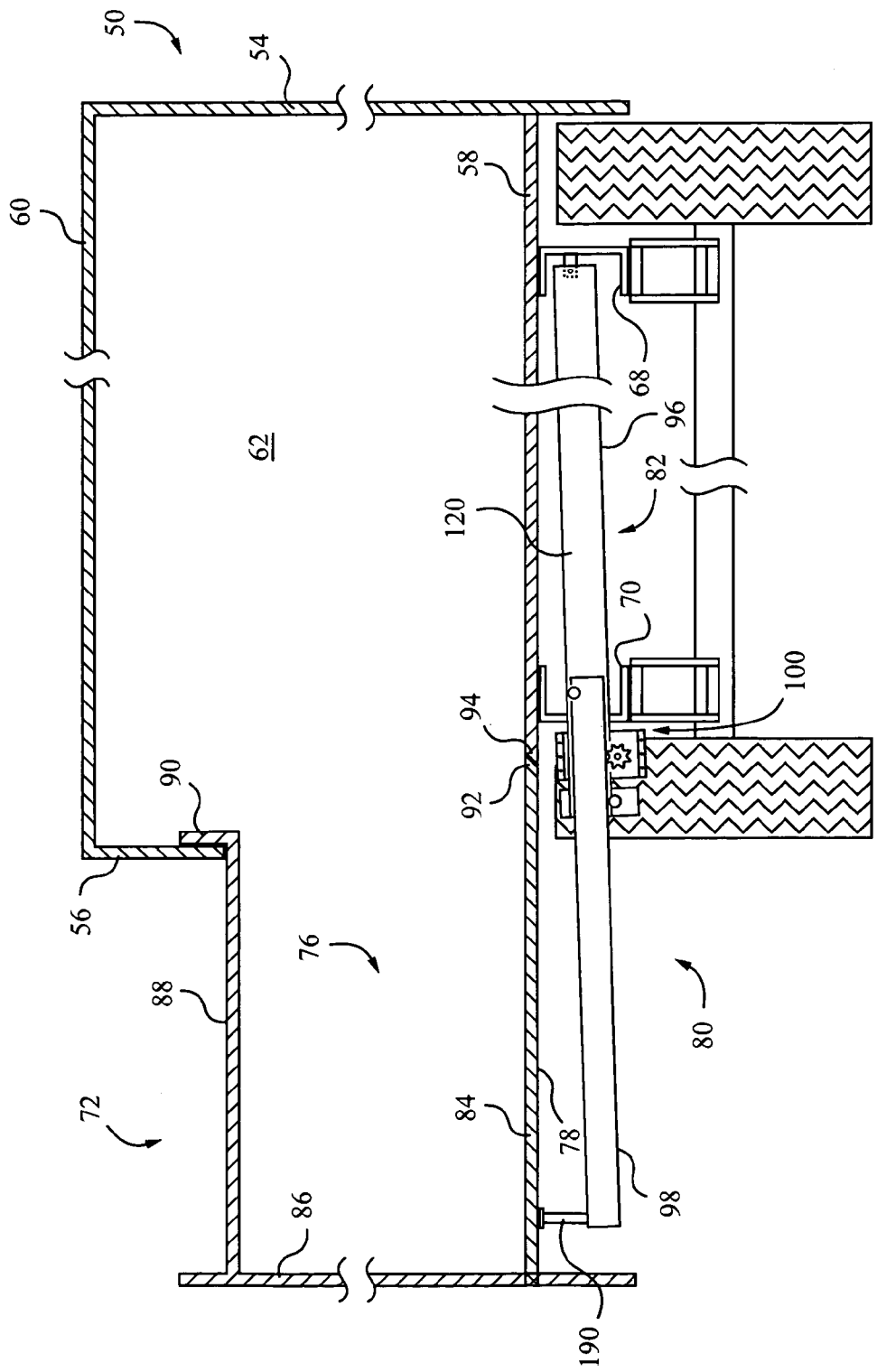
FIG. 3 is a cross-sectional rear side view of the land vehicle of FIG. 2 showing the slide-out system in an extended position.

Referring to FIGS. 1–3, the second wall 56 and the first floor 58 are adapted to receive or cooperate with the slide-out compartment 72 as it moves between a first position or retracted position 74 (FIG. 2) and a second position or extended position 76 (FIG. 3). As shown in FIGS. 2 and 3, the slide-out compartment 72 comprises a second floor or slide-out floor 84, a slide-out wall or third wall 86, and a slide-out ceiling 88. The slide-out compartment 72 moves between the first position 74 where the slide-out wall 86 is positioned adjacent to the second wall 56 and the second position 76 where the slide-out wall 86 is positioned outwardly at a distance from the second wall 56. In the first position 74, the slide-out wall 86 forms a seal with the second wall 56 to prevent moisture, dirt, etc. from entering the interior of the body 64 of RV 50. The seal between the slide-out wall 86 and the second wall 56 may be created using any number of suitable materials and/or techniques (e.g., weather stripping material on one or both the slide-out wall 86 and the second wall 56, etc.). In the second position 76, a first end 90 of the slide-out ceiling engages and forms a seal with the inside of the second wall 56.

In the embodiment shown in FIGS. 2 and 3, the second floor 84 is positioned adjacent to the first floor 58 when the slide-out compartment 72 is in the first position 74 and the second floor 84 is substantially level or flush with the first floor 58 when the slide-out compartment 72 is in the second position 76. In this embodiment, the first floor 58 includes a tapered end or second end 94 and the second floor 84 includes a corresponding tapered end or second end 92. As shown in FIG. 3, the tapered end 92 cooperates with the tapered end 94 to provide a substantially level floor which is made up of at least the first floor 58 and the second floor 84. Specifically, in FIG. 3, the tapered end 92 overlaps the tapered end 94 so that when the slide-out compartment 72 is moved between the first position 74 and the second position 76, the tapered end 92 slides over the tapered end 94, thus reducing any binding that may occur between the first floor 58 and the second floor 84. In this manner, the second floor 84 may be moved from being substantially level with the first floor 58 when the slide-out compartment 72 is in the second position 76 to being positioned above the first floor 58 when the slide-out compartment 72 is in the first position 74. In other embodiments, the transition between the second floor 84 being substantially level with the first floor 58 to the second floor 84 being positioned above the first floor 58 may be accomplished in a number of suitable ways. Also, the second floor 84 may comprise one or more rollers that are used to assist the second floor 84 in moving across the first floor 58. The rollers may also be used to minimize or prevent damage to the first floor 58.

Figure 12:
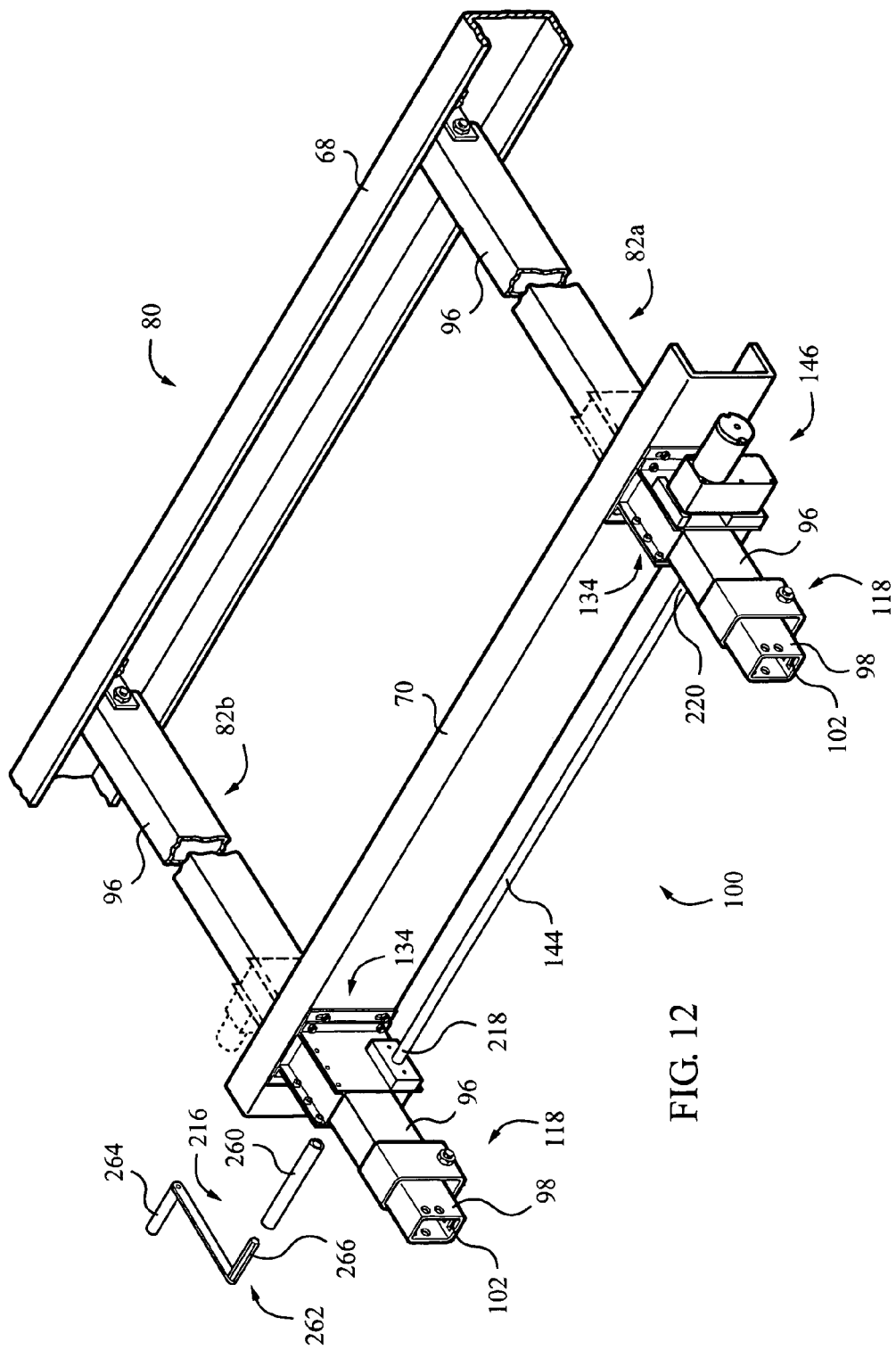
FIG. 12 is a perspective view of one embodiment of a slide-out system coupled to the frame of a land vehicle.

As previously mentioned, the slide-out system 80 used to move the slide-out compartment 72 between the first position 74 and the second position 76 includes one or more slide-out mechanisms 82. FIGS. 1–3 show a single slide-out mechanism 82 while FIG. 12 shows two slide-out mechanisms 82a, 82b. Regardless of the number of slide-out mechanisms 82 used, in the embodiments presently referred to, each slide-out mechanism 82 cooperates with the first frame rail 68, the second frame rail 70, and the second floor 84 of the slide-out compartment 72. In one configuration, the slide-out mechanism 82 may be mounted to one or more of the first frame rail 68, the second frame rail 70, the cross frame rails, the underside of the body 64 (e.g., the underside of the first floor 58, cross members (not shown) that are part of the framing for the body 64 and may be used to support the first floor 58, etc.), and a lower surface 78 (FIG. 3) of the second floor 84.

With continued reference to FIGS. 2 and 3, the slide-out mechanism 82 includes a first support member, stationary member, or guide member 96 and a second support member, movable member, or sliding member 98 which cooperates with the first support member 96. In the embodiment shown in FIGS. 2 and 3, the first support member 96 has a generally tubular configuration and cooperates with the first frame rail 68, the second frame rail 70, a drive assembly 100, and the second support member 98 to allow the slide-out compartment 72 to be moved between the first position 74 and the second position 76. The first support member 96 may be coupled to the first frame rail 68 and the second frame rail 70, while the second support member 98 may be coupled to the second floor 84. In one embodiment, the first support member 96 is pivotally coupled to the first frame rail 68 and extends through the second frame rail 70. Also, the first support member 96 may be movable at the second frame rail 70 in a direction that is perpendicular to the first floor 58. In another embodiment, the second support member 98 may be movably coupled to the slide-out compartment 72. For example, the second support member may be pivotally coupled to the slide-out compartment 72 (e.g., the second floor 84, etc.). As may be appreciated by one skilled in the art, the first support member 96 may optionally be coupled or mounted to the first floor 58 of the RV 50.

Although reference is made to the first support member 96 having a generally tubular configuration, one skilled in the art may appreciate that the first support member may have a variety of different configurations. For instance, the first support member may have a generally C or U-shaped configuration, with the side of the first support member having an open portion being adapted to connect with the first and second frame rails 68, 70, the first floor 58, the second floor 84, the front wall, the rear wall 52, the first wall 54, and/or the second wall 56 of the RV 50 or the slide-out compartment 72. A fixable or removable cap may be secured to the first support member to cover the open portion and prevent debris from entering into an interior of the first support member. In still another configuration, the portion opposite the open portion is adapted to cooperate with the first and second frame rails 68, 70, the first floor 58, the second floor 84, the front wall, the rear wall 52, the first wall 54, and/or the second wall 56 of the RV 50 or the slide-out compartment 72.

As shown in FIGS. 2 and 3, the drive assembly 100 is configured to cooperate with the second support member 98 to move the second support member 98 relative to the first support member 96. In one embodiment, the second support member 98 comprises an engaging portion 102 (FIG. 9) that cooperates with the drive assembly 100. In another embodiment, the drive assembly 100 cooperates with the second support member 98 to move the second support member 98 in the same direction as a longitudinal axis defined by the first support member 96 (i.e., the second support member 98 may move along the same longitudinal axis as defined by the first support member 96 or in parallel with the longitudinal axis defined by the first support member 96).

As previously mentioned, the embodiment of slide-out system 80 shown in FIGS. 2 and 3 moves the slide-out compartment 72 between the first position 74 where the second floor 84 is positioned above the first floor 58 and the second position 76 where the second floor 84 is substantially level with the first floor 58. In moving between the first position 74 and the second position 76, the second floor 84 moves in a direction that is perpendicular to the first floor 58. In order to account for the vertical movement of the second floor 84, the first support member 96 and the second support member 98 are sloped relative to the first floor.

In the embodiment shown in FIGS. 2 and 3, the first support member 96 and the second support member 98 are sloped in a downward direction so that the distance between the first support member 96 and the first floor 58 at the first frame rail 68 is less than the distance between the first support member 96 and the first floor 58 at the second frame rail 70. In order to provide the slide-out system 80 with increased strength, rigidity, and security, one embodiment of the slide-out system 80 is configured so that the first support member 96 and the second support member 98 are both sloped substantially the same amount relative to the first floor 58 at the first position 74 and the second position 76. In another embodiment, the first support member 96 and the second support member 98 maintain substantially the same slope relative to the first floor 58 as the slide-out compartment 72 moves between the first position 74 and the second position 76. In yet another embodiment, the first support member 96 and/or the second support member 98 may be sloped in an upward direction (e.g., this may apply in a situation where the second floor 84 is positioned underneath the first floor 58 when the slide-out compartment 72 is in the first position 74 and the second floor 84 is substantially level with the first floor 58 when the slide-out compartment 72 is in the second position 76).

The first support member 96 and the second support member 98 are sloped to a degree that is sufficient so that when the slide-out compartment 72 is in the second position, the second floor 84 is lowered a sufficient amount to be substantially level with the first floor 58. The desired slope of the first support member 96 and the second support member 98 relative to the first floor 58 is dependent on the distance that the slide-out compartment 72 moves away from second wall 56 and the vertical distance that the second floor 84 moves. In order to provide the desired slope to move slide-out compartments having widely varying configurations, in one embodiment, the slide-out system 80 is adjustable at the second frame rail 70 in a direction that is perpendicular to the first floor 58. In another embodiment, the slide-out mechanism 82 is vertically adjustable at the second frame rail 70. In yet another embodiment, the first support member 96 is vertically adjustable at the second frame rail 70. In still another embodiment, the slide-out mechanism 82 may be vertically adjustable at and/or pivotally coupled to one or both the first frame rail 68 and the second frame rail 70.

The first support member 96 and the second support member 98 may be made of any suitable material that provides the strength, etc. to move a particular slide-out compartment 72. In one embodiment, the first support member 96 and the second support member 98 are made from a ferrous material such as steel. In another embodiment, the first support member 96 and the second support member 98 may be made of any other suitable material (e.g., lightweight composites, carbon fiber, plastics, etc.). Also, the slide-out system 80 and its various components may be painted or otherwise provided with a protective coating to guard against corrosion and/or other similar weather and/or use related wear problems.

Figure 4:
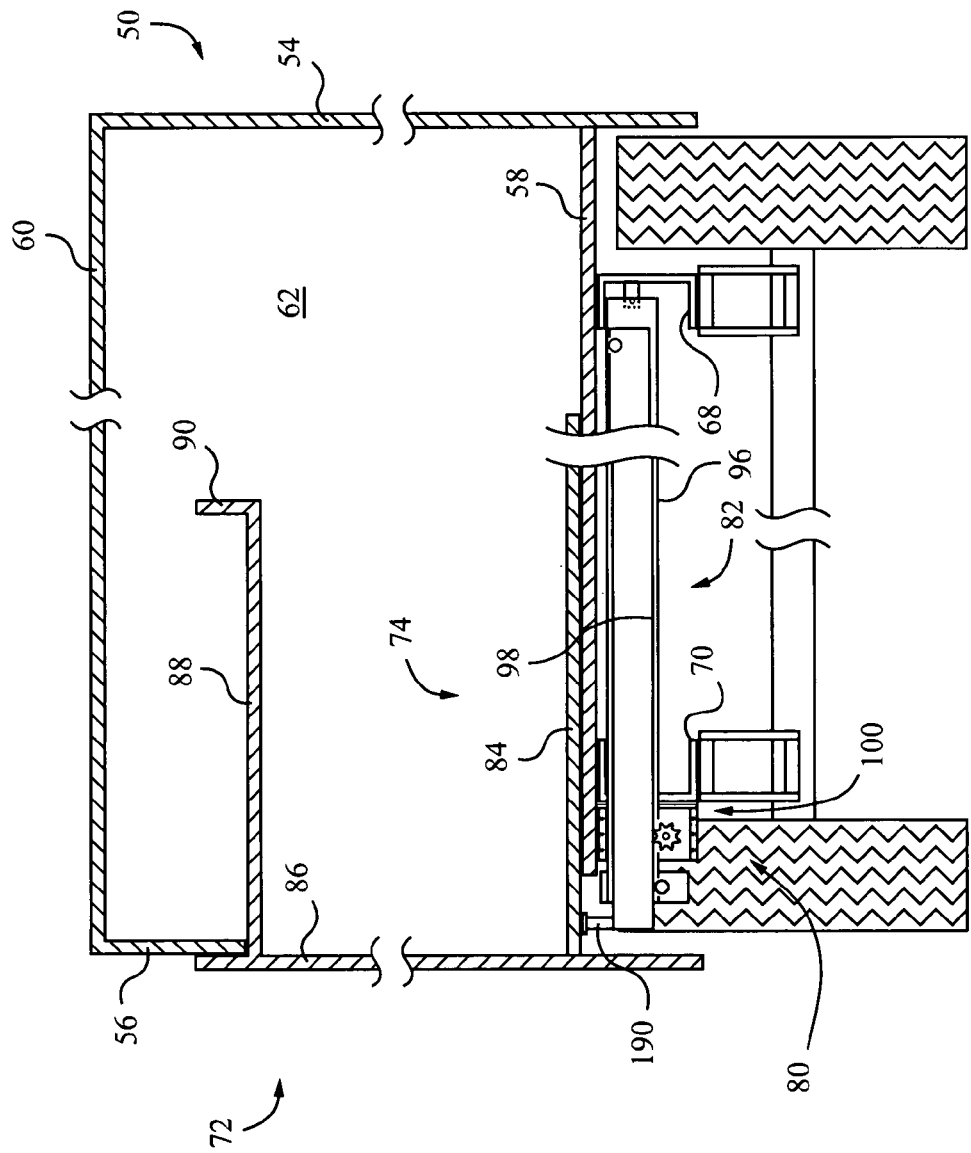
FIG. 4 is a cross-sectional rear side view of the land vehicle of FIG. 1 showing one embodiment of a slide-out system in a retracted position.
Figure 5:
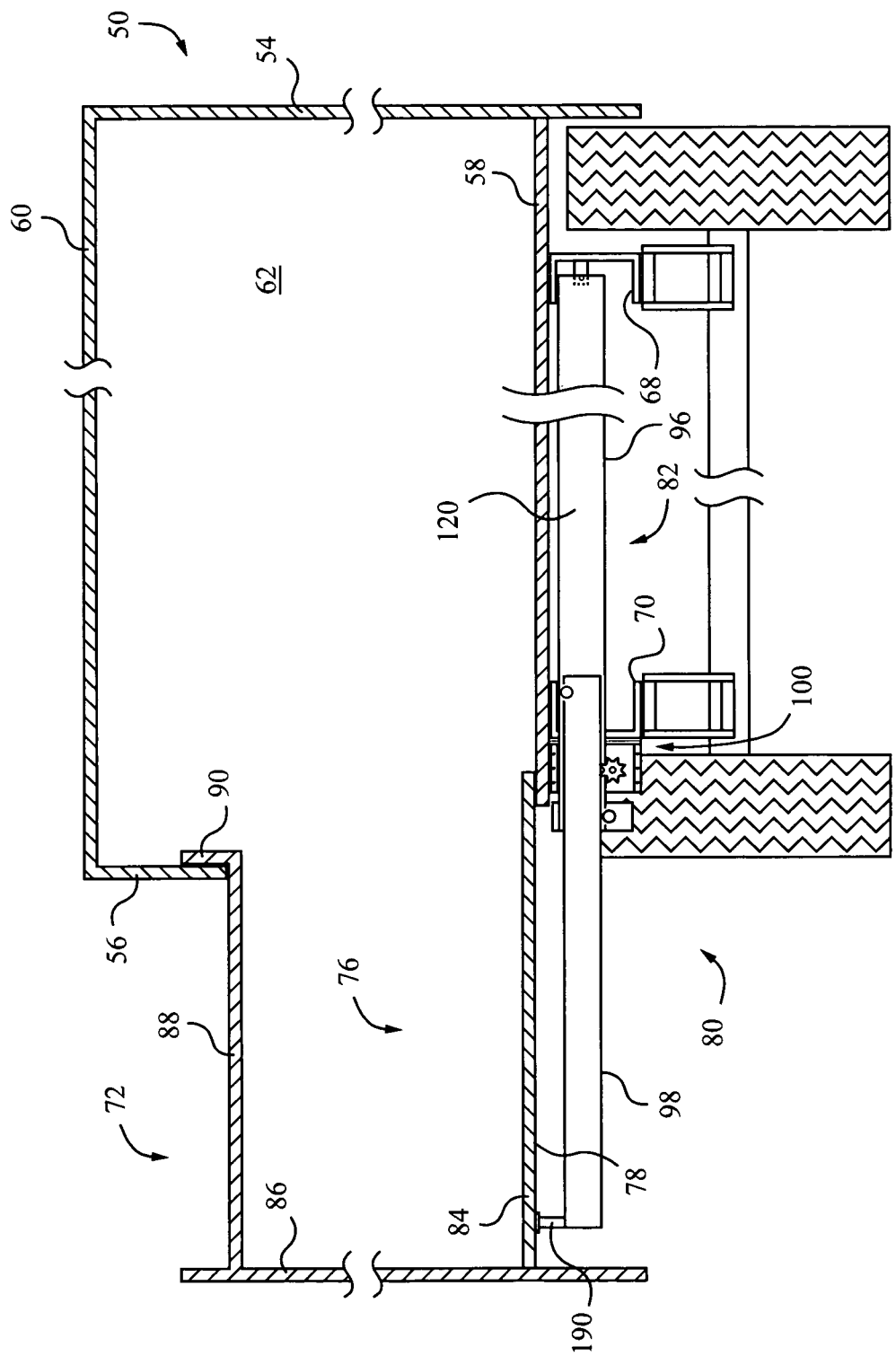
FIG. 5 is a cross-sectional rear side view of the land vehicle of FIG. 4 showing the slide-out system in an extended position.

With reference to FIGS. 4 and 5, another embodiment of the RV 50 including the slide-out system 80 is shown. In this embodiment, the second floor 84 moves in a plane that is parallel to the plane of the first floor 58 so that when the second floor 84 is in the second position 76, the second floor 84 is not substantially level with the first floor 58. In one embodiment, shown in FIG. 5, the second floor 84 is positioned above the first floor 58 when the second floor 84 is in the second position 76. In another embodiment, the second floor 84 may be positioned below the first floor 58 when the second floor 84 is in the second position 76.

In the embodiment shown in FIGS. 4 and 5, the first support member 96 and the second support member 98 are substantially parallel with the first floor 58. By being in this position, the first support member 96 and the second support member 98 may extend and/or retract the second floor 84 so that the second floor 84 is maintained substantially parallel with the first floor 58. Also, in this embodiment, the first support member 96 is shown in FIGS. 4 and 5 as being pivotally coupled to the first frame rail 68 and extending through the second frame rail 70. However, in other embodiments, the first support member 96 may be fixably coupled to one or both the first frame rail 68 and the second frame rail 70.

Figure 6:
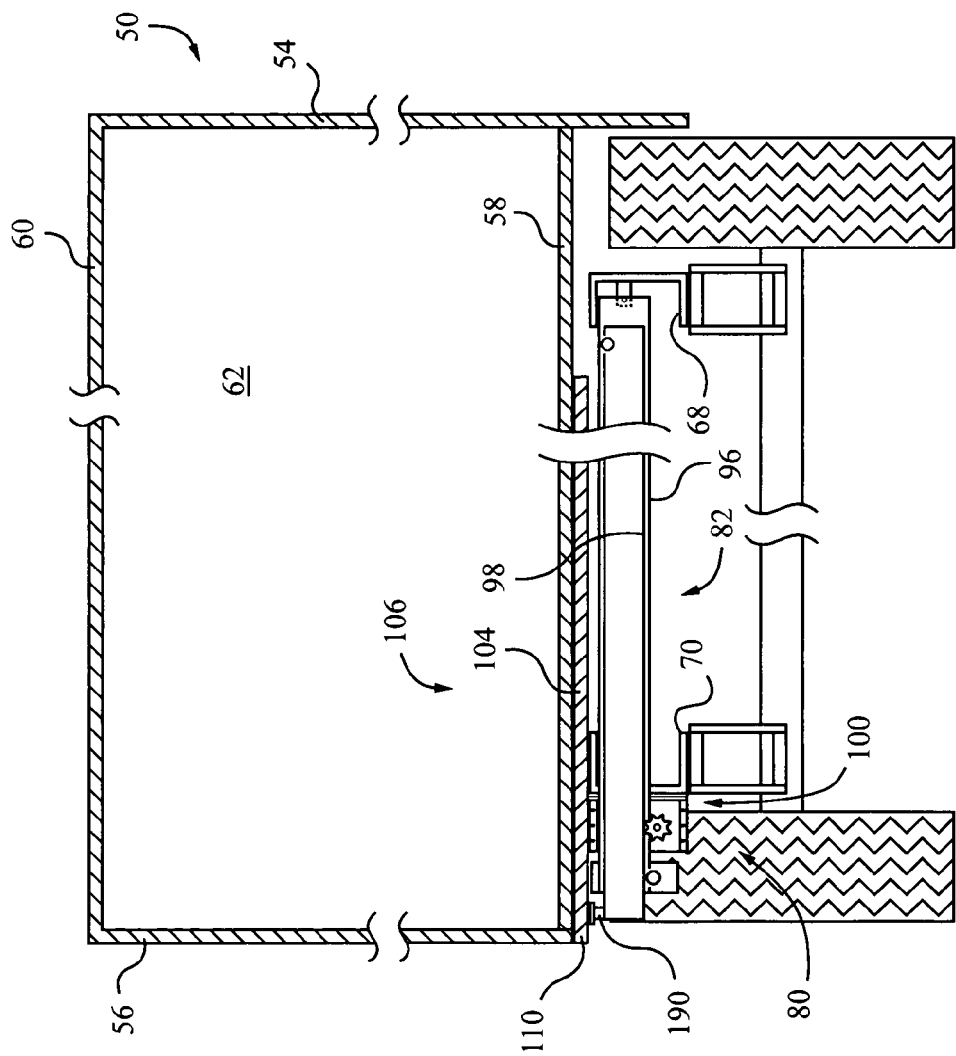
FIG. 6 is a cross-sectional rear side view of the land vehicle of FIG. 1 showing one embodiment of a slide-out system in a retracted position.
Figure 7:
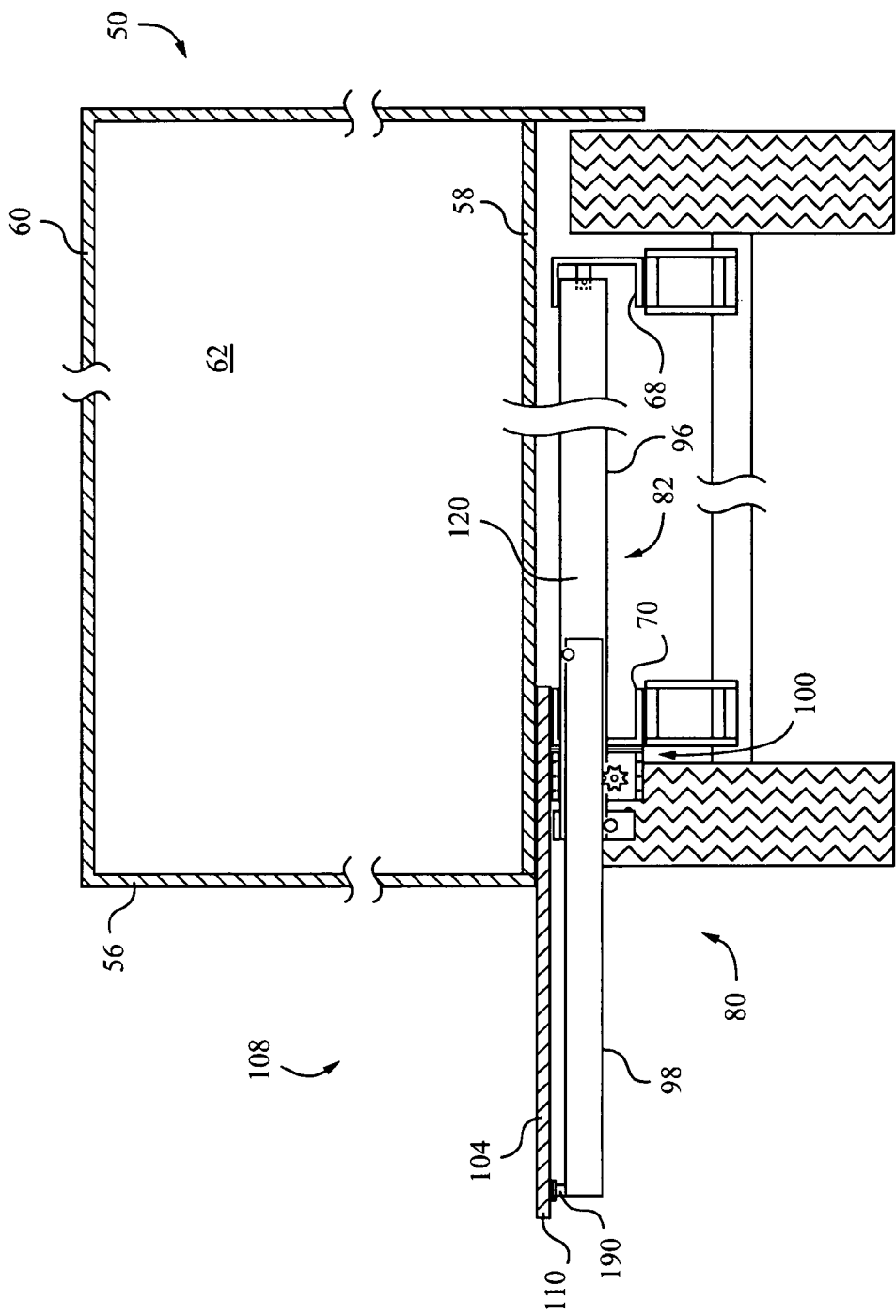
FIG. 7 is a cross-sectional rear side view of the land vehicle of FIG. 6 showing the slide-out system in an extended position.

With reference to FIGS. 6 and 7, another embodiment of the RV 50 including the slide-out system 80 is shown. In this embodiment, the RV 50 comprises a slide out-patio or slide-out floor 104 that moves between a first position or retracted position 106 (FIG. 6) and a second position or extended position 108. The slide-out patio 104 may be used to provide additional area which can be utilized above the ground. For example, the slide-out patio 104 may be used to place chairs on and relax or place a barbecue for easy access. In one embodiment, the RV 50 comprises a door (not shown) positioned adjacent to the slide-out patio 104 to allow the user easy access between the main occupancy area 62 and the slide-out patio 104. In another embodiment, a first end 110 of the slide-out patio 104 may be supported by legs that fold outward from an underside of the slide-out patio 104. Other suitable ways may also be employed to support the first end 110. In yet another embodiment, the steps (not shown) may be used to access the slide-out patio 104 from the ground.

As shown in FIGS. 6 and 7, the slide-out system 80 is used to move the slide-out patio between the first position 106 and the second position 108. In one embodiment, the slide-out system 80 is configured to be parallel with the first floor 58 of the RV 50. In this embodiment, the slide-out system 80 moves the slide-out patio 104 in a plane that is substantially parallel with the first floor 58. Also, multiple slide-out mechanisms 82 may be coupled together to facilitate moving one or more slide-out patios 104.

Figure 8:
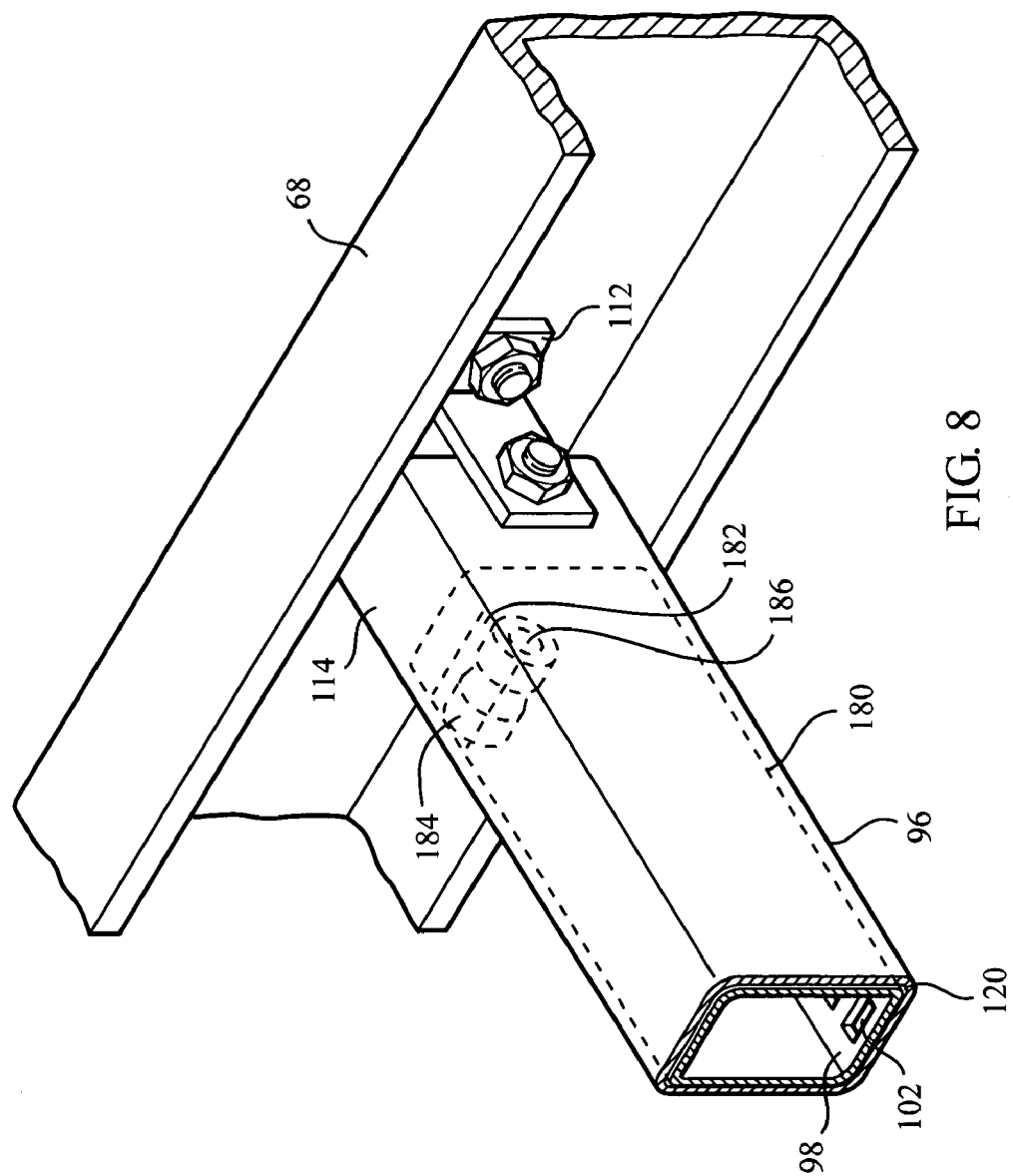
FIG. 8 is a perspective view of a portion of a slide-out system according to one embodiment.
Figure 15:
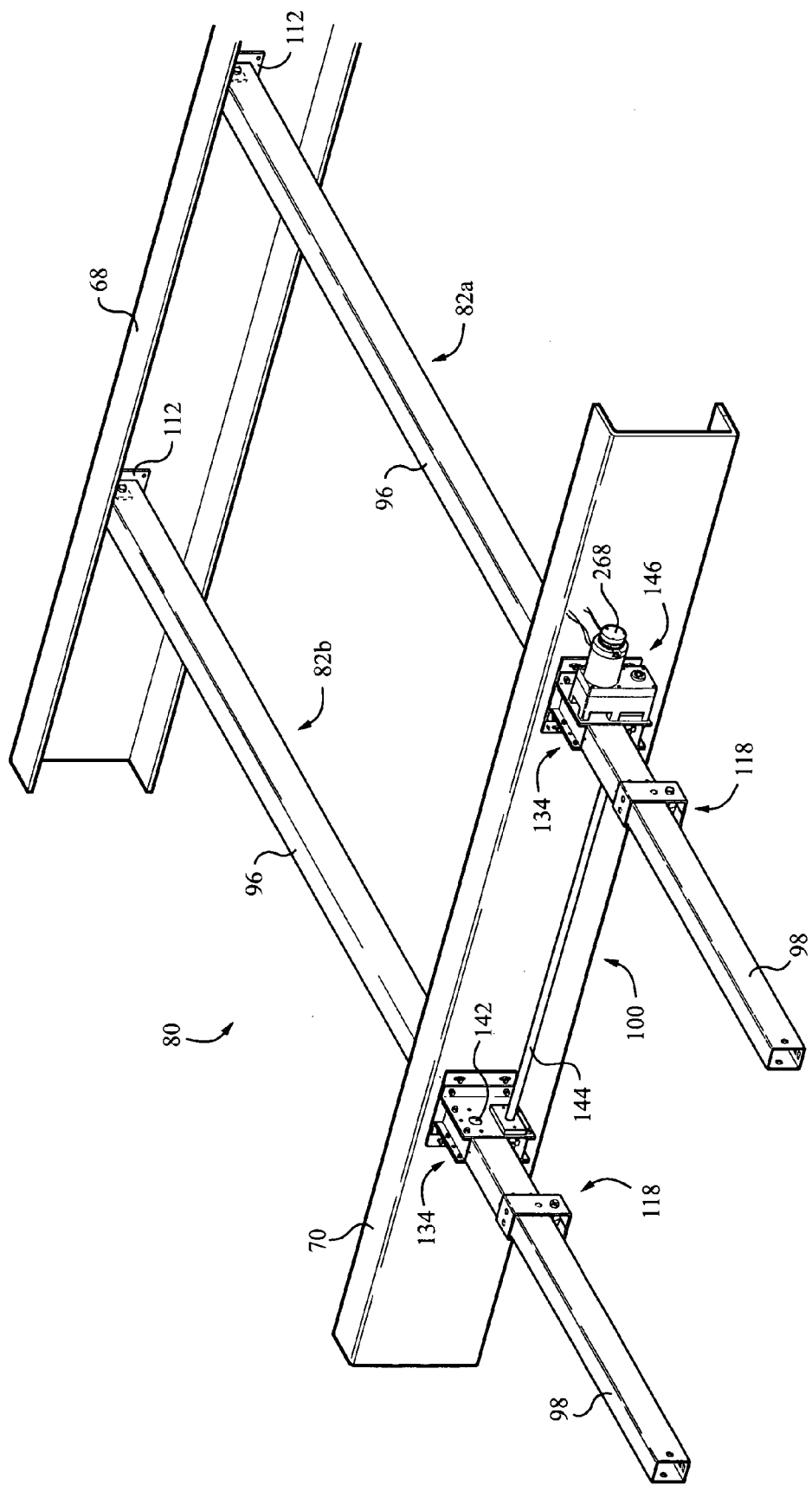
FIG. 15 is perspective view of one embodiment of a slide-out system coupled to the frame of a land vehicle.
Figure 17:
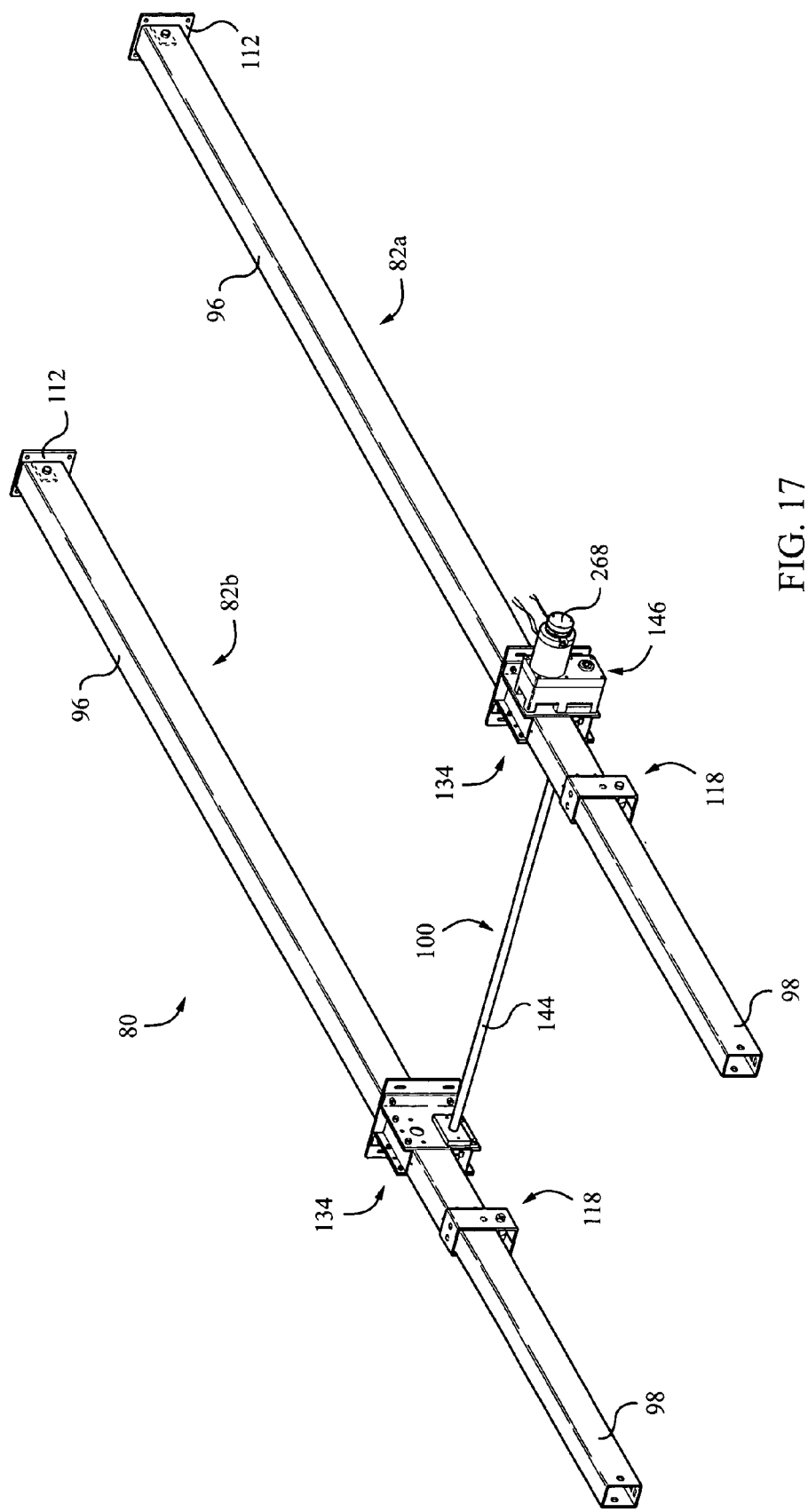
FIG. 17 is a perspective view of one embodiment of a slide-out system.

With reference to FIG. 8, mounting bracket, mounting member, or mounting assembly 112 cooperates with a first end 114 of the first support member 96 to couple the first end 114 to the first frame rail 68. In referring to the mounting bracket 112, it should be understood that one or more distinct portions that are either separate or attached together may be referred to in this manner. Thus, in the embodiment shown in FIG. 8, although only one L-shaped bracket is referred to as the mounting bracket 112, it should be understood that additional brackets, assemblies, portions, etc, may also be used and referenced as the mounting bracket 112. In one embodiment, the mounting bracket 112 pivotally couples the first support member 96 to the first frame rail 68. In another embodiment, the mounting bracket 112 may be used to couple the first support member 96 to one or more of the first frame rail 68, the first floor 58, or a wall portion of the RV 50. In yet another embodiment, the mounting bracket 112 may be used to couple the first support member 96 to the first frame rail 68 in a suitable manner to prevent any movement of the first support member 96 relative to the first frame rail 68. In yet another embodiment, the mounting bracket 112 may comprise a plate that is coupled between the first support member 96 and the first frame rail 68, as shown in FIGS. 15 and 17.

Figure 9:
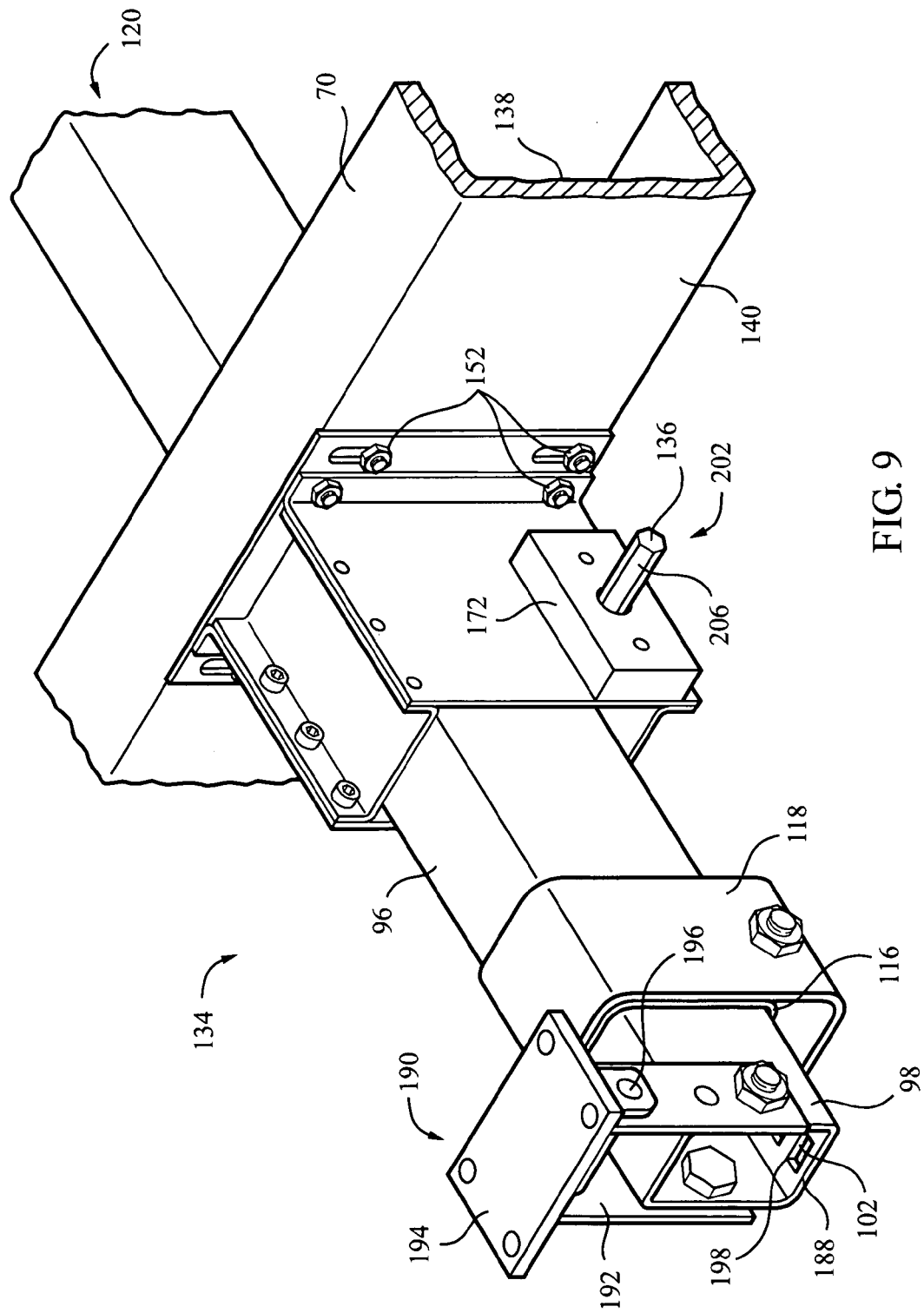
FIG. 9 is a perspective view of a portion of a slide-out system according to one embodiment.

A second end 116 of the first support member 96 extends through the second frame rail 70, as shown in FIG. 9. In alternate embodiments, the first end 114 and the second end 116 are disposed through the first frame rail 68 and the second frame rail 70, respectively. In yet another configuration, the first end 114 and the second end 116 may be coupled to one or both of a lower side or an upper side of the first and second frame rails 68, 70.

As shown in FIG. 9, a support assembly or roller assembly 118 is coupled to the second end 116 of the first support member 96. The support assembly 118 provides support for the second support member 98 as it moves relative to the first support member 96. In one embodiment, the support assembly 118 provides support for the second support member 98 as it extends from the second end 116 of the first support member 96. In another embodiment, the support assembly 118 provides support for the second support member 98 as it extends from an interior channel 120 of the first support member 96.

Figure 10:
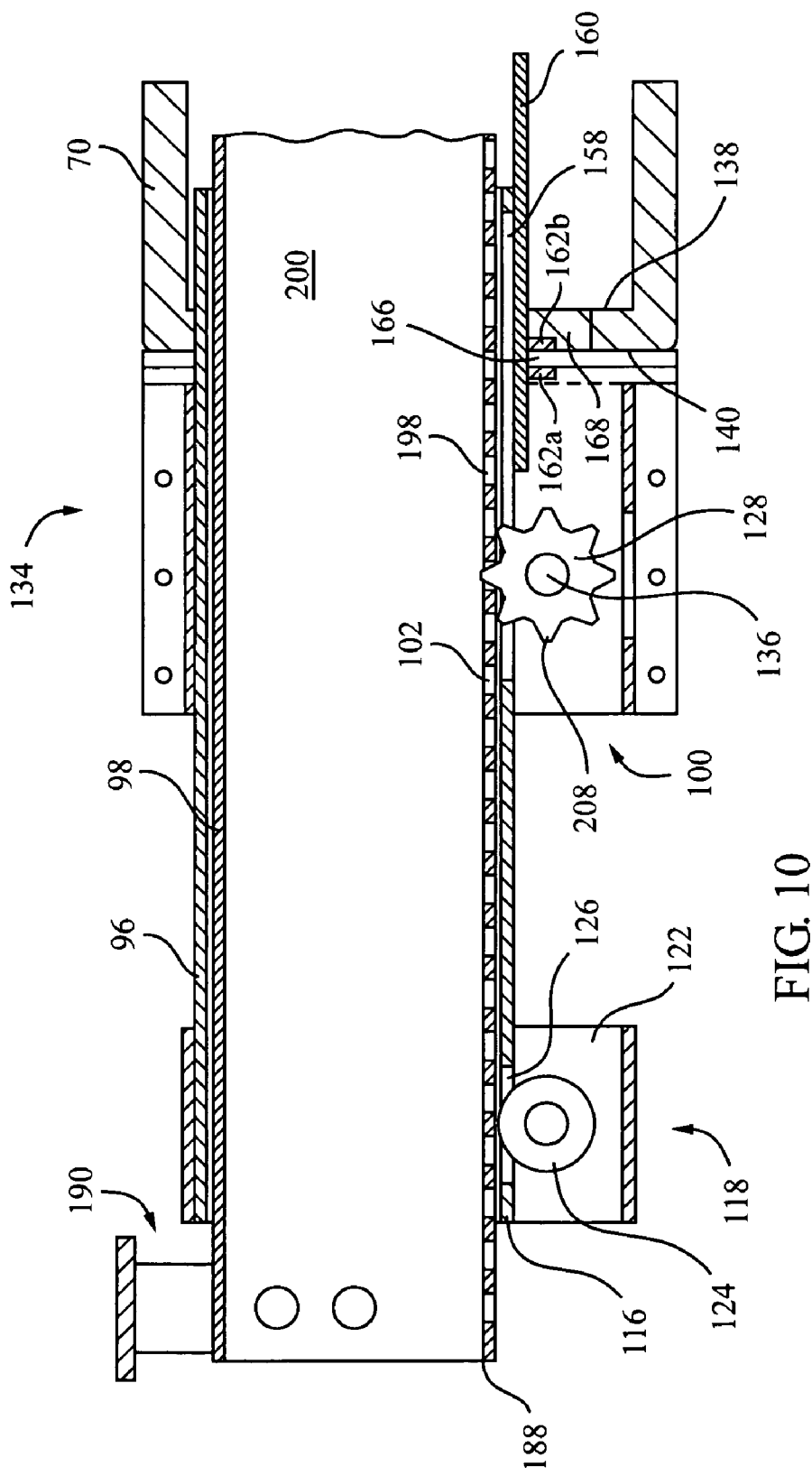
FIG. 10 is a cross-sectional side view of the portion of the slide-out system from FIG. 9.

In one embodiment, the support assembly 118 comprises a support bracket or support member 122 and a roller, movable support member, or friction reducing member 124 as shown in FIG. 10 The roller 124 cooperates with the second support member 98 by way of an opening, aperture, or recess 126 in the first support member 96. As the second support member 98 moves within the channel 120, roller 124 contacts the second support member 98 so that forces applied on the second support member 98 are transferred to the first support member 96 and then to first and second frame rails 68, 70 (FIG. 2). The second support member 98 and the channel 120 have complementary configurations to enable slidable or telescopic engagement one with another. In other embodiments, other suitable devices, mechanisms, or members may be used in place of the roller 124 (e.g., a low friction coating in the channel 120 at the second end 116 of the first support member, etc.).

The support assembly 118 may be coupled to the first support member 96 in any of a number of suitable ways. For example, one or more openings or slots (not shown) may be made in the first support member 96 which receive one or more corresponding tabs 132 (FIG. 16) in the support bracket 122. In one embodiment, three sides of each tab 132 have been cut out so that one side is still connected to the support bracket 122. Once the support bracket 122 has been positioned on the second end 116 of the first support member 96, the tabs 132 may be pushed into the corresponding openings in the first support member 96 (e.g., using a hammer and punch, etc.). In other embodiments, the support assembly 118 may be coupled to the first support member 96 by welding, bolting, screwing, etc. Accordingly, any number of suitable fasteners may be used to couple the support assembly 118 to the first support member 96.

The support assembly 118 may provide a number of desirable features. For example, the use of roller 124 may reduce the friction between the first support member 96 and the second support member 98 at the second end 116 of the first support member. This may prevent excessive wear between the first support member 96 and the second support member 98. Also, the use of the support assembly 118 may reduce the amount of loading at the interface of the drive assembly 100 and the second support member 98 (e.g., where a gear cooperates with a rack, etc.). This may be desirable because the loading can be transferred to the more inexpensive robust roller 124 from the typically more expensive and possibly more sensitive drive assembly 100. Moreover, by supporting the second support member 98 at the second end 116 of the first support member 96, the amount of leverage exerted on the second support member 98 when it is extended may be reduced relative to situations where the second support member 98 is supported primarily at the interface of the drive assembly 100 and the second support member 98. Because of the lower amount of leverage or stress, lighter materials may be used to make the first and second support members 96, 98 resulting in a decrease in weight and/or cost.

In other embodiments, the slide-out system 80 may be configured to not use the support assembly 118. For example, in one embodiment, the drive assembly 100 may comprise a gear, toothed wheel, or sprocket 128 (FIG. 24) which includes one or more support surfaces or support portions 130. The support surfaces 130 may be generally cylindrical in shape and may be about the same diameter as the root diameter of the gear 128. The support surfaces 130 may cooperate with the second support member 98 to support the second support member 98 as it extends from the first support member 96. In this manner, the gear 128 provides at least some of the support that the support assembly 118 may have provided. In another embodiment, the support assembly 118 and the gear 128 comprising the support surfaces 130 may be used in combination to provide even more support to the second support member 98. In other embodiments, the gear 128 may not comprise the support surfaces 130 (FIG. 11) and may still be used without the support assembly 118. There are a wide variety of configurations and embodiments that may be used to support the second support member 98 as it moves relative to the first support member 96.

Returning to FIGS. 8 and 9, disposed between support assembly 118 and mounting bracket 112 is a mounting assembly or mounting bracket 134 which is used to couple the first support member 96 to the second frame rail 70. In the embodiment shown in FIGS. 9 and 10, the mounting assembly 134 supports the drive assembly 100 which comprises a drive shaft, drive member, or drive shaft 136 and the gear 128. In other embodiments, the drive assembly 100 separate from the mounting assembly 134. For example, the drive assembly 100 may be coupled to the first support member 96 using a support bracket or support assembly that is separate from the mounting assembly which is used to couple the slide-out mechanism 82 to the first and second frame rails 68, 70.

Figure 14:
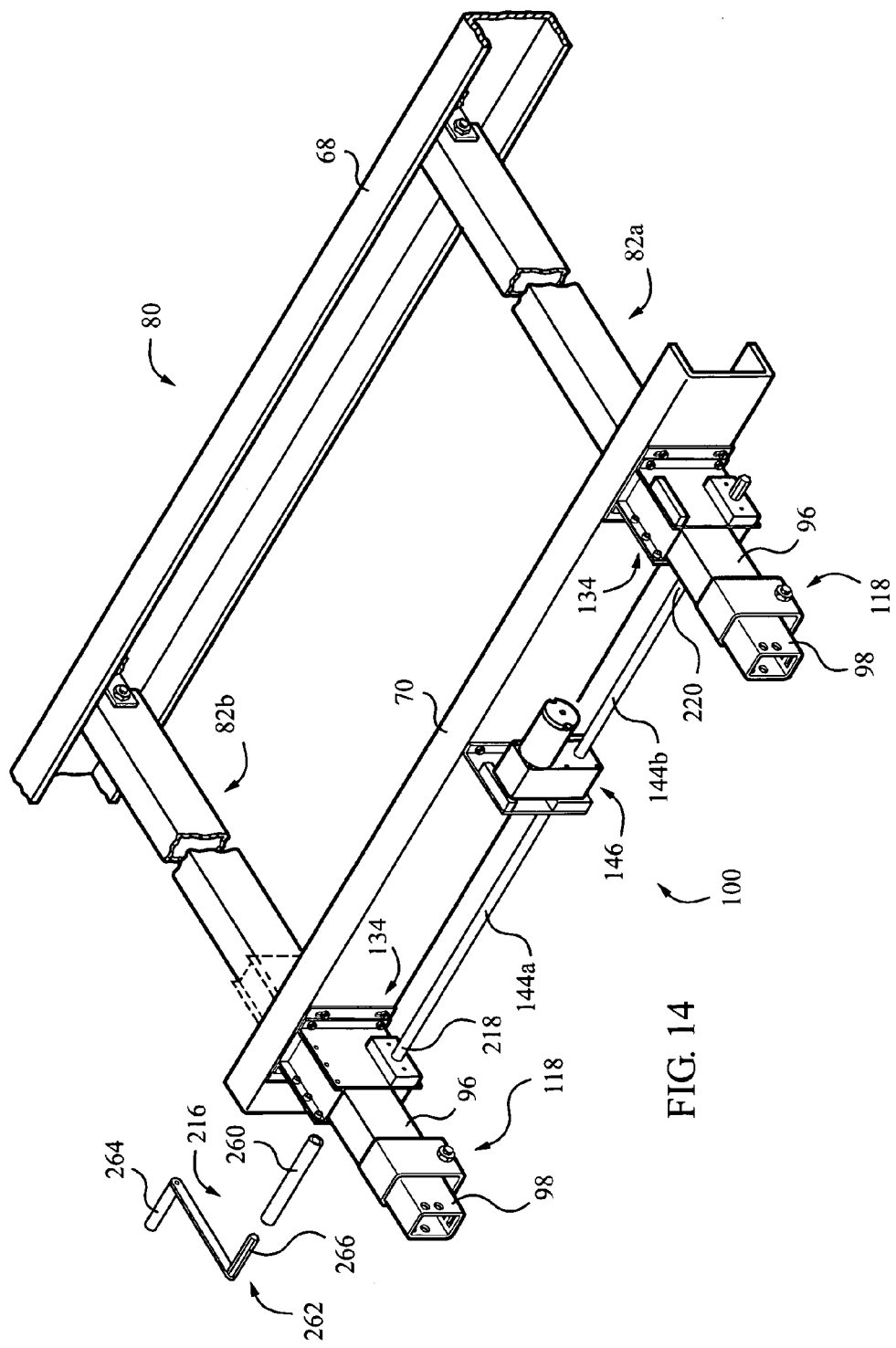
FIG. 14 is a perspective view of one embodiment of a slide-out system coupled to the frame of a land vehicle.
Figure 16:
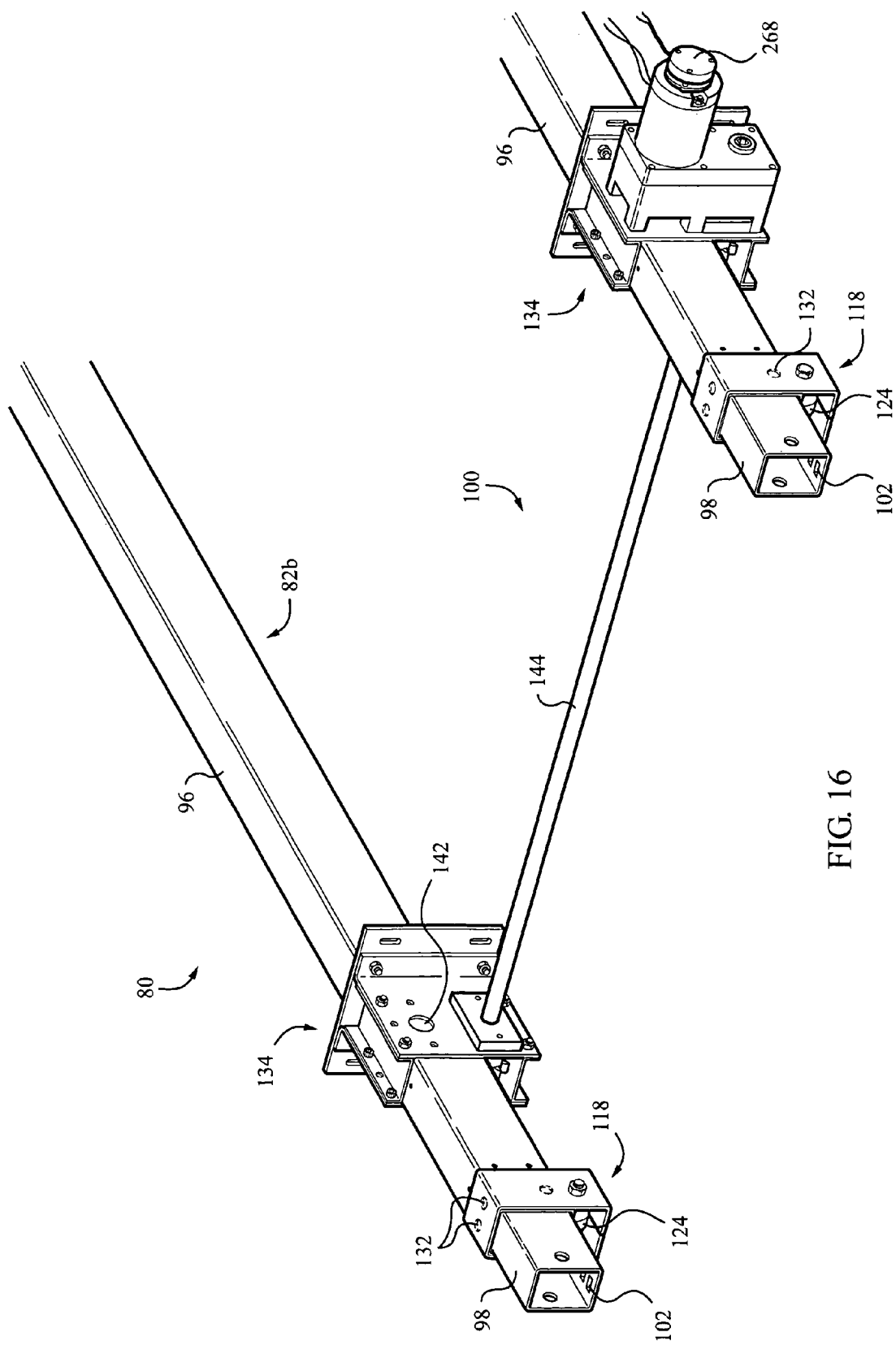
FIG. 16 is a perspective view of one embodiment of a slide-out system.

In one embodiment, mounting assembly 134 may be coupled to a first side or first surface 138 or a second side or second surface 140 of the second frame rail 70, such as is illustrated in FIGS. 12 and 14 by a dotted mounting assembly 134. In a further embodiment, shown in FIGS. 15–17, one mounting assembly 134 is configured to be used interchangeably on either the first side 138 or the second side 140 of the second frame rail 70. In this embodiment, this is accomplished by providing the mounting assembly 134 with two openings 142 which may be used to receive a drive member or drive shaft 144 which is part of the drive assembly 100. As shown in FIG. 16, even when the mounting assembly 134 is rotated 180 degrees along an axis that is longitudinal to the first support member 96 or along an axis that is transverse to the first support member 96 one of the openings 142 may be used to receive the drive member 144. Thus, in this configuration, the mounting assembly 134 is interchangeable so that only one mounting assembly 134 is needed regardless of where the mounting assembly 134 is coupled to the second frame rail 70. Other embodiments of the mounting assembly 134 may also be used that provide similar functionality.

By configuring the slide-out system 80 so that the mounting assembly 134 supports the drive assembly 100 and the mounting assembly 134 may be positioned on the first side 138 or second side 140 of the second frame rail 70, a vehicle manufacturer now has the option to position the drive assembly 100 in multiple locations using generally the same components. Thus, the manufacturer no longer needs to use different slide-out systems based on where the drive assembly 100 or the mounting assembly 134 is positioned. For example, in some situations, the manufacturer may choose to position the mounting assembly 134 on the second side 140 of the second frame rail 70 to permit easy access to the drive assembly for maintenance and repair purposes. In other situations, the manufacturer may choose to position the mounting assembly 134 on the first side 138 of the second frame rail 70 because, for example, the position of the tires on the RV 50 preclude positioning the mounting assembly 134 and/or drive assembly 100 on the second side 140. In other embodiments, the mounting assembly 134 may not be interchangeable and/or may be configured to be mounted to only one side of the second frame rail 70.

The mounting assembly 134 may also be configured to be adjusted vertically relative to the second frame rail 70 and/or longitudinally relative to the first support member 96. Thus, the mounting assembly 134 may be used to adjust the slope of the slide-out mechanism 82 as described previously. Also, because the distance between the first frame rail 68 and the second frame rail 70 may be different on different RVs 50, it may be desirable to configure the mounting assembly 134 and/or the drive assembly 100 to be movable longitudinally relative to the first support member 96 or, broadly speaking, the slide-out mechanism 82. A number of desirable features may be realized by configuring the mounting assembly 134 and/or the drive assembly 100 to be movable longitudinally since this may permit a single configuration of the slide-out system 80 to be adapted to various configurations of RVs 50. For example, on certain RVs 50 it may be desirable to position the drive assembly 100 between the tires and the second frame rail 70. However, in some situations, the space between the tires and the second frame rail 70 is limited. In order to fit the drive assembly 100 in this space, the drive assembly 100 often should be coupled as close to the second frame rail 70 as is practicable. However, due to varying widths between the first frame rail 68 and the second frame rail 70 of various RVs 50, previous versions of slide-out systems had to be made custom for each RV. Because the mounting assembly 134 and/or the drive assembly 100 can be coupled to the first support member 96 at any one of a plurality of locations on the first support member 96, this embodiment of the slide-out system 80 can be used on multiple configurations of RVs 50. In other embodiments, the mounting assembly 134 and/or the drive assembly 100 may be configured to be coupled to the first support member 96 at only one location.

In another embodiment, the drive assembly 100 may be separate from the mounting assembly 134 and may be configured to be movable along a longitudinal axis of the first support member 96. For example, the drive assembly 100 may be coupled to the first support member 96 between the first frame rail 68 and the second frame rail 70 at any one of a plurality of locations. The mounting assembly 134 may also be movable along a longitudinal axis of the first support member 96, however, the drive assembly is not coupled to the mounting assembly 134. The drive assembly 100 may be coupled to a plurality of locations along the first support member 96 in a manner similar to how the support assembly 118 is coupled to the first support member 96. For example, the first support member 96 may include a plurality of holes at various positions which receive tabs from a separate support bracket which is used to couple the drive assembly 100 to the first support member 96. In other embodiments, any number of movable fastening devices, mechanisms, etc. may be used.

Figure 11:
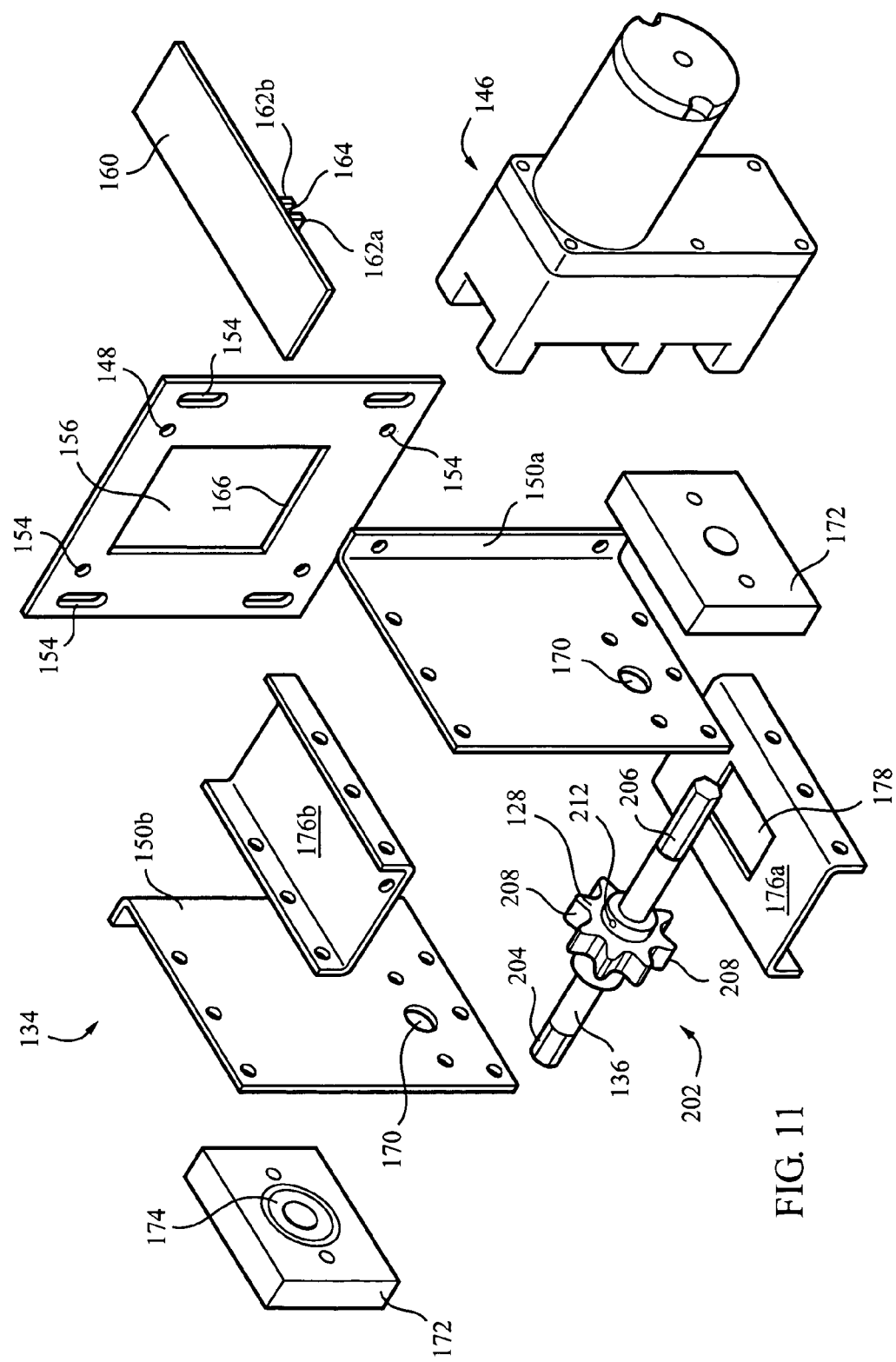
FIG. 11 is an exploded perspective view of a mounting assembly according to one embodiment.

The mounting assembly 134 facilitates coupling the first support member 96 to the second frame rail 70 and/or may support the drive assembly 100 including an optional motorized activation assembly or motor assembly 146 (FIG. 12). The mounting assembly 134, as illustrated in FIG. 11, includes a rail mount 148 and supports, side walls, or support walls 150*a*, 150*b* extending from rail mount 148. Apertures, openings, or holes 154 in the rail mount 148 accommodate fasteners 152 (FIG. 9) (e.g., bolt and nut, screw, etc.) that are used to couple or attach the rail mount 148 to the supports 150*a*, 150*b*, and/or the second frame rail 70. In addition to the apertures 154, rail mount 148 includes a hole, opening, or aperture 156 that is configured to receive the first support member 96 (FIG. 10). Various configurations of hole 156 are possible, so long as the configuration is complementary to that of the first support member 96.

The apertures 154, in one embodiment, are elongated to allow horizontal and/or vertical movement of the rail mount 148 and/or the supports 150*a*, 150*b*, and thus allow horizontal and/or vertical movement of the first support member 96 (FIG. 9). This allows the slide-out mechanism 82 (FIG. 2) to be adjusted horizontally (i.e., in a generally longitudinal direction of the second frame rail 70) or vertically (i.e., in a generally perpendicular direction of the first floor 58) during installation and following a period of use to accommodate for changes in the tolerances of the RV 50. This may be desirable in those situations where the RV 50 has been in use for a time. Although, during construction of an RV 50, the slide-out compartment 72 may have been adjusted to properly fit, during use, however, the dimensions of the slide-out compartment 72 and the body 64 of the recreational vehicle may have changed due to a number of conditions. By adjusting the position of the slide-out mechanism 82 after installation, difficulties such as inefficient sliding, binding, and damage to the sides and floor of both the slide-out compartment 72 and the body 64 of the RV 50 may be reduced. In another embodiment, the slide-out mechanism 82 may be fixed at the second frame rail 70 so that it is unable to be adjusted.

Referring back to FIG. 10, in one configuration, the first support member 96 includes a slot, gap, or space 158 that extends along a portion of the first support member 96 to enable the drive assembly 100 to cooperate with the second support member 98. In the example shown, the slot 158 is configured to allow the drive assembly 100 to be coupled to the first support member 96 at any of a plurality of locations and still allow the drive assembly (e.g., specifically the gear 128 in this embodiment) to cooperate with the second support member 98. In one embodiment, the slot 158 is configured to extend along the underside of the first support member 96 a sufficient distance to allow the slide-out mechanism 82 to be used on a number of different RVs 50 with varying distances between the first frame rail 68 and the second frame rail 70. In one embodiment, the slot 158 may extend along at least about 10%, or, desirably, at least about 20%, or, suitably, at least about 30% of the total distance of the first support member 96. In another embodiment, the slot 158 may be configured to substantially limit, and maybe even prevent, the drive assembly 100 from being coupled at any one of a plurality of positions along a longitudinal axis of the first support member 96.

Disposed at a lower portion of rail mount 148 is a protector member or cover 160 having raised portions, or projections 162*a*, 162*b* that forms a groove, opening, or slot 164 therebetween. The protector member 160 is coupled to rail mount 148 by way of the raised portions 162*a*, 162*b*, and the groove 164 so that protector member 160 covers or overlays slot 158 in the first support member 96, as shown in FIG. 10. In one embodiment, a bottom side 166 of the hole 156 of the rail mount 148 is configured to receive the groove 164 of the protector member 160. Once the first support member 96 is positioned in the hole 156, protector member 160 is unable to move due raised portions 162a, 162b engaging the bottom side 166 as shown in FIG. 10. It should be noted that in the embodiment shown in FIG. 10, an opening or hole 168 in the second frame rail 70 which the first support member extends through is larger than the hole 156 in the rail mount 148. This allows the protector member 160 to be positioned as shown in FIG. 10 and also provides the ability to vertically adjust the slide-out mechanism 82 at the second frame rail 70. In other embodiments, the protector member 160 may be coupled to the rail mount 148 or second frame rail 70 using welds, adhesives, or other suitable ways of coupling or linking.

The use of the protector member 160 and/or the slot 158 may provide a number of desirable features. For example, the protector member 160 may reduce or stop debris from entering between the first support member 96 and the second support member 98 or inside the first and second support members 96, 98 during use of the slide-out system 80. The elongated characteristics of both the slot 158 and the protector member 160 may aid with positioning the mounting assembly 134 upon the first and/or second frame rails 68, 70. For instance, when the mounting assembly 134 is coupled to the second side 140 of the second frame rail 70, the protector member 160 extends away from the second end 116 of the first support member 96. However, when the mounting assembly 134 is coupled to the first side 138 of the second frame rail 70, the protector member 160 extends toward the second end 116 of the first support member 96. In both instances, the protector member 160 at least partially covers or overlays the slot 158.

As shown in FIG. 11, each support 150a, 150b includes a hole or opening 170 that receives the drive shaft 136 of the drive assembly 100. Each hole 170 may receive a bushing or bearing(not shown) that reduces the frictional contact between the drive shaft 136 and supports 150a, 150b as the drive assembly 100 cooperates with the second support member 98, as illustrated in FIG. 10. Returning to FIG. 11, each support 150a, 150b supports, cooperates with, or is coupled to a bearing block or support member 172. A bearing 174, such as a plain bearing, a ball bearing, roller bearing, or other bearing, coupled to or held by the bearing block 172 receives the drive shaft 136 and aids with reducing friction between the drive assembly 100 and the supports 150a, 150b. Each bearing block 172 is coupled to one of the supports 150a, 150b so that the bearing 174 is in close proximity to the support member. This configuration seals the bearing 174 and reduces or prevents debris from encroaching on the bearing 174 to reduce the bearing's 174 friction-reducing capabilities. It should be understood that the bearing 174 may be a sealed or unsealed bearing, whether or not the bearing block 172 "seals" the bearing 174 relative to one of the supports 150a, 150b.

Extending between the supports 150a, 150b are cross-members 176a, 176b. The cross-members 176a, 176b provide structural support to the supports 150a, 150b and may limit torquing of the mounting assembly 134 as the drive assembly 100 cooperates with the second support member 98 (FIG. 10). A gear aperture 178 formed in cross-member 176a which cooperates with the gear 128 to allow gear 128 to rotate as the second support member 98 moves to extend or retract slide-out compartment 72 or slide-out patio 104 (FIGS. 2–7). In other embodiments, cross-member 176a may be configured to not include the gear aperture 178.

The above-described mounting assembly 134 illustrates only one configuration or series of configurations of a mounting assembly that may be used as part of the slide-out system 80. One skilled in the art will understand that various other configurations of the mounting assembly 134 are possible. For instance, the mounting assembly 134 may be devoid of the rail mount 148, with the support members 150a, 150b being coupled or attached to the first frame rail 68, the second frame rail 70 and/or the first support member 96. In another configuration, the first support member 96 may be attached directly to the first frame rail 68 or the second frame rail 70, with the mounting assembly 134 only being coupled to the first support member 96. In still another configuration, the mounting assembly 134 may include only one or both the support members 150a, 150b.

Returning to FIG. 8, the second support member 98, in one embodiment, has a first end 180 that cooperates with the channel 120 of the first support member 96. The first end 180 includes an opening, hole, or aperture 182 through which extends a rear roller, rotating support member, or movable support 184. The rear roller 184 is rotatably coupled to the first end 180 of the second support member 98 by way of a rear roller shaft 186 and cooperates with a surface (e.g., an interior surface) of the channel 120. The rear roller 184 rotates about the rear roller shaft 186 to aid with moving the second support member 98 relative to the first support member 96 as slide-out compartment 72 (FIG. 1) is extended or retracted. Alternatively, the rear roller 184 may remain substantially stationary relative to the rear roller shaft 186 as the rear roller shaft 186 rotates. The rear roller 184 and the rear roller shaft 186 may be fabricated from metals, polymers, natural materials, synthetic materials, or combinations thereof.

Coupled to a second end 188 of the second support member 98, as shown in FIG. 9, is compartment mount or bracket 190 which is used to couple the second end 188 to the slide-out compartment 72 and/or the slide-out patio 104 (FIGS. 2–7). The compartment mount 190 includes a support bracket 192 that extends from the second support member 98 towards the slide-out compartment 72 (FIG. 2-7). The bracket 192 may be fixably or pivotally mounted to the second support member 98. In this manner, the second support member 98 may be movably or pivotally coupled to the slide-out compartment 72. As shown in FIG. 9, the compartment mount 190 is configured to pivot on an axis that is substantially transverse to the second support member 98. However, in other embodiments, the compartment mount 190 may pivot on an axis that is substantially longitudinal to the second support member 98. In yet another embodiment, the compartment mount 190 may be configured in any direction (e.g., ball and socket type mount, etc.). Pivotally coupled to the bracket 192 is an attachment member, support member, or plate 194. The attachment member 194 is coupled to the second floor 84 (FIGS. 2–5) so that movement of the second support member 98 relative to the first support member 96 causes the slide-out compartment 72 (FIG. 1) to extend or retract.

In some situations, as the second support member 98 moves relative to the first support member 96, the angular orientation of slide-out compartment 72 (FIG. 1) relative to bracket 192 varies (e.g., when the second floor 84 moves between the first position 74 where the second floor 84 is positioned adjacent to the first floor 58 and the second position 76 where the second floor 84 is flush with the first floor 58). The pivotal relationship of the attachment member 194 to the bracket 192 accommodates for these changes in the angular orientation of slide-out compartment 72 (FIG. 1) relative to the first support member 96. In other embodiments, the second support member 98 may be coupled to the slide-out compartment 72 without any relative movement between the slide-out compartment 72 and the second support member 98 (e.g., the use of a rigid compartment mount 190).

In one embodiment, a pin or shaft 196 is used to pivotally couple the bracket 192 to the attachment member 194. The attachment member 194 pivots about a longitudinal axis of the pin 196 as the second support member 98 moves relative to the first support member 96. Although reference is made to use of pin 196, one skilled in the art may appreciate that various configurations, devices, mechanisms, etc. may be used to pivotally couple the bracket 192 to the attachment member 194. For instance, one or more pins may be used to couple the bracket 192 to the attachment member 194. In another configuration, a ball and socket joint may be used to couple the bracket 192 to the attachment member 194.

As shown in FIGS. 9 and 10, the second support member 98 includes the engaging portion 102 which cooperates with the drive assembly 100 to move the second support member 98 relative to the first support member 96. The engaging portion 102 and the corresponding portion of the drive assembly 100 may be configured in a variety of ways to provide the desired movement. For example, in one embodiment, the engaging portion 102 may include a roller chain which is configured to cooperate with the sprocket 128. The roller chain may be welded, bolted, etc. to the second support member 98. In another embodiment, the drive assembly 100 may include a rotating member that includes a plurality of holes which are configured to cooperate with a plurality of projections on the second support member 98. In yet another embodiment, the engaging portion 102 may comprise a rack which includes a plurality of teeth that cooperate with the gear 128 of the drive assembly 100.

In one embodiment, the engaging portion 102 of the second support member 98 includes one or more holes, slots, openings, spaces, or apertures 198 formed in a side wall (e.g., lower side wall, etc.) of the second support member 98. The holes 198 cooperate with the drive assembly 100 to allow movement of the second support member 98. The holes 198 may have any configuration so long as the holes 198 cooperate and at least partially receive at least a portion of the drive assembly 100. For example, the plurality of holes 198 may be configured to cooperate with the gear 128 to move the second support member 98. In one configuration, each hole 198 may be configured receive all or a portion of a tooth of the gear 128 of the drive assembly 100. The holes 198 may be formed in the second support member 98 by stamping, molding, machining, laser cutting, etc.

In one embodiment, the second support member 98 has a generally tubular configuration. This configuration may be achieved through a single extruded or cast member or from one or more members that collectively form the tubular structure of the second support member. In another configuration, the second support member may be a substantially solid member having recesses formed therein to function or act as the holes 198. In another configuration, one or more tubular members and/or one or more solid members form the second support member. In still another configuration, the second support member may have a generally C or U-shaped configuration, with the side of the second support member having the open portion being adapted to cooperate with the roller and the roller shaft. Also, the side of the second support member having the open portion may be coupled to another portion of the RV 50, such as but not limited to, the first floor 58, the front wall, the rear wall 52, the first wall 54, and/or the second wall 56. A fixable or removable cap may be secured to the second support member to cover the open portion and prevent debris from entering into an interior of the first support member. In still another configuration, the portion opposite the open portion is adapted to cooperate with roller and the roller shaft, the rails, the first floor 58, the second floor 84, the front wall, the rear wall 52, the first wall 54, and/or the second wall 56 of the RV 50 or the slide-out compartment 72.

It will be appreciated that although the second support member 98 is depicted as having a substantially square cross-section, various other configurations of the second support member 98 may be used, such as, but not limited to, rectangular, oval, polygonal, or other cross-sections that provide the desired strength and functionality characteristics.

It may be appreciated that because of the configuration of the second support member 98, the effectiveness of drive assembly 100 to move the second support member 98 relative to the first support member 96 is not reduced by debris lodged within the holes 198. In some existing devices, debris may become lodged between the teeth of the rack or pinion. As the teeth mesh during movement of the slide-out compartment 72, accumulated debris is forced into the grooves between adjacent teeth. Some debris may be displaced from the sides of the grooves when the debris is sufficiently viscous to flow outwardly under the influence of a component of force directed toward the bottom of the groove. This force is generally perpendicular to the surface of the groove between adjacent teeth. Over time, the accumulated debris may prevent engagement of the rack and pinion, resulting in failure of the mechanism moving the slide-out compartment. In contrast, as shown in FIG. 10, the holes 198 communicate with an interior channel 200 of the second support member 98 that may receive accumulated debris in a manner that limits the potential for debris to accumulate within the holes 198 to a sufficient degree that the teeth of the gear 128 are unable to engage with the holes 198. This is made possible, in one embodiment, through each tooth of the gear 128 forcing accumulated debris through holes 198 and into the interior channel 200 of the second support member 98. In this configuration, the direction of the debris is generally parallel to the direction of the applied force by the tooth.

The modular characteristics of the slide-out mechanism 82 allow the drive assembly 100 to include numerous different and additional components that facilitate moving the slide-out mechanism 82 and optionally one or more other slide-out mechanisms 82 that may be coupled thereto. Depending upon the particular configuration of the slide-out compartment associated with the recreational vehicle, one or more slide-out mechanisms may be connected together in a manner that allows the rotational motion of one gear to be translated or transferred to rotational motion of another gear of another slide-out mechanisms. In other words, the drive assembly 100 may be configured to move multiple gears 128 and/or second support members 98 from multiple slide-out mechanisms 82 in unison.

With reference again to FIG. 5, a gear assembly or gear mechanism 202, which is part of the drive assembly 100, includes the drive shaft 136 and the gear 128. The drive shaft 136 is sized to fit within the bearing block 172 and the hole 170. The drive shaft 136, in one embodiment, has a generally cylindrical configuration. A first shaft end 204 and a second shaft end 206 of the drive shaft 136 are shaped to engage with the motor assembly 146, the drive member 144 (FIG. 12), or other structures that will be discussed in more detail hereinafter. As shown, in this embodiment, the first and second ends 204, 206 are generally hexagonal. It will be appreciated by one skilled in the art that the first and second ends 204, 206, and more generally the drive shaft 136, may have various other cross-sectional configurations, such as by example and not limitation, square, octagonal, triangular, oval, polygonal, or the like. In another embodiment, the drive shaft 136 has a generally hexagonal form with two cylindrical portions that cooperate with one or more bushings and/or bearing blocks.

In one embodiment, the drive assembly 100 uses the gear 128 to cooperate with the second support member 98. In this embodiment, the gear 128 is adapted to cooperate with the drive shaft 136 and has a generally cylindrical form with a plurality of teeth, protrusions, or projections 208 extending outwardly from a surface thereof. The teeth 208 are configured to cooperate with the holes 198 in the second support member 98, as shown in FIG. 10. Returning to FIG. 11, the gear 128 has an axial hole (not shown) sized to cooperate with the drive shaft 136. In this embodiment, the axial hole has a generally cylindrical configuration, however, various other cross-sectional shapes are possible as long as the axial hole cooperates with the drive shaft 136.

Figure 26:
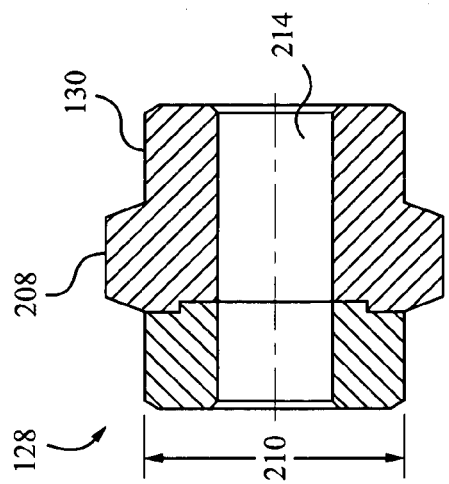
FIG. 26 is a side elevational view of the gear in FIG. 24.
Figure 25:
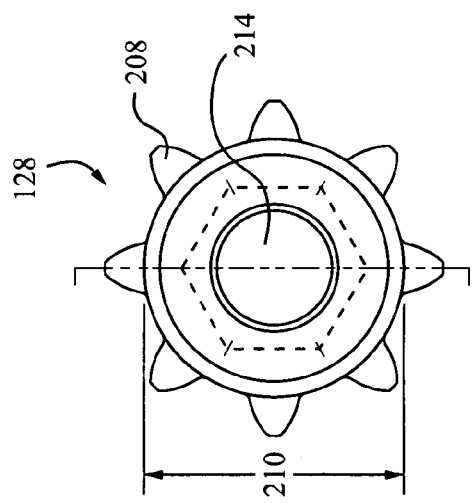
FIG. 25 is a top plan view of the gear in FIG. 24.
Figure 24:
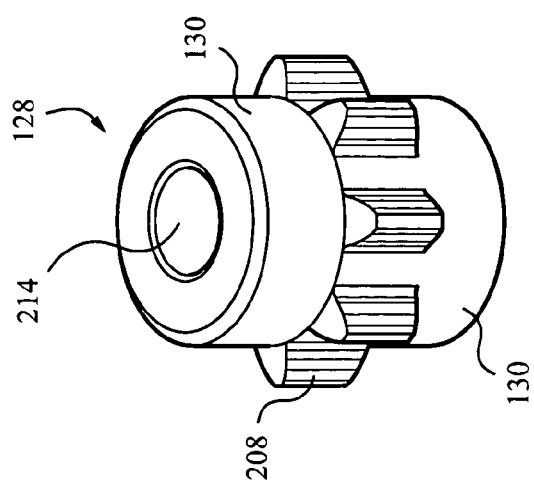
FIG. 24 is a perspective view of a gear which may be used in one embodiment of a slide-out system.

Referring to FIGS. 24–26, the gear 128 may be configured in a number of suitable ways. For example, in is often desirable to provide a small gear to reduce the distance that the slide-out mechanism 82 extends from the underside of the RV 50 and to provide a reduced travel distance of the second support member 98 for each rotation of the gear. However, the smaller the gear 128 is, the more difficult it is for the teeth 208 of the gear 128 to mesh with the holes 198 in the second support member 98. Thus, in many previous devices, the gear 128 is often 6 to 10 inches in diameter to provide for easier meshing between the holes 198 and the teeth 208. In contrast, in one embodiment of gear 128, a root diameter of the gear 128, shown in FIGS. 25 and 26 by reference number 210, is no more than about 3 inches, or, desirably, no more than about 2.5 inches, or, suitably, no more than about 2 inches, or, even more suitably, no more than about 1.5 inches in diameter. Thus, in one embodiment, the root diameter 210 of the gear 128 may be between about 1 inches and about 3 inches. In one suitable embodiment, the root diameter 210 of the gear 128 is about 1.25 inches. Of course, in other embodiments, the root diameter 210 of the gear 128 may also be greater than 3 inches and even greater than 10 inches, if desired.

In one embodiment, retaining holes 212 formed in the gear 128 and the drive shaft 136 may be aligned to receive a securing pin (not shown) that prevents the gear 128 from slipping relative to the drive shaft 136 as the drive shaft 136 rotates to extend or retract the slide-out compartment 72. Alternatively, the drive shaft 136 and an axial hole 214 (FIG. 24) may have complementary shapes such that the complementary shape limits any slippage that might occur between drive shaft 136 and axial hole 214.

One skilled in the art will appreciate that various other configurations of the drive assembly 100 are capable of performing the function thereof. For example, the gear 128 may be welded, brazed, or joined to the drive shaft 136. In another embodiment, the drive shaft 136 may include pinholes that accommodate split pins that prevent the drive shaft 136 from being retracted from holes 170. In another embodiment, the drive shaft 136 may include two gears 128 that cooperate with the second support member 98 having two sets of holes. In still another embodiment, the gear 128 may be retained on the drive shaft 136 solely through the combination of two or more of a retaining hole and a securing pin.

The gear 128 and the drive shaft 136 may be manufactured from various types of material, such as by way of example and not by way of limitation, metal, composites, plastics, synthetic materials, combinations thereof, or the like. In one embodiment, the drive shaft 136 and the gear 128 are fabricated from steel. While in this embodiment the drive shaft 136 and the gear 128 are composed of the same material, this is not required.

The drive assembly 100 may cooperate with various members, components, and mechanisms to enable a single motor assembly 146 to drive one or more gear assemblies 202. In one embodiment, as shown in FIG. 12, this may be done by coupling the ends of the drive shaft 136 to the drive member 144, the motor assembly 146, or some other structure that aids with driving the gear assembly 202 and/or moving the second support member 98, whether manually or mechanically.

Referring to FIG. 12, one configuration of one embodiment of the slide-out system 80 is shown. As shown in this embodiment, the drive assembly 100 comprises the drive member 144, two gear assemblies 202, the motor assembly 146, and/or a manual activation assembly or crank 216. As shown, the motor assembly 146 cooperates with the drive member 144 to translate the rotational motion of one gear assembly 202 of one slide-out mechanism 82*a* to another gear assembly 202 of another slide-out mechanism 82*b*. The drive member 144 is typically used in those instances when more than one slide-out mechanism 82 is being used in the slide-out system 80. The drive member 144 may function to join two adjacent slide-out mechanisms 82 or may form part of a timing mechanism that allows adjacent slide-out mechanisms 82 to be aligned so that the second support members 98 are extended the desired amount on each slide-out mechanism 82 to provide the desired cooperation with the second wall 56 of the RV 50.

In one embodiment, the second support members 98 may be timed so that they are extended substantially the same distance from the second frame rail 70. However, in other embodiments, the second support member 98 may be timed so that they are at different distances from the second frame rail 70 (e.g., this may be desired in situations where the second support member 98 may not be coupled to the same location on the slide-out compartment 72). Further, as illustrated in FIG. 14, multiple drive members 144 may be used to connect adjacent slide-out mechanisms 82 with motor assembly 146 disposed there between. In general, the function of the timing mechanism is to enable the user to selectively adjust the slide-out system between a first configuration where the slide-out mechanisms 82 move in unison and a second configuration where at least one of the slide-out mechanisms 82 may be moved independent of another one of the slide-out mechanisms 82. In one embodiment, this is accomplished using telescopic movement of a component of the drive assembly 100 (e.g., the drive member 144, a coupler (not shown), etc.)

The drive member 144 may be configured in a number of suitable configurations. For example, the drive member 144 may have a generally elongated form with a first connector end 218 and a second connector end 220. The first end 218 and the second end 220 are hollow, or, alternatively, have a recess, opening or space (not shown), and are adapted to cooperate or receive an end of the drive shaft 136. By coupling the drive shafts 136 of adjacent slide-out mechanisms 82 together with the drive member 144, rotational motion of one drive shaft 136 is translated into rotational motion of the adjacent drive shaft 136. When a plurality of drive shafts 136 are coupled by a plurality of drive members 144, rotational motion of one drive shaft 136 is translated into rotational motion of one or more other drive shafts 136.

Referring to FIGS. 18–21, a number of embodiments of the drive assembly 100 are shown being used as a timing assembly. In one embodiment, the drive member 144 may be selectively adjustable between a first orientation or first position 222 (FIG. 19) where the second support members 98 move in unison to a second orientation or second position 224 (FIG. 20) where one of the second support members 98 is movable independent of another one of the second support members. In one embodiment, this may be accomplished by reducing the length of the drive member 144 to accommodate a spring or biasing member 226 disposed between one end of the drive member 144 and the bearing block 172 of the mounting assembly 134. Referring to FIG. 19, moving the second end 220 of the drive member 144 toward the spring 226 depresses the spring and drivably disengages the first end 218 from the drive shaft 136a. Upon being disengaged, the drive member 144 may be rotated to turn the drive shaft 136b, thereby modifying the starting position of the drive shaft 136b and the relevant second support member 98. Once the desired rotation is achieved, the drive member 144 may be released to reengage the drive shaft 136a.

In the embodiment, shown in FIGS. 18 and 19, the drive shaft 136a includes an engaging portion 228 and a disengaging portion 230. When the drive member 144 is positioned so that the first end 218 is drivably disengaged from the drive shaft 136a, the first end 218 is still supported by the disengaging portion 230 of the drive shaft 136a. In this manner, the drive member 144 may be drivably disengaged from the drive shaft 136a while not being completely removed from the drive shaft 136a. Thus, the drive shaft 136a may provide support for the drive member 144 while adjacent slide-out mechanisms 82 are drivably disengaged from each other. This may make it easier to time the adjacent slide-out mechanisms 82. In another embodiment, the drive member may be completely decoupled from the drive shaft 136a.

Referring to FIG. 21, another embodiment of the drive assembly 100 is shown where the drive assembly 100 may be selectively moved between the first orientation 222 (i.e., engaged orientation) and the second orientation 224 (i.e., disengaged orientation). In this embodiment, the drive assembly 100 may be configured to be selectively coupled to and/or decoupled from the drive shafts 136a, 136b. This may be accomplished using a spacer 232 which is configured to be selectively positioned on the drive shaft 136a. In one embodiment, the spacer 232 comprises a slit 234 and is made of a resilient organic material (e.g., plastic tubing, hard rubber tubing, etc.). Desirably, spacer 232 is made:of a material that allows the slit 234 to be selectively opened to a degree sufficient to fit over the drive shaft 136a and closed to prevent the spacer 232 from coming off the drive shaft 136a. Also, spacer 232 may be made of a suitable material to resist compression from the first end 218 of the drive member 144 moving toward the spacer 232.

When the spacer 232 is positioned on the drive shaft 136a, the drive assembly 100 functions substantially as described in relation to FIGS. 18–20. However, when the spacer 232 is removed from the drive shaft 136a, then the first end 218 of the drive member 144 may be moved toward the bearing block 172 coupled to the drive shaft 136a to decouple the second end 220 from the drive shaft 136b. The first end 218 of the drive member 144 may then be moved the opposite direction to decouple the first end 218 from the drive shaft 136a, thus completely removing the drive member 144 from between adjacent slide-out mechanisms 82. The drive member 144 may be coupled between adjacent slide-out mechanisms 82 in reverse fashion.

Figure 13:
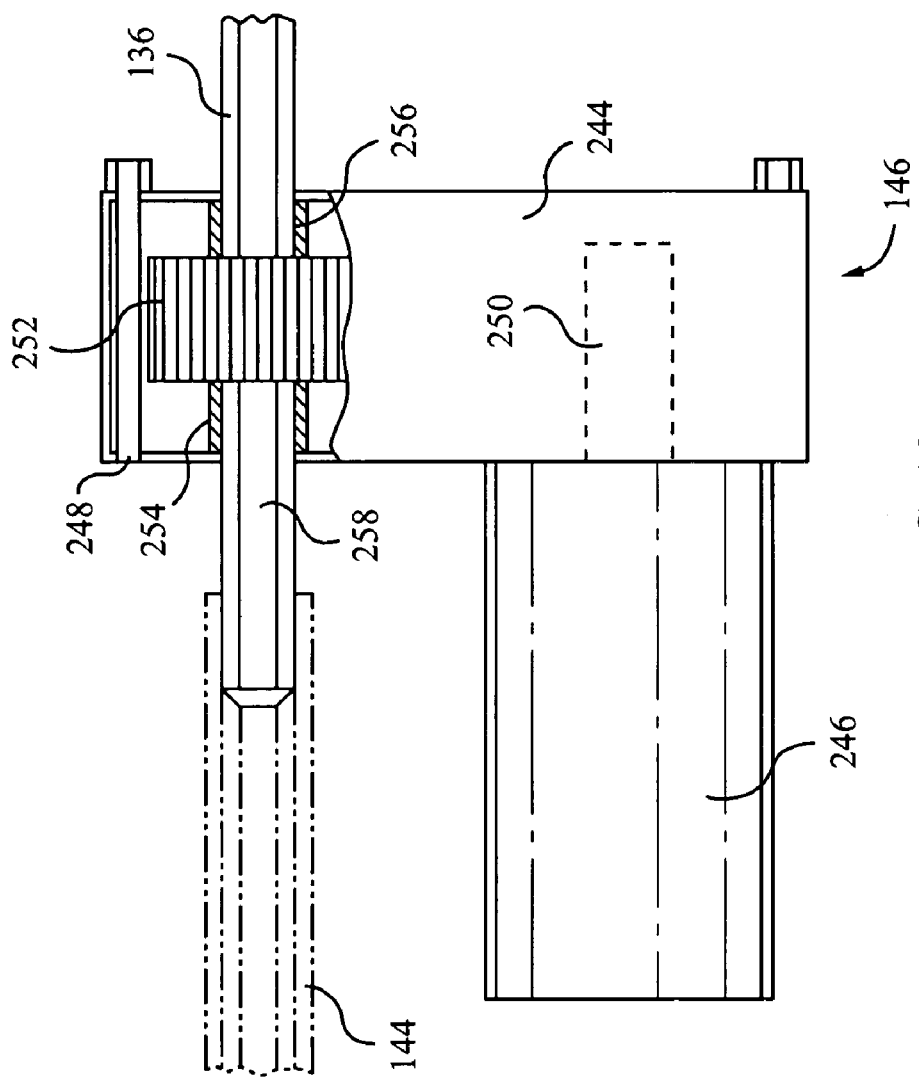
FIG. 13 is a partial sectional side view of a motor assembly of one embodiment of a slide-out system.

In another embodiment, a quick release arrangement such as that shown in FIGS. 13 and 14 of U.S. Pat. No. 6,338,523, which is incorporated herein by reference in its entirety (the entire patent not just FIGS. 13 and 14), may be coupled between adjacent slide-out mechanisms 82 to selectively adjust the slide-out mechanisms between the first position 222 where the slide-out mechanisms 82 operate in unison and the second position 224 where the slide-out mechanisms 82 do not operate in unison. The quick release arrangement referred to uses a coupler that telescopes between an engaged position where two adjacent shafts are drivably engaged and a disengaged position where two adjacent shafts are drivably disengaged.

Referring to FIGS. 22 and 23, in one embodiment, the first end 218 of the drive member 144 includes an interior channel 236 and the second end of the drive member 144 includes an interior channel 238. As shown in FIGS. 22 and 23, the channel 236 is defined by a surface having twelve facets 240, while the channel 238 is defined by a surface having six facets 242. This configuration allows the user to compensate for deviations in the squareness of slide-out compartment 72 (FIG. 1) by rotating the drive member 144 in increments of $\frac{1}{12}$th of a complete rotation. This feature may provide the ability to finely adjust the position of adjacent slide-out mechanisms 82 relative to each other. When this feature is combined with the use of a smaller gear as described above, the adjustment may be even finer. It will be appreciated that the drive member 144 may be configured to use various numbers of facets to define the interior channels 236, 238 thereby providing a different number of increments of rotation (e.g., the drive shaft 136a may have a square cross-section and the first end 218 may include eight facets 240, etc.). In other embodiments, the number of facets 240, 242 may be same.

Although reference is made herein to use of one spring 226, one skilled in the art may appreciate that two springs 226 may be used, with one spring positioned at each end of the drive member 144. In still another embodiment, one or more springs 226 are used at each end of drive member 144.

Referring back to FIG. 12, it may be desirable to move the slide-out compartment 72 (FIG. 1) using an activation assembly, such as the motorized activation assembly 146 or the manual activation assembly 216. The slide-out system 80 is configured to work with either one.

One embodiment of the motorized activation assembly or motor assembly 146 is depicted in FIG. 13. As shown, the motor assembly 146 is depicted as being coupled directly to the drive shaft 136. The motor assembly 146, however, may be disposed at a variety of locations relative to one or more slide-out mechanisms 82 and provide structures that allow the motor to be coupled to the drive shaft 136. For instance, the motor assembly 146 may be disposed between two slide-out mechanisms 82a, 82b as shown in FIG. 14. Further, the motor assembly 146 may be coupled to the first frame rail 68 or the second frame rail 70 through use of an optional bracket without using mounting assembly 134.

As shown, the motor assembly 146 includes a housing or motor housing 244 that cooperates with an electric motor 246. The housing 244 includes one or more apertures 248 that may receive fasteners (not shown) to couple the motor assembly 146 to supports 150a, 150b (FIG. 11). Alternatively, apertures 248 may receive fasteners (not shown) to couple directly to the first frame rail 68 or the second frame rail 70 (FIG. 2) or couple to a bracket that in turn is coupled to the first frame rail 68 or the second frame rail 70.

Disposed within the housing 244 are one or more gears or linkages (not shown) that translates rotational motion of a motor shaft 250 of motor 246 to rotational motion of a gear 252 mounted to a drive shaft 254. Although reference is made to use of motor 246, various other types of motors may be used, such as, but not limited to, pneumatic, oil, gasoline, or the like.

In one embodiment, the motor assembly 146 may be configured to drive the drive member 144, the gear 128, the second support members 98 without the use of reduction gearing. For example, in one embodiment, the motor shaft 250 may be configured to rotate at about the same rate as the gear 128, the drive member 144, and/or the second support members 98. In one embodiment, this may be accomplished using the smaller gears referred to previously. In many current devices, the use of a large gear combined with relatively high speed motors often requires the use of reductions gears. However, it may be desirable to eliminate the reduction gears to reduce the weight and complexity of the slide-out system 80. In another embodiment, the motor assembly 146 may comprise a reduction gear assembly.

In another embodiment, the motor 246 may include a brake 268 that may be used to prevent the motor 246 from moving when the power is off. For example, the brake 268 may be used to hold the slide-out compartment 72 in the retracted position and forming a good seal with the second wall 56.

The drive shaft 254 includes a drive recess 256 configured to cooperate with the drive shaft 136. The recess 256 may have various configurations so long as the recess 256 cooperates with the drive shaft 136. For instance, the recess 256 may be hexagonal, square, octagonal, triangular, oval, star-shaped, polygonal, or other configurations that facilitate mating between the recess 256 and the drive shaft 136 in driving engagement. In another configuration, the drive shaft 254 extends to cooperate with the drive member 144, shown in dotted lines. In still another configuration, the drive shaft 254 extends to cooperate with the drive member 144, while including a portion of the recess 256 to accommodate the drive shaft 136. In still another configuration, the recess 256 may accommodate one or more removable shafts 258 that may couple the motor assembly 146 to one or more drive members 144, such as when the motor assembly 146 is disposed between the two slide-out mechanisms 82a, 82b and drivingly engages with two or more drive members 144a and 144b, as illustrated in FIG. 14.

With continued reference to FIG. 12, in addition to the motor assembly 146, the manual activation assembly 216 may be used with slide-out system 80. The manual activation assembly 216 includes a connector member 260 and a hand crank 262. The hand crank 262 has a generally S-shaped form with a handle 264 at one end thereof and a shaped connector end 266 distal thereto. The shaped connector end 266 releasably couples to the connector member 260. The connector member 260 couples the drive shaft 136 (FIG. 11) to the hand crank 262. As such, rotational movement of the hand crank 262 is translated along the connector member 260 to the drive shaft 136.

The connector member 260 may have various lengths and dimensions, so long as it is capable of cooperating with the drive shaft 136 and the hand crank 262. For example, the connector member 260 may have a length sufficient to pass through a portion of the first wall 54 and/or the second wall 56 (FIG. 1) of the RV 50 to engage with the drive shaft 136 on either side of the slide-out system 80. Alternatively, the connector member 260 may be integrally formed with the hand crank 262. The connector member 260 and the hand crank 262 may have various configurations as long as they are capable of cooperating and can translate rotational motion to the drive shaft 136.

Depending upon the particular configuration, the motor assembly 146 and the manual activation assembly 216 may be coupled directly to the drive shaft 136, be coupled to one or more reduction gears, or be coupled to an intermediary gear reduction assembly, such as the gear reduction assembly disclosed in co-pending U.S. patent application Ser. No. 10/044,481, entitled "Sliding Mechanisms and Systems" the disclosures of which are incorporated herein in their entirety by this reference. Similarly, the motor assembly 146 and more generally the slide-out system 80 may accommodate structures described in U.S. Pat. No. 5,984,353 entitled "Quick Release Arrangement for a Camper Jack System," the disclosure of which is incorporated by this reference, in association with the motor, a gear reduction assembly, or other structures of a similar nature described herein.

ILLUSTRATIVE EMBODIMENTS

Reference is made in the following to a number of illustrative embodiments of the subject matter described herein. The following embodiments should be referred to only as providing a selected few embodiments of the numerous embodiments that may include the various features, characteristics, and advantages of the subject matter as presently described. Also, features and characteristics of one embodiment may equally apply to other embodiments or be used in combination with any number of other features from the various embodiments to provide further additional embodiments.

The subject matter described herein generally relates to a device, mechanism, or system for sliding or moving objects in a controlled manner, and, more specifically, to a slide-out mechanism or slide-out system for a "slide-out" compartment or room for a recreational vehicle. The slide-out system may be modular in that one or more slide-out mechanisms may be linked together to form the slide-out system depending upon the particular configuration of the slide-out compartment to be moved.

According to one embodiment, a slide-out system is provided that includes one or more slide-out mechanisms. Each slide-out mechanism includes a first support member that slidably receives a second support member. Disposed at one end of the first support member is a roller support assembly. This assembly supports the second support member as the slide-out compartment is extended or retracted. A roller of the roller assembly contacts the second support member to transmit torquing forces applied by the second support member as it moves outwardly to deploy the slide-out compartment or inwardly to retract the slide-out compartment. The other end of the first support member is coupled to a frame rail or other structure of the recreational vehicle.

The second support member moves within an interior channel of the first support member. The second support member includes a roller at one end that cooperates with the interior channel as the second support member moves within the first support member. Opposite the roller is a compartment mounting assembly that couples the second support member to the slide-out compartment of the recreational vehicle.

Disposed at an end of the first support member is a frame rail mounting assembly. This assembly may be mounted to a surface of a frame rail of the recreational vehicle by way of a rail mount and/or one or more supports. Frame rail mounting assembly supports the drive assembly of the slide-out system and maintains a gear of the drive assembly in an engaging relationship with the second support member as a drive shaft rotates within bearings supported by bearing blocks. Teeth of the gear engage with slots or holes formed in the second support member so that rotation of the gear causes the second support member to move relative to the first support member.

Coupled to the drive shaft is a drive member. This drive member drivingly connects the drive shaft of one slide-out mechanism with a similar drive shaft of another adjacent slide-out mechanism. By so doing, movement of one drive shaft is translated into movement of the adjacent drive shaft.

Optionally drivingly connected to the drive shaft is a manual activation device. Alternatively, a motorized activation device is coupled to the drive shaft. These devices facilitate rotating the drive shaft to extend or retract the slide-out compartment. One exemplary manual activation device includes a connector member and a hand crank, while one exemplary motorized activation device includes a motor assembly. Each manual activation device and motorized activation device may connect to the drive shaft by way of a drive member.

According to another embodiment, a land vehicle comprises: a first floor; a second floor; a first support member coupled to the vehicle and sloped relative to the first floor; a second support member supported by the first support member and coupled to the second floor, the second support member comprising an engaging portion; and a gear which cooperates with the engaging portion to move the second support member relative to the first support member and thus move the second floor between a first position where the second floor is positioned adjacent to the first floor and a second position where the second floor is substantially level with the first floor. The land vehicle may also comprise a plurality of first support members; a plurality of second support members; a plurality of gears; and a drive assembly comprising the plurality of gears and used to move the plurality of gears in unison. The drive assembly may be selectively adjustable between a first orientation where the plurality of gears move in unison and a second orientation where one of the plurality of gears is movable independent of another one of the plurality of gears. The engaging portion may comprise a plurality of holes which cooperate with the gear to move the second support member. A root diameter of the gear may not greater than about 2 inches. The land vehicle may also comprise a motor which is used to drive the gear. The motor may comprise a motor shaft which rotates at about the same rate as the gear. The first support member may be configured to be selectively coupled to the gear at any one of a plurality of locations on the first support member. The first support member may comprise a roller positioned at an end of the first support member, the roller being used to support the second support member as it extends from the end of the first support member. The second support member may be movably coupled to the second floor. The land vehicle may also comprise a first frame rail; and a second frame rail; wherein the first support member is pivotally coupled to the first frame rail and is coupled to the second frame rail; and wherein the first support member is movable at the second frame rail in a direction that is perpendicular to the first floor. The first support member and second support member may be tubes. The land vehicle may be a recreational vehicle. The land vehicle may also comprise a slide-out compartment which comprises the second floor. The second floor may be a slide-out patio.

According to another embodiment, a land vehicle comprises: a frame which includes a first frame rail and a second frame rail; a main occupancy area which includes a main floor supported by the frame; a slide-out compartment which includes a slide-out floor, the slide-out compartment being movable between a retracted position where the slide-out floor is positioned adjacent to the main floor and an extended position where the slide-out floor is substantially level with the main floor; a first tube coupled to the first frame rail and extending through the second frame rail, the first tube being sloped relative to the main floor; a second tube coupled to the slide-out floor and sloped relative to the main floor, the second tube telescopically cooperating with the first tube, the second tube comprising an engaging portion; and a gear which cooperates with the engaging portion to telescopically move the second tube relative to the first tube and thus move the slide-out compartment between the retracted position and the second position. The land vehicle may also comprise a plurality of first tubes; a plurality of second tubes; a plurality of gears; and a drive assembly comprising the plurality of gears and used to move the plurality of gears in unison. The drive assembly may be selectively adjustable between a first orientation where the plurality of gears move in unison and a second orientation where one of the plurality of gears is movable independent of another one of the plurality of gears. The engaging portion may comprise a plurality of holes which cooperate with the gear to move the second tube. A root diameter of the gear is greater than about 2 inches. The land vehicle may also comprise a motor which is used to drive the gear. The motor may comprise a motor shaft which rotates at about the same rate as the gear. The first tube may be configured to be selectively coupled to the gear at any one of a plurality of locations on the first support member. The first tube may comprise a roller positioned at an end of the first tube, the roller being used to support the second tube as it extends from the end of the first tube. The second tube may be pivotally coupled to the slide-out floor. The first tube may be pivotally coupled to the first frame rail and may be movable at the second frame rail in a direction that is perpendicular to the main floor. The land vehicle may be a recreational vehicle.

According to another embodiment a slide-out system comprises: a first support member configured to be coupled to a land vehicle which includes a first floor, the first support member being configured to be sloped relative to the first floor; a second support member comprising an engaging portion, the second support member being configured to be supported by the first support member and to be coupled to a second floor of the land vehicle; and a gear which cooperates with the engaging portion to move the second support member relative to the first support member and thus move the second floor between a first position where the second floor is positioned adjacent to the first floor and a second position where the second floor is substantially level with the first floor. The slide-out system may also comprise a plurality of first support members; a plurality of second support members; a plurality of gears; and a drive assembly comprising the plurality of gears and used to move the plurality of gears in unison. The drive assembly may be selectively adjustable between a first orientation where the plurality of gears move in unison and a second orientation where one of the plurality of gears is movable independent of another one of the plurality of gears. The engaging portion may comprise a plurality of holes which cooperate with the gear to move the second support member. A root diameter of the gear is greater than about 2 inches. The slide-out system may also comprise a motor which is used to drive the gear. The motor may comprise a motor shaft which rotates at about the same rate as the gear. The first support member may be configured to be selectively coupled to the gear at any one of a plurality of locations on the first support member. The first support member may comprise a roller positioned at an end of the first support member, the roller being used to support the second support member as it extends from the end of the first support member. The second support member may be configured to be movably coupled to the second floor. The first support member may be configured to be pivotally coupled to a first frame rail of the land vehicle and to be coupled to a second frame rail, and wherein the first support member is movable at the second frame rail in a direction that is perpendicular to the first floor. The first support member and the second support member may be tubes. The second support member may be configured to be coupled to a slide-out compartment which includes the second floor. The second floor may be a slide-out patio. The land vehicle may be a recreational vehicle According to another embodiment, a land vehicle comprises: a frame which includes a first frame rail and a second frame rail; a first floor supported by the frame; a second floor movable between a first position where the second floor is positioned adjacent to the first floor and a second position where the second floor is substantially level with the first floor; a first support member pivotally coupled to the first frame rail and extending through the second frame rail, the first support member being movable at the second frame rail in a direction that is perpendicular to the first floor; and a second support member supported by the first support member and coupled to the second floor, the second support member moving relative to the first support member to move the second floor between the first position and the second position. The land vehicle may also comprise a plurality of first support members; a plurality of second support members; and a drive assembly which is used to move the plurality of second support members in unison. The drive assembly may be selectively adjustable between a first orientation where the second support members move in unison and a second orientation where one of the plurality of second support members is movable independent of another one of the plurality of second support members. The first support member and the second support member may be sloped relative to the first floor. The land vehicle may also comprise a gear which cooperates with an engaging portion of the second support member to move the second support member relative to the first support member. The engaging portion may comprise a plurality of holes which cooperate with the gear to move the second support member relative to the first support member. A root diameter of the gear is greater than about 2 inches. The land vehicle may also comprise a motor which is used to drive the gear, the motor comprising a motor shaft which rotates at about the same rate as the gear. The land vehicle may also comprise a motor which is used to move the second support member relative to the first support member. The land vehicle may also comprise a drive assembly which is used to move the second support member relative to the first support member, the first support member being configured to be selectively coupled to the drive assembly at any one of a plurality of locations on the first support member. The first support member may comprise a roller positioned at an end of the first support member, the roller being used to support the second support member as it extends from the end of the first support member. The second support member may be movably coupled to the second floor. The first support member and the second support member may be tubes. The land vehicle may be a recreational vehicle. The land vehicle may also comprise a slide-out compartment which comprises the second floor. The second floor may be a slide-out patio.

According to another embodiment, a land vehicle comprises: a frame which includes a first frame rail and a second frame rail; a main occupancy area which includes a main floor supported by the frame; a slide-out compartment which includes a slide-out floor, the slide-out compartment being movable between a retracted position where the slide-out floor is positioned adjacent to the main floor and an extended position where the slide-out floor is substantially level with the main floor; a first tube pivotally coupled to the first frame rail and extending through the second frame rail, the first tube being vertically adjustable at the second frame rail; and a second tube coupled to the slide-out floor, the second tube telescopically cooperating with the first tube to move the second tube relative to the first tube and thus move the slide-out compartment between the retracted position and the extended position. The land vehicle may also comprise a plurality of first tubes; a plurality of second tubes; and a drive assembly which is used to move the plurality of second tubes in unison. The drive assembly may be selectively adjustable between a first orientation where the second tubes move in unison and a second orientation where one of the plurality of second tubes is movable independent of another one of the plurality of second tubes. The first tube and the second tube may be sloped relative to the main floor. The land vehicle may also comprise a gear which cooperates with an engaging portion of the second tube to move the second tube. The engaging portion may comprise a plurality of holes which cooperate with the gear to move the second tube. A root diameter of the gear is greater than about 2 inches. The land vehicle may comprise a motor which is used to drive the gear, the motor comprising a motor shaft which rotates at about the same rate as the gear. The land vehicle may also comprise a motor which is used to move the second tube. The land vehicle may also comprise a drive assembly which is used to move the second tube relative to the first tube, the first tube being configured to be selectively coupled to the drive assembly at any one of a plurality of locations on the first tube. The first tube may comprise a roller positioned at an end of the first tube, the roller being used to support the second tube as it extends from the end of the first tube. The second tube may be pivotally coupled to the slide-out floor. The land vehicle may be a recreational vehicle.

According to another embodiment, a slide-out system comprises: a first support member configured to be pivotally coupled to a first frame rail of a land vehicle and to extend through a second frame rail of the land vehicle so that the first support member is movable at the second frame rail in a direction that is perpendicular to a first floor which is supported by the first and second frame rails; a second support member supported by the first support member, the second support member being configured to be coupled to a second floor of the land vehicle, the second support member moving relative to the first support member and thus being configured to move the second floor between a first position where the second floor is positioned adjacent to the first floor and a second position where the second floor is substantially level with the first floor. The slide-out system may also comprise a plurality of first support members; a plurality of second support members; and a drive assembly which is used to move the plurality of second support members in unison. The drive assembly may be selectively adjustable between a first orientation where the second support members move in unison and a second orientation where one of the plurality of second support members is movable independent of another one of the plurality of second support members. The first support member and the second support member may be configured to be sloped relative to the first floor The slide-out system may also comprise a gear which cooperates with an engaging portion of the second support member to move the second support member relative to the first support member. The engaging portion may comprise a plurality of holes which cooperate with the gear to move the second support member relative to the first support member. A root diameter of the gear is greater than about 2 inches. The slide-out system may also comprise a motor which is used to drive the gear, the motor comprising a motor shaft which rotates at about the same rate as the gear. The slide-out system may also comprise a motor which is used to move the second support member relative to the first support member. The slide-out system may also comprise a drive assembly which is used to move the second support member relative to the first support member, the first support member being configured to be selectively coupled to the drive assembly at any one of a plurality of locations on the first support member. The first support member may comprise a roller positioned at an end of the first support member, the roller being used to support the second support member as it extends from the end of the first support member. The second support member may be configured to be movably coupled to the slide-out compartment. The first support member and the second support member may be tubes. The land vehicle may be a recreational vehicle. The second support member may be configured to be coupled to a slide-out compartment which comprises the second floor. The second floor may be a slide-out patio.

According to another embodiment, a land vehicle comprises: a frame which includes a first frame rail and a second frame rail; a slide-out compartment which is movable between a first position and a second position; a first support member coupled to the first frame rail and extending through the second frame rail; a second support member supported by the first support member and coupled to the slide-out compartment, the second support member comprising an engaging portion; and a gear which cooperates with the engaging portion to move the second support member relative to the first support member and thus move the slide-out compartment between the first position and the second position; wherein a root diameter of the gear is not greater than about 3 inches. The land vehicle may also comprise a plurality of first support members; a plurality of second support members; a plurality of gears; and a drive assembly comprising the plurality of gears and used to move the plurality of gears in unison; wherein a root diameter of each of the plurality of gears is not greater than about 3 inches. The drive assembly may be selectively adjustable between a first orientation where the plurality of gears move in unison and a second orientation where one of the plurality of gears is movable independent of another one of the plurality of gears. The engaging portion may comprise a plurality of holes which cooperate with the gear to move the second support member. The root diameter of the gear is not greater than about 2 inches. The root diameter of the gear is not greater than about 1.5 inches. The land vehicle may also comprise a motor which is used to drive the gear. The motor may comprise a motor shaft which rotates at about the same rate as the gear. The first support member may be configured to be selectively coupled to the gear at any one of a plurality of locations on the first support member. The first support member may comprise a roller positioned at an end of the first support member, the roller being used to support the second support member as it extends from the end of the first support member. The second support member may be movably coupled to the slide-out compartment. The first support member may be pivotally coupled to the first frame rail and be vertically adjustable at the second frame rail. The frame supports a main floor, and wherein the first support member and the second support member may be sloped relative to the main floor. The land vehicle may also comprise a main floor supported by the frame; wherein the slide-out compartment comprises a slide-out floor; and wherein the slide-out floor is positioned adjacent to the main floor when the slide-out compartment is in the first position and the slide-out floor is substantially level with the main floor when the slide-out compartment is in the second position.

According to another embodiment, a land vehicle comprises: a first floor; a second floor movable between a first position where the second floor is positioned adjacent to the first floor and a second position where the second floor is substantially level with the first floor; a first support member coupled to the vehicle; a second support member supported by the first support member and coupled to the second floor, the second support member comprising an engaging portion; and a gear which cooperates with the engaging portion to move the second support member relative to the first support member and thus move the second floor between the first position and the second position; wherein a root diameter of the gear is not greater than about 3 inches. The land vehicle may also comprise a plurality of first support members; a plurality of second support members; a plurality of gears; and a drive assembly comprising the plurality of gears and used to move the plurality of gears in unison; wherein a root diameter of each of the plurality of gears is not greater than about 3 inches. The drive assembly may be selectively adjustable between a first orientation where the plurality of gears move in unison and a second orientation where one of the plurality of gears is movable independent of another one of the plurality of gears. The engaging portion may comprise a plurality of holes which cooperate with the gear to move the second support member. The root diameter of the gear is not greater than about 2 inches. The root diameter of the gear is not greater than about 1.5 inches. The land vehicle may also comprise a motor which is used to drive the gear. The motor may comprise a motor shaft which rotates at about the same rate as the gear. The first support member may be configured to be selectively coupled to the gear at any one of a plurality of locations on the first support member. The first support member may comprise a roller positioned at an end of the first support member, the roller being used to support the second support member as it extends from the end of the first support member. The second support member may be movably coupled to the second floor. The first support member may be pivotally coupled to a first frame rail and may extend through a second frame rail, wherein the first support member is movable at the second frame rail in a direction that is perpendicular to the first floor. The first support member and the second support member may be sloped relative to the first floor. The land vehicle may be a recreational vehicle. The second floor may be a slide-out patio. The first support member and the second support member may be tubes. The land vehicle may also comprise a slide-out compartment which comprises the second floor.

According to another embodiment, a land vehicle comprises: a frame which includes a first frame rail and a second frame rail; a slide-out compartment which is movable between a first position and a second position; a first support member coupled to the first frame rail and extending through the second frame rail; a second support member supported by the first support member and coupled to the slide-out compartment, the second support member comprising a plurality of holes; and a gear which cooperates with the plurality of holes to move the second support member relative to the first support member and thus move the slide-out compartment between the first position and the second position; wherein a root diameter of the gear is not greater than about 2.5 inches. The land vehicle may also comprise a plurality of first support members; a plurality of second support members; a plurality of gears; and a drive assembly comprising the plurality of gears and used to move the plurality of gears in unison; wherein a root diameter of each of the plurality of gears is not greater than about 2.5 inches. The drive assembly may be selectively adjustable between a first orientation where the plurality of gears move in unison and a second orientation where one of the plurality of gears is movable independent of another one of the plurality of gears. The root diameter of the gear is not greater than about 2 inches. The root diameter of the gear is not greater than about 1.5 inches. The land vehicle may also comprise a motor which is used to drive the gear. The motor may comprise a motor shaft which rotates at about the same rate as the gear. The first support member may be configured to be selectively coupled to the gear at any one of a plurality of locations on the first support member. The first support member may comprise a roller positioned at an end of the first support member, the roller being used to support the second support member as it extends from the end of the first support member. The second support member may be movably coupled to the slide-out compartment. The first support member may be pivotally coupled to the first frame rail and may be vertically adjustable at the second frame rail. The frame supports a main floor, and wherein the first support member and the second support member may be sloped relative to the main floor. The land vehicle may also comprise a main floor supported by the frame; wherein the slide-out compartment comprises a slide-out floor; and wherein the slide-out floor is positioned adjacent to the main floor when the slide-out compartment is in the first position and the slide-out floor is substantially level with the main floor when the slide-out compartment is in the second position.

According to another embodiment, a land vehicle comprises: a frame which includes a first frame rail and a second frame rail; a slide-out compartment which is movable between a retracted position and an extended position; a first tube coupled to the first frame rail and extending through the second frame rail; a second tube coupled to the slide-out compartment, the second tube telescopically cooperating with the first tube, the second tube comprising an engaging portion; and a gear which cooperates with the engaging portion to telescopically move the second tube and thus move the slide-out compartment between the retracted position and the extended position; wherein a root diameter of the gear is not greater than about 3 inches. The land vehicle may also comprise a plurality of first tubes; a plurality of second tubes; a plurality of gears; and a drive assembly comprising the plurality of gears and used to move the plurality of gears in unison; wherein a root diameter of each of the plurality of gears is not greater than about 3 inches. The drive assembly may be selectively adjustable between a first orientation where the plurality of gears move in unison and a second orientation where one of the plurality of gears is movable independent of another one of the plurality of gears. The engaging portion may comprise a plurality of holes which cooperate with the gear to move the second tube. The root diameter of the gear is not greater than about 2 inches. The root diameter of the gear is not greater than about 1.5 inches. The land vehicle may also comprise a motor which is used to drive the gear. The motor may comprise a motor shaft which rotates at about the same rate as the gear. The first tube may be configured to be selectively couple to the gear at any one of a plurality of locations on the first tube. The first tube may comprise a roller positioned at an end of the first tube, the roller being used to support the second tube as it extends from the end of the first tube. The second tube may be pivotally coupled to the slide-out compartment. The first tube may be pivotally coupled to the first frame rail and is vertically adjustable at the second frame rail. The frame supports a main floor, and wherein the first tube and the second tube may be sloped relative to the main floor. The land vehicle may also comprise a main floor supported by the frame; wherein the slide-out compartment comprises a slide-out floor; and wherein the slide-out floor is positioned adjacent to the main floor when the slide-out compartment is in the retracted position and the slide-out floor is substantially level with the main floor when the slide-out compartment is in the extended position. The land vehicle may be a recreational vehicle.

According to another embodiment, a slide-out system comprises a first support member configured to be coupled to a first frame rail of a land vehicle and to extend through a second frame rail of the land vehicle; a second support member supported by the first support member, the second support member comprising an engaging portion, the second support member being configured to be coupled to a slide-out compartment; and a gear which cooperates with the engaging portion to move the second support member relative to the first support member and thus move the slide-out compartment between a first position and a second position, the gear having a root diameter that is not greater than about 3 inches. The slide-out system may also comprise a plurality of first support members; a plurality of second support members; a plurality of gears; and a drive assembly comprising the plurality of gears and used to move the plurality of gears in unison. The drive assembly may be selectively adjustable between a first orientation where the plurality of gears move in unison and a second orientation where one of the plurality of gears is movable independent of another one of the plurality of gears. The engaging portion may comprise a plurality of holes which cooperate with the gear to move the second support member. The root diameter of the gear is not greater than about 2 inches. The root diameter of the gear is not greater than about 1.5 inches. The slide-out system may also comprise a motor which is used to drive the gear. The motor may comprise a motor shaft which rotates at about the same rate as the gear. The first support member may be configured to be selectively coupled to the gear at any one of a plurality of locations on the first support member. The first support member may comprise a roller positioned at an end of the first support member, the roller being used to support the second support member as it extends from the end of the first support member. The second support member may be configured to be movably coupled to the slide-out compartment. The first support member may be configured to be pivotally coupled to the first frame rail and to be vertically adjustable at the second frame rail. The first support member and the second support member may be configured to be sloped relative to a main floor which is supported by the first frame rail and the second frame rail. The slide-out system may be configured to move the slide-out compartment between the first position where a slide-out floor of the slide-out compartment is positioned adjacent to a main floor and the second position where the slide-out floor is substantially level with the main floor. The land vehicle may be a recreational vehicle.

According to another embodiment, a slide-out system comprises: a first support member configured to be coupled to a land vehicle which comprises a main floor and a slide-out floor where the slide-out floor is movable between a retracted position where the slide-out floor is positioned adjacent to the main floor and an extended position where the slide-out floor is substantially level with the main floor; a second support member supported by the first support member, the second support member comprising an engaging portion, the second support member being configured to be coupled to the slide-out floor; and a gear which cooperates with the engaging portion to move the second support member relative to the first support member and thus move the slide-out floor between the retracted position and the extended position, the gear having a root diameter that is not greater than about 3 inches. The slide-out system may also comprise a plurality of first support members; a plurality of second support members; a plurality of gears; and a drive assembly comprising the plurality of gears and used to move the plurality of gears in unison. The drive assembly may be selectively adjustable between a first orientation where the plurality of gears move in unison and a second orientation where one of the plurality of gears is movable independent of another one of the plurality of gears. The engaging portion may comprise a plurality of holes which cooperate with the gear to move the second support member. The root diameter of the gear is not greater than about 2 inches. The root diameter of the gear is not greater than about 1.5 inches. The slide-out system may also comprise a motor which is used to drive the gear. The motor may comprise a motor shaft which rotates at about the same rate as the gear. The first support member may be configured to be selectively coupled to the gear at any one of a plurality of locations on the first support member. The first support member may comprise a roller positioned at an end of the first support member, the roller being used to support the second support member as it extends from the end of the first support member. The second support member may be configured to be movably coupled to the slide-out floor. The first support member may be configured to be coupled to a first frame rail of the land vehicle and to extend through a second frame rail of the land vehicle. The first support member may be configured to be pivotally coupled to the first frame rail and to be vertically adjustable at the second frame rail. The first support member and the second support member may be configured to be sloped relative to the main floor. The land vehicle may be a recreational vehicle.

According to another embodiment, a land vehicle comprises: a slide-out compartment which is movable between a first position and a second position; a first support member coupled to the vehicle; a second support member supported by the first support member and coupled to the slide-out compartment, the second support member comprising a plurality of holes; a gear which cooperates with the plurality of holes to move the second support member relative to the first support member and thus move the slide-out compartment between the first position and the second position; and a motor which is used to drive the gear, the motor comprising a motor shaft which rotates at about the same rate as the gear. The land vehicle may also comprise a plurality of first support members; a plurality of second support members; a plurality of gears; and a drive assembly comprising the motor and the plurality of gears, the drive assembly being used to rotate the plurality of gears in unison and at about the same rate as the motor shaft. The drive assembly may be selectively adjustable between a first orientation where the plurality of gears rotate in unison and a second orientation where one of the plurality of gears may be rotated independent of another one of the plurality of gears. A root diameter of the gear is not greater than about 3 inches. A root diameter of the gear is not greater than about 2 inches. A root diameter of the gear is not greater than about 1.5 inches. The first support member may be substantially parallel with a main floor of the vehicle. The first support member may be coupled to a first frame rail of the land vehicle and extend through a second frame rail of the land vehicle. The first support member may be sloped relative to a main floor of the vehicle. The slide-out compartment may comprise a slide-out floor, and wherein the slide-out floor is positioned adjacent to a main floor of the vehicle when the slide-out compartment is in the first position and the slide-out floor is substantially level with the main floor when the slide-out compartment is in the second position. The first support member and second support member may be tubes and the second support member may telescopically move relative to the first support member.

According to another embodiment, a slide-out system comprises: a first support member configured to be coupled to a land vehicle which comprises a slide-out compartment that moves between a retracted position and an extended position; a second support member supported by the first support member, the second support member comprising a plurality of holes, the second support member being configured to be coupled to the slide-out compartment; a gear which cooperates with the plurality of holes to move the second support member relative to the first support member and thus move the slide-out compartment between the retracted position and the extended position; and a motor which is used to drive the gear, the motor comprising a motor shaft which rotates at about the same rate as the gear. The slide-out system may also comprise a plurality of first support members; a plurality of second support members; a plurality of gears; and a drive assembly comprising the motor and the plurality of gears, the drive assembly being used to rotate the plurality of gears in unison and at about the same rate as the motor shaft. The drive assembly may be selectively adjustable between a first orientation where the plurality of gears rotate in unison and a second orientation where one of the plurality of gears may be rotated independent of another one of the plurality of gears. A root diameter of the gear is not greater than about 3 inches. A root diameter of the gear is not greater than about 2 inches. A root diameter of the gear is not greater than about 1.5 inches. The first support member may be configured to be substantially parallel with a main floor of the vehicle. The first support member may be configured to be coupled to a first frame rail of the land vehicle and to extend through a second frame rail of the land vehicle. The first support member may be configured to be sloped relative to a main floor of the vehicle. The slide-out system may be configured to move the slide-out compartment which comprises a slide-out floor between the retracted position where the slide-out floor is positioned adjacent to a main floor of the vehicle and the extended position where the slide-out floor is substantially level with the main floor. The first support member and second support member may be tubes and the second support member may telescopically move relative to the first support member. The land vehicle may be a recreational vehicle.

According to another embodiment, a land vehicle comprises: a frame which includes a first frame rail and a second frame rail; a slide-out compartment which is movable between a first position and a second position; a plurality of first support members coupled to the first frame rail and extending through the second frame rail; a plurality of second support members supported by the first support members and coupled to the slide-out compartment, each second support member comprising a plurality of holes; and a drive assembly comprising a plurality of gears which cooperate with the plurality of holes to move the second support members relative to the first support members and thus move the slide-out compartment between the retracted and the second position, the drive assembly being used to move the plurality of gears in unison, the drive assembly also being selectively telescopically adjustable between a first orientation where the plurality of gears move in unison and a second orientation where one of the plurality of gears is movable independent of another one of the plurality of gears. The drive assembly may comprise a coupler, a first drive member, and a second drive member, and wherein the coupler is selectively telescopically adjustable between the first orientation where the first drive member and the second drive member move in unison and the second orientation where the first drive member is movable independent of the second drive member. A root diameter of each of the gears is not greater than about 2 inches. The drive assembly may comprise a motor which is used to drive the gears. The motor may comprise a motor shaft which rotates at about the same rate as the gears. The first support members may be configured to be selectively coupled to the drive assembly at any one of a plurality of locations on the first support members. Each of the first support members may comprise a roller positioned at an end of each of the first support members, the roller being used to support the second support members as they extend from the respective ends of the first support members. The second support members may be movably coupled to the slide-out compartment. The first support members may be pivotally coupled to the first frame rail and are vertically adjustable at the second frame rail. The frame supports a main floor, and wherein the first support members and the second support members may be sloped relative to the main floor. The land vehicle may also comprise a main floor supported by the frame; wherein the slide-out compartment comprises a slide-out floor; and wherein the slide-out floor is positioned adjacent to the main floor when the slide-out compartment is in the first position and the slide-out floor is substantially level with the main floor when the slide-out compartment is in the second position. The land vehicle may be a recreational vehicle.

According to another embodiment, a land vehicle comprises: a first floor; a second floor movable between a first position where the second floor is positioned adjacent to the first floor and a second position where the second floor is substantially level with the first floor; a plurality of first support members coupled to the vehicle; a plurality of second support members supported by the first support members and coupled to the second floor, each second support member comprising a plurality of holes; and a drive assembly comprising a plurality of gears which cooperate with the plurality of holes to move the second support members relative to the first support members and thus move the second floor between the first position and the second position, the drive assembly being used to move the plurality of gears in unison, the drive assembly also being selectively telescopically adjustable between a first orientation where the plurality of gears move in unison and a second orientation where one of the plurality of gears is movable independent of another one of the plurality of gears. The drive assembly may comprise a coupler, a first drive member, and a second drive member, and wherein the coupler is selectively telescopically adjustable between the first orientation where the first drive member and the second drive member move in unison and the second orientation where the first drive member is movable independent of the second drive member. A root diameter of each of the gears is not greater than about 2 inches. The drive assembly may comprise a motor which is used to drive the gears. The motor may comprise a motor shaft which rotates at about the same rate as the gears. The first support members are configured to be selectively coupled to the drive assembly at any one of a plurality of locations on the first support members. The first support members may comprise a roller positioned at an end of each of the first support members, the roller being used to support the second support members as they extend from the respective ends of the first support members. The second support members may be movably coupled to the second floor. The first support members may be pivotally coupled to a first frame rail and extend through a second frame rail, wherein the first support members are movable at the second frame rail in a direction that is perpendicular to the first floor. The first support members and the second support members may be sloped relative to the first floor. The land vehicle may be a recreational vehicle. The second floor may be a slide-out patio. The first support members and the second support members may be tubes. The land vehicle may also comprise a slide-out compartment which comprises the second floor.

According to another embodiment, a land vehicle comprises: a frame which includes a first frame rail and a second frame rail; a slide-out compartment which is movable between a retracted position and an extended position; a plurality of first tubes coupled to the first frame rail and extending through the second frame rail; a plurality of second tubes coupled to the slide-out compartment and telescopically cooperating with the first tubes, each of the second tubes comprising a plurality of holes; and a drive assembly comprising a plurality of gears which cooperate with the plurality of holes in the second tubes to telescopically move the second tubes and thus move the slide-out compartment between the retracted position and the extended position, the drive assembly being used to move the plurality of gears in unison, the drive assembly also being selectively telescopically adjustable between a first orientation where the plurality of gears move in unison and a second orientation where one of the plurality of gears is movable independent of another one of the plurality of gears. The drive assembly may comprise a coupler, a first drive member, and a second drive member, and wherein the coupler is selectively telescopically adjustable between the first orientation where the first drive member and the second drive member move in unison and the second orientation where the first drive member is movable independent of the second drive member. A root diameter of each of the gears is not greater than about 2 inches. The drive assembly may comprise a motor which is used to drive the gears. The motor may comprise a motor shaft which rotates at about the same rate as the gears. The first tubes may be configured to be selectively coupled to the drive assembly at any one of a plurality of locations on the first tubes. The first tubes may comprise a roller positioned at an end of each of the first tubes, the roller being used to support the second tubes as they extend from the respective ends of the first tubes. The second tubes may be pivotally coupled to the slide-out compartment. The first tubes may be pivotally coupled to the first frame rail and may be vertically adjustable at the second frame rail. The frame supports a main floor, and wherein the first tubes and the second tubes may be sloped relative to the main floor. The land vehicle may also comprise a main floor supported by the frame; wherein the slide-out compartment comprises a slide-out floor; and wherein the slide-out floor is positioned adjacent to the main floor when the slide-out compartment is in the retracted position and the slide-out floor is substantially level with the main floor when the slide-out compartment is in the extended position. The land vehicle may be a recreational vehicle.

According to another embodiment, a slide-out system comprises: a plurality of first support members configured to be coupled to a first frame rail of a land vehicle and to extend through a second frame rail of the land vehicle; a plurality of second support members supported by the first support members, each of the second support members comprising a plurality of holes, the second support members being configured to be coupled to a slide-out compartment; and a drive assembly comprising a plurality of gears which are configured to cooperate with the plurality of holes to move the second support members relative to the first support members and thus to move the slide-out compartment between a first position and a second position, the drive assembly being used to move the plurality of gears in unison, the drive assembly being selectively telescopically adjustable between a first orientation where the plurality of gears move in unison and a second orientation where one of the plurality of gears is movable independent of another one of the plurality of gears. The drive assembly may comprise a coupler, a first drive member, and a second drive member, and wherein the coupler is selectively telescopically adjustable between the first orientation where the first drive member and the second drive member move in unison and the second orientation where the first drive member is movable independent of the second drive member. A root diameter of each of the gears is not greater than about 2 inches. The drive assembly may comprise a motor which is used to drive the gears. The motor may comprise a motor shaft which rotates at about the same rate as the gears. The first support members may be configured to be selectively coupled to the drive assembly at any one of a plurality of locations on the first support members. The first support members may comprise a roller positioned at an end of each of the first support members, the roller being used to support the second support members as they extend from the respective ends of the first support members. The second support members may be configured to be movably coupled to the slide-out compartment. The first support members may be configured to be pivotally coupled to the first frame rail and to be vertically adjustable at the second frame rail. The first support members and the second support members may be configured to be sloped relative to a main floor which is supported by the first frame rail and the second frame rail. The slide-out system may be configured to move the slide-out compartment between the first position where a slide-out floor of the slide-out compartment is positioned adjacent to a main floor and the second position where the slide-out floor is substantially level with the main floor. The land vehicle may be a recreational vehicle.

According to another embodiment, a land vehicle comprises: a frame which includes a first frame rail and a second frame rail, the second frame rail including a first side and a second side; a slide-out floor which is movable between a first position and a second position; a first support member coupled to the first frame rail and extending through the second frame rail; a second support member supported by the first support member and coupled to the slide-out floor, the second support member comprising an engaging portion; and a mounting assembly comprising a gear which cooperates with the engaging portion to move the second support member relative to the first support member and thus move the slide-out floor between the first position and the second position, the mounting assembly being used to couple the first support member to the second frame rail, the mounting assembly being configured to be selectively coupled to the first side or the second side of the second frame rail. The land vehicle may also comprise a plurality of first support members; a plurality of second support members; a plurality of mounting assemblies; and a drive member coupled to the mounting assemblies and used to move the gear of each mounting assembly in unison. The drive member may be selectively adjustable between a first orientation where the gears of the mounting assemblies move in unison and a second orientation where one gear of one mounting assembly is movable independent of another gear of another mounting assembly. The slide-out floor may be a slide-out patio. The land vehicle may also comprise a slide-out compartment which includes the slide-out floor. The engaging portion may comprise a plurality of holes which cooperate with the gear to move the second support member. A root diameter of the gear is not greater than about 2 inches. The mounting assembly may comprise a motor which is used to drive the gear. The motor may comprise a motor shaft which rotates at about the same rate as the gear. The first support member may comprise a roller positioned at an end of the first support member, the roller being used to support the second support member as it extends from the end of the first support member. The second support member may be movably coupled to the slide-out floor. The first support member may be pivotally coupled to the first frame rail and be vertically adjustable at the second frame rail. The frame supports a main floor, and wherein the first support member and the second support member may be sloped relative to the main floor. The land vehicle may also comprise a main floor supported by the frame, and wherein the slide-out floor is positioned adjacent to the main floor when the slide-out floor is in the first position and the slide-out floor is substantially level with the main floor when the slide-out floor is in the second position. The land vehicle may be a recreational vehicle. The first support member may be a first tube and the second support member may be a second tube which moves inside the first tube, the first tube comprising an opening through which the gear accesses the engaging portion of the second tube, the opening being sized to permit the mounting assembly to be selectively coupled to the first side or the second side of the second frame rail. A portion of the opening on the side of the second frame rail which is opposite the mounting assembly may be closed. The first support member may be configured to be selectively coupled to the mounting assembly at any one of a plurality of locations on the first support member.

According to another embodiment, a land vehicle comprises: a frame which includes a first frame rail and a second frame rail, the second frame rail including a first side and a second side; a slide-out floor which is movable between a first position and a second position; a first support member coupled to the first frame rail and extending through the second frame rail; a second support member supported by the first support member and coupled to the slide-out floor;

and a mounting assembly comprising a motor which is used to move the second support member relative to the first support member and thus move the slide-out floor between the first position and the second position, the mounting assembly being used to couple the first support member to the second frame rail, the mounting assembly being configured to be selectively coupled to the first side or the second side of the second frame rail. The land vehicle may also comprise a plurality of first support members; a plurality of second support members; and a drive member coupled to the motor and used to move the second support members in unison. The drive member may be selectively adjustable between a first orientation where the second support members move in unison and a second orientation where one of the second support members is movable independent of another one of the second support members. The second support member may comprise an engaging portion, and wherein the mounting assembly may comprise a gear which is driven by the motor and cooperates with the engaging portion to move the second support member relative to the first support member. The slide-out floor may be a slide-out patio. The land vehicle may also comprise a slide-out compartment which includes the slide-out floor. The engaging portion may comprise a plurality of holes which cooperate with the gear. A root diameter of the gear is not greater than about 2 inches. The motor may comprise a motor shaft which rotates at about the same rate as the gear. The first support member may comprise a roller positioned at an end of the first support member, the roller being used to support the second support member as it extends from the end of the first support member. The second support member may be movably coupled to the slide-out floor. The first support member may be pivotally coupled to the first frame rail and be vertically adjustable at the second frame rail. The frame supports a main floor, and wherein the first support member and the second support member may be sloped relative to the main floor. The land vehicle may also comprise a main floor supported by the frame, and wherein the slide-out floor is positioned adjacent to the main floor when the slide-out floor is in the first position and the slide-out floor is substantially level with the main floor when the slide-out floor is in the second position. The land vehicle may be a recreational vehicle. The first support member may be configured to be selectively coupled to the mounting assembly at any one of a plurality of locations on the first support member.

According to another embodiment, a slide-out system comprises: a first support member configured to be coupled to a first frame rail of a land vehicle and extend through a second frame rail of a land vehicle, the second frame rail including a first side and a second side; a second support member supported by the first support member, the second support member comprising an engaging portion, the second support member being configured to be coupled to a slide-out floor; and a mounting assembly comprising a gear which is configured to cooperate with the engaging portion to move the second support member relative to the first support member and thus move the slide-out floor between a first position and a second position, the mounting assembly being configured to couple the first support member to the second frame rail, the mounting assembly also being configured to be selectively coupled to the first side or the second side of the second frame rail. The slide-out system may also comprise a plurality of first support members; a plurality of second support members; a plurality of mounting assemblies; and a drive member coupled to the mounting assemblies and used to move the gear of each mounting assembly in unison. The drive member may be selectively adjustable between a first orientation where the gears of the mounting assemblies move in unison and a second orientation where one gear of one mounting assembly is movable independent of another gear of another mounting assembly. The slide-out floor may be a slide-out patio. The land vehicle may comprise a slide-out compartment which includes the slide-out floor. The engaging portion may comprise a plurality of holes which are configured to cooperate with the gear to move the second support member. A root diameter of the gear is not greater than about 2 inches. The mounting assembly may comprise a motor which is used to drive the gear. The motor may comprise a motor shaft which rotates at about the same rate as the gear. The first support member may comprise a roller positioned at an end of the first support member, the roller being used to support the second support member as it extends from the end of the first support member. The second support member may be configured to be movably coupled to the slide-out compartment. The first support member may be configured to be pivotally coupled to the first frame rail and be vertically adjustable at the second frame rail. The first support member and the second support member may be configured to be sloped relative to the main floor which is supported by the first frame rail and the second frame rail. The second support member may be configured to move relative to the first support member and thus move the slide-out compartment between a first position where a slide-out floor of the slide-out compartment is positioned adjacent to a main floor of the land vehicle and a second position where the slide-out floor is substantially level with the main floor. The land vehicle may be a recreational vehicle. The first support member may be a first tube and the second support member may be a second tube which moves inside the first tube, the first tube comprising an opening through which the gear accesses the engaging portion of the second tube, the opening being configured to be sized to permit the mounting assembly to be selectively coupled to the first side or the second side of the second frame rail. A portion of the opening configured to be on the side of the second frame rail which is opposite the mounting assembly may be closed. The first support member may be configured to be selectively coupled to the mounting assembly in a plurality of locations on the first support members.

According to another embodiment, a land vehicle comprises: a slide-out floor which is movable between a first position and a second position; a first support member coupled to the land vehicle; a second support member supported by the first support member and coupled to the slide-out floor, the second support member comprising an engaging portion; and a drive assembly coupled to the first support member, the drive assembly cooperating with the engaging portion to move the second support member relative to the first support member and thus move the slide-out floor between the first position and the second position; wherein the drive assembly is configured to be selectively coupled to the first support member at any one of a plurality of locations on the first support member. The land vehicle may also comprise a plurality of first support members; and a plurality of second support members; wherein the drive assembly is configured to be selectively coupled to the first support members at any one of the plurality of locations on the first support members. The drive assembly may comprise a plurality of gears which cooperate with the engaging portion to move the second support member, the drive assembly being used to move the gears in unison. The drive assembly may be selectively adjustable between a first orientation where the plurality of gears move in unison and a second orientation where one gear of the plurality of gears is movable independent of another gear of the plurality of gears. The land vehicle may also comprise a first frame rail; and a second frame rail; wherein the first support member is coupled to the first frame rail and extends through the second frame rail. The land vehicle may also comprise a first frame rail; and a second frame rail; wherein the first support member is pivotally coupled to the first frame rail and is coupled to the second frame rail, the first support member being vertically movable at the second frame rail. The drive assembly may be configured to be selectively coupled to the first support member at any one of a plurality of locations along a longitudinal direction of the first support member. The slide-out floor may be a slide-out patio. The land vehicle may also comprise a slide-out compartment which includes the slide-out floor. The drive assembly may comprise a gear which cooperates with the engaging portion to move the second support member. The engaging portion may comprise a plurality of holes which cooperate with the gear to move the second support member. A root diameter of the gear is not greater than about 2 inches. The drive assembly may comprise a motor which is used to move the second support member. The first support member may comprise a roller positioned at an end of the first support member, the roller being used to support the second support member as it extends from the end of the first support member. The second support member may be movably coupled to the slide-out floor. The land vehicle may also comprise a main floor, and wherein the first support member and the second support member may be sloped relative to the main floor. The land vehicle may also comprise a main floor, and wherein the slide-out floor is positioned adjacent to the main floor when the slide-out floor is in the first position and the slide-out floor is substantially level with the main floor when the slide-out floor is in the second position. The land vehicle may be a recreational vehicle. The first support member may be a first tube and the second support member may be a second tube which moves inside the first tube, the first tube comprising an opening through which the drive assembly accesses the engaging portion of the second tube, the opening being sized to permit the drive assembly to be selectively coupled to the first support member at any one of the plurality of locations on the first support member. The drive assembly may be coupled to the first support member using a mounting assembly. The mounting assembly may be coupled to a frame of the land vehicle. The mounting assembly may compressibly couple to the first support member.

According to another embodiment, a slide-out system comprises: a first support member configured to be coupled to a land vehicle which includes a slide-out floor; a second support member supported by the first support member, the second support member comprising an engaging portion, the second support member being configured to be coupled to the slide-out floor; and a drive assembly cooperating with the engaging portion to move the second support member relative to the first support member and thus move the slide-out floor between a first position and a second position, the drive assembly being configured to be selectively coupled to the first support member at any one of a plurality of locations on the first support member. The slide-out system may also comprise a plurality of first support members; and a plurality of second support members; wherein the drive assembly is configured to be selectively coupled to the first support members at any one of the plurality of locations on the first support members. The drive assembly may comprise a plurality of gears which cooperate with the engaging portion to move the second support member, the drive assembly being used to move the gears in unison. The drive assembly may be selectively adjustable between a first orientation where the plurality of gears move in unison and a second orientation where one gear of the plurality of gears is movable independent of another gear of the plurality of gears. The first support member may be configured to be coupled to a first frame rail of the land vehicle and to extend through a second frame rail of the land vehicle. The first support member may be configured to be pivotally coupled to a first frame rail of the land vehicle and to be coupled to a second frame rail of the land vehicle, the first support member being configured to be vertically movable at the second frame rail. The drive assembly may be configured to be selectively coupled to the first support member at any one of a plurality of locations along a longitudinal direction of the first support member. The slide-out floor may be a slide-out patio. The land vehicle may comprise a slide-out compartment which includes the slide-out floor. The drive assembly may comprise a gear which cooperates with the engaging portion to move the second support member. The engaging portion may comprise a plurality of holes which cooperate with the gear to move the second support member. A root diameter of the gear is not greater than about 2 inches. The drive assembly may comprise a motor which is used to move the second support member. The first support member may comprise a roller positioned at an end of the first support member, the roller being used to support the second support member as it extends from the end of the first support member. The second support member may be configured to be movably coupled to the slide-out compartment. The first support member and the second support member may be configured to be sloped relative to a main floor of the land vehicle. The second support member may be configured to move relative to the first support member and thus move the slide-out floor between a first position where the slide-out floor is positioned adjacent to a main floor of the land vehicle and a second position where the slide-out floor is substantially level with the main floor. The land vehicle may be a recreational vehicle. The first support member may be a first tube and the second support member may be a second tube which moves inside the first tube, the first tube comprising an opening through which the drive assembly accesses the engaging portion of the second tube, the opening being configured to be sized to permit the drive assembly to be selectively coupled to the first support member at any one of the plurality of locations on the first support member. The drive assembly may be configured to be coupled to the first support member using a mounting assembly. The mounting assembly may be configured to be coupled to a frame of the land vehicle. The mounting assembly may compressibly couples to the first support member.

According to another embodiment, a land vehicle comprises: a first floor; a second floor movable between a first position where the second floor is positioned adjacent to the first floor and a second position where the second floor is substantially level with the first floor; a first support member including a first end which is coupled to the vehicle and a second end, the first support member being sloped relative to the first floor; and a second support member coupled to the second floor, the second support member being extendable and/or retractable from the second end of the first support member to move the second floor between the first position and the second position; wherein the first support member comprises a roller positioned at the second end which is used to support the second support member as it extends and/or retracts. The land vehicle may also comprise a plurality of first support members; a plurality of second support members; a drive assembly which is used to move the plurality of second support members in unison. The drive assembly may be selectively adjustable between a first orientation where the second support members move in unison and a second orientation where one of the plurality of second support members is movable independent of another one of the plurality of the second support members. The first support member may be coupled to a first frame rail of the land vehicle and extend through a second frame rail of the land vehicle. The first support member may be pivotally coupled to the first frame rail. The land vehicle may also comprise a gear which cooperates with an engaging portion of the second support member to move the second support member relative to the first support member. The engaging portion may comprise a plurality of holes which cooperate with the gear to move the second support member relative to the first support member. A root diameter of the gear is not greater than about 2 inches. The land vehicle may also comprise a motor which is used to drive the gear, the motor comprising a motor shaft which rotates at about the same rate as the gear. The land vehicle may also comprise a motor which is used to move the second support member relative to the first support member. The land vehicle may also comprise a drive assembly which is used to move the second support member relative to the first support member, the first support member being configured to be selectively coupled to the drive assembly at any one of a plurality of locations on the first support member. The first support member may comprise a roller positioned at an end of the first support member, the roller being used to support the second support member as it extends from the end of the first support member. The second support member may be movably coupled to the second floor. The first support member and the second support member may be tubes. The land vehicle may be a recreational vehicle. The land vehicle may also comprise a slide-out compartment which comprises the second floor. The second floor may be a slide-out patio.

According to another embodiment, a slide-out system comprises: a first support member including a first end and a second end, the first end being configured to be coupled to a land vehicle which includes a first floor; and a second support member which is configured to be coupled to a second floor of the land vehicle and to be extendable and/or retractable from the second end of the first support member to move the second floor between a first position where the second floor is positioned adjacent to the main floor and a second position where the second floor is substantially level with the main floor; wherein the first support member comprises a roller positioned at the second end which is used to support the second support member as it extends and/or retracts. The slide-out system may also comprise a plurality of first support members; a plurality of second support members; a drive assembly which is used to move the plurality of second support members in unison. The drive assembly may be selectively adjustable between a first orientation where the second support members move in unison and a second orientation where one of the plurality of second support members is movable independent of another one of the plurality of the second support members. The first support member may be configured to be coupled to a first frame rail of the land vehicle and to extend through a second frame rail of the land vehicle. The first support member may be configured to be pivotally coupled to the first frame rail. The slide-out system may also comprise a gear which cooperates with an engaging portion of the second support member to move the second support member relative to the first support member. The engaging portion may comprise a plurality of holes which cooperate with the gear to move the second support member relative to the first support member. A root diameter of the gear is not greater than about 2 inches. The slide-out system may also comprise a motor which is used to drive the gear, the motor comprising a motor shaft which rotates at about the same rate as the gear. The slide-out system may also comprise a motor which is used to move the second support member relative to the first support member. The slide-out system may also comprise a drive assembly which is used to move the second support member relative to the first support member, the first support member being configured to be selectively coupled to the drive assembly at any one of a plurality of locations on the first support member. The first support member may comprise a roller positioned at an end of the first support member, the roller being used to support the second support member as it extends from the end of the first support member. The second support member may be configured to be movably coupled to the second floor. The first support member and the second support member may be tubes. The land vehicle may be a recreational vehicle. The land vehicle may comprise a slide-out compartment which includes the second floor. The second floor may be a slide-out patio.

The slide-out systems and associated other components or elements of the slide-out systems described herein may have a number of desirable features. For example, individuals may simply and easily couple one or more slide-out mechanisms together in an expandable manner so that the slide-out system may accommodate any type of slide-out compartment. Furthermore, the modular characteristics of the slide-out system reduce the complexity associated with installing, repairing, and retrofitting slide-out compartments for RVs.

As discussed herein, the slide-out system may be simply coupled to the frame rails or other support structure of the RV through creating holes in the rails and sliding the first support member therethrough. A mounting assembly may be coupled to a generally vertical surface of a frame rail to couple a slide-out mechanism to the frame rail. For instance, in one embodiment, the mounting assembly may be coupled to the generally vertical surface closest to the wheels of the RV. Alternatively, the mounting assembly may be coupled to the surface of the frame rail facing toward an adjacent frame rail or the middle of the RV. This allows the slide-out system to accommodate RVs that may need the motor and drive assembly either disposed within the confines of the frame rails or disposed exteriorly to a frame rail.

In addition, the slide-out system described herein may allow an operator to extend or retract the slide-out compartment either manually or through use of a motor. When a quick release arrangement is included between the motor and the gear assemblies, releasing the quick release arrangement allows the operator to manually extend or retract the slide-out compartment. Alternatively, the brake on the motor may be released so that the motor can turn as the slide-out compartment is manually extended and/or retracted. In the event that the motor is disposed between two slide-out mechanisms, two quick release arrangements may be coupled to the motor, one on either side of the motor. By so doing, the operator may disconnect the motor when there is a problem with the motor, and manually extend or retract the slide-out compartment by manually rotating the gear mechanisms disposed at the ends of the sliding system. Alternatively, in the event that the operator has a second motor, similar to the motor described herein, the operator may optionally couple the second motor to another gear shaft or replace the problematic motor with the second motor to enable the user to extend or retract the slide-out compartment. Similarly, the operator may connect the motor to one gear assembly and partially move a second support member of the slide-out mechanism and subsequently connect the motor to the other gear mechanism to move another second support member of another slide-out mechanism, thereby incrementally extending or retracting the slide-out compartment.

While a number of embodiments and modifications thereto are disclosed herein, it should be understood that these embodiments should be viewed as simply a few selected examples of various mechanisms that may be used to move one or more slide-out compartments or slide-out patios.

As used herein, spatial or directional terms, such as "left", "right", "front", "back", and the like, relate to the subject matter as it is shown in the drawing figures. However, it is to be understood that the subject matter described herein may assume various alternative orientations and, accordingly, such terms are not to be considered as limiting. Also, as used herein, articles such as "the," "a," and "an" can connote the singular or plural. Moreover, terms used in the specification and claims such as have, having, include, and including should be construed to be synonymous with the terms comprise and comprising.

Unless otherwise indicated, all numbers or expressions, such as those expressing dimensions, physical characteristics, etc. used in the specification are understood as modified in all instances by the term "about". At the very least, and not as an attempt to limit the application of the doctrine of equivalents to the claims, each numerical parameter recited in the specification or claims which is modified by the term "about" should at least be construed in light of the number of recited significant digits and by applying ordinary rounding techniques. Moreover, all ranges disclosed herein are to be understood to encompass any and all subranges subsumed therein. For example, a stated range of "1 to 10" should be considered to include any and all subranges between and inclusive of the minimum value of 1 and the maximum value of 10; that is, all subranges beginning with a minimum value of 1 or more and ending with a maximum value of 10 or less (e.g., 5.5 to 10).

What is claimed is:

1. A recreational vehicle comprising:
   a first floor;
   a second floor;
   a first support member coupled to the vehicle and sloped relative to the first floor;
   a second support member supported by the first support member and coupled to the second floor, the second support member comprising a plurality of holes; and
   a gear which cooperates with the plurality of holes to move the second support member relative to the first support member and thus move the second floor between a retracted position where the second floor is positioned adjacent to the first floor and an extended position where the second floor is substantially level with the first floor.

2. A recreational vehicle comprising:
   a frame which includes a first frame rail and a second frame rail;
   a first floor supported by the frame;
   a second floor movable between a retracted position where the second floor is positioned adjacent to the first floor and an extended position where the second floor is substantially level with the first floor;
   a first support member pivotally coupled to the first frame rail and extending through the second frame rail, the first support member being movable at the second frame rail in a direction that is perpendicular to the first floor; and
   a second support member supported by the first support member and coupled to the second floor, the second support member moving relative to the first support member to move the second floor between the retracted position and the extended position.

3. A recreational vehicle comprising:
   a frame which includes a first frame rail and a second frame rail;
   a slide-out compartment which is movable between a retracted position and an extended position;
   a plurality of first support members coupled to the first frame rail and extending through the second frame rail;
   a plurality of second support members supported by the first support members and coupled to the slide-out compartment, each second support member comprising a plurality of holes; and
   a drive assembly comprising a plurality of gears which cooperate with the plurality of holes in corresponding second support members to move the second support members relative to the first support members and thus move the slide-out compartment between the retracted and the extended position, the drive assembly being used to move the plurality of gears in unison, the drive assembly also being selectively telescopically adjustable between a first orientation where the plurality of gears move in unison and a second orientation where one of the plurality of gears is movable independent of another one of the plurality of gears.

4. A recreational vehicle comprising:
   a frame which includes a first frame rail and a second frame rail, the second frame rail including a first side and a second side;
   a slide-out floor which is movable between a retracted position and an extended position;
   a first support member coupled to the first frame rail and extending through the second frame rail;
   a second support member supported by the first support member and coupled to the slide-out floor, the second support member comprising an engaging portion; and
   a mounting assembly comprising a gear which cooperates with the engaging portion to move the second support member relative to the first support member and thus move the slide-out floor between the retracted position and the extended position, the mounting assembly being used to couple the first support member to the second frame rail, the mounting assembly being configured to be selectively coupled to the first side or the second side of the second frame rail.

5. The recreational vehicle according to claim 1 comprising
   a plurality of first support members;
   a plurality of second support members;
   a plurality of gears; and
   a drive assembly comprising the plurality of gears, the drive assembly being used to move the plurality of gears in unison.

6. The recreational vehicle according to claim 5 wherein the drive assembly is selectively adjustable between a first orientation where the plurality of gears move in unison and a second orientation where one of the plurality of gears is movable independent of another one of the plurality of gears.

7. The recreational vehicle according to claim 1 wherein a root diameter of the gear is not greater than about 2 inches.

8. The recreational vehicle according to claim 1 comprising a motor which is used to drive the gear.

9. The recreational vehicle according to claim 1 comprising
a first frame rail; and
a second frame rail;
wherein the first support member is pivotally coupled to the first frame rail and is coupled to the second frame rail; and
wherein the first support member is movable at the second frame rail in a direction that is perpendicular to the first floor.

10. The recreational vehicle according to claim 1 wherein the first support member and the second support member are tubes.

11. The recreational vehicle according to claim 1 wherein the second floor is a slide-out patio.

12. The recreational vehicle according to claim 2 comprising
a plurality of first support members;
a plurality of second support members; and
a drive assembly which is used to move the plurality of second support members in unison.

13. The reactional vehicle according to claim 12 wherein the drive assembly is selectively adjustable between a first orientation where the second support members move in unison and a second orientation where one of the plurality of second support members is movable independent of another one of the plurality of second support members.

14. The recreational vehicle according to claim 2 wherein the first support member and the second support member are sloped relative to the first floor.

15. The recreational vehicle according to claim 2 comprising a gear which cooperates with an engaging portion of to second support member to move the second support member relative to the first support member.

16. The recreational vehicle according to claim 15 wherein the engaging portion comprises a plurality of holes which cooperate with the gear to move the second support member relative to the first support member.

17. The recreational vehicle according to claim 15 wherein a root diameter of the gear is not greater than about 2 inches.

18. The recreational vehicle according to claim 2 comprising a motor which is used to move the second support member relative to the first support member.

19. The recreational vehicle according to claim 2 wherein the second support member is movably coupled to the second floor.

20. The recreational vehicle according to claim 3 wherein the drive assembly comprises a coupler, a first drive member, and a second drive member, and wherein the coupler is selectively telescopically adjustable between the first orientation where the first drive member and the second drive member move in unison and the second orientation where the first drive member is movable independent of the second drive member.

21. The recreational vehicle according to claim 3 wherein a root diameter of each of the gears is not greater than about 2 inches.

22. The recreational vehicle according to claim 3 wherein the drive assembly comprises a motor which is used to drive the gears.

23. The recreational vehicle according to claim 3 wherein the second support members are pivotably coupled to the slide-out compartment.

24. The recreational vehicle according to claim 3 wherein the first support members are pivotally coupled to the first frame rail and are vertically adjustable at the second frame rail.

25. The recreational vehicle according to claim 3 wherein the frame supports a main floor, and wherein the first support members and the second support members are sloped relative to the main floor.

26. The recreational vehicle according to claim 3 comprising
a main floor supported by the frame;
wherein the slide-out compartment comprises a slide-out floor; and
wherein the slide-out floor is positioned adjacent to the main floor when the slide-out compartment is in the retracted position and the slide-out floor is substantially level with the main floor when the slide-out compartment is in the extended position.

27. The recreational vehicle according to claim 4 comprising
a plurality of first support members;
a plurality of second support members;
a plurality of mounting assemblies; and
a drive member coupled to the mounting assemblies and used to move the gear of each mounting assembly in unison.

28. The recreational vehicle according to claim 27 wherein the drive member is selectively adjustable between a lint orientation where the gears of the mounting assemblies move in unison and a second orientation where one gear of one mounting assembly is movable independent of another gear of another mounting assembly.

29. The recreational vehicle according to claim 4 wherein the slide-out floor is a slide-out patio.

30. The recreational vehicle according to claim 4 comprising a slide-out compartment which includes the slide-out floor.

31. The recreational vehicle according to claim 4 wherein the engaging portion comprises a plurality of holes which cooperate with the gear to move the second support member.

32. The recreational vehicle according to claim 4 wherein a root diameter of the gear is not greater than about 2 inches.

33. The recreational vehicle according to claim 4 wherein the mounting assembly comprises a motor which is used to drive the gear.

34. The recreational vehicle according to claim 4 wherein the first support member is pivotally coupled to the first frame rail and is vertically adjustable at the second frame rail.

35. The recreational vehicle according to claim 4 wherein the frame supports a main floor, and wherein the first support member and the second support member are sloped relative to the main floor.

36. The recreational vehicle according to claim 4 comprising a main floor supported by the frame, and wherein the slide-out floor is positioned adjacent to the main floor when the slide-out floor is in the retracted position and the slide-out floor is substantially level with the main floor when the slide-out floor is in the extended position.

37. The recreational vehicle according to claim 4 wherein the first support member is a first tube and the second support member is a second tube which moves inside the first tube, the first tube comprising an opening through which the gear accesses the engaging portion of the second tube, the opening being sized to permit the mounting assembly to be selectively coupled to the first side or the second side of the second frame rail.

38. A recreational vehicle comprising:
- a first floor;
- a second floor;
- a first support member coupled to the vehicle and sloped relative to the first floor;
- a second support member supported by the first support member and coupled to the second floor, the second support member comprising a plurality of holes; and
- a tooted wheel which cooperates with the plurality of holes to move the second support member relative to the first support member and thus move the second floor between a refracted position where the second floor is positioned adjacent to the first floor and an extended position where the second floor is substantially level with the first floor.

39. The recreational vehicle according to claim 38 comprising
- a plurality of first support members;
- a plurality of second support members;
- a plurality of toothed wheels; and
- a drive assembly comprising the plurality of toothed wheels, the drive assembly being used to move the plurality of gears in unison.

40. The recreational vehicle according to claim 38 wherein the drive assembly is selectively adjustable between a first orientation where the plurality of toothed wheels move in unison and a second orientation where one of the plurality of toothed wheels is movable independent of another one of the plurality of toothed wheels.

41. The recreational vehicle according to claim 38 wherein a root diameter of the toothed wheel is not greater than about 2 inches.

42. The recreational vehicle according to claim 38 comprising a motor which is used to drive the toothed wheel.

43. The recreational vehicle according to claim 38 comprising
- a first frame rail; and
- a second frame rail;
- wherein the first support member is pivotally coupled to the first frame rail and is coupled to the second frame rail; and
- wherein the first support member is movable at the second frame rail in a direction that is perpendicular to the first floor.

44. The recreational vehicle according to claim 38 wherein the first support member and second support member are tubes.

* * * * *

UNITED STATES PATENT AND TRADEMARK OFFICE
CERTIFICATE OF CORRECTION

PATENT NO. : 6,976,721 B2
DATED : December 20, 2005
INVENTOR(S) : C. Martin Rasmussen It is certified that error appears in the above-identified patent and that said Letters Patent is hereby corrected as shown below:

Column 44,
Line 38, delete "refracted" and insert -- retracted --.

Column 45,
Line 27, delete "reactional" and insert -- recreational --;
Line 38, delete "to" (first occurrence) and insert -- the --.

Column 46,
Line 32, delete "lint" and insert -- first --.

Column 47,
Line 12, delete "tooted" and insert -- toothed --;
Line 15, delete "refracted" and insert -- retracted --;
Line 26, delete "gears" and insert -- toothed wheels --.

Column 48,
Line 1, delete "claim 38" and insert -- claim 39 --.

Signed and Sealed this

Eleventh Day of April, 2006

JON W. DUDAS
*Director of the United States Patent and Trademark Office*